United States Patent [19]

Sheafor et al.

[11] Patent Number: 4,649,384
[45] Date of Patent: Mar. 10, 1987

[54] METHOD AND APPARATUS FOR FAULT TOLERANT SERIAL COMMUNICATION OF DIGITAL INFORMATION

[75] Inventors: Stephen J. Sheafor, Santa Clara; Ken K. S. Weng, Sunnyvale, both of Calif.

[73] Assignee: Dialogic Systems Corp., San Jose, Calif.

[21] Appl. No.: 540,267

[22] Filed: Oct. 7, 1983

[51] Int. Cl.⁴ .............................................. H04Q 9/00
[52] U.S. Cl. .................................. 340/825.03; 370/58; 370/31; 370/16; 371/7
[58] Field of Search .................... 375/38; 179/18 EA; 178/3; 370/16, 24, 29, 54, 53, 58, 85, 13, 31; 340/825.03, 825.01; 371/22, 8, 7

[56] References Cited

U.S. PATENT DOCUMENTS

| | | | |
|---|---|---|---|
| 4,228,496 | 10/1980 | Katzman et al. | 364/200 |
| 4,300,230 | 11/1981 | Philip et al. | 370/13 |
| 4,442,502 | 4/1984 | Friend et al. | 370/58 |
| 4,499,575 | 2/1985 | Dupuis et al. | 370/58 |

Primary Examiner—Donald J. Yusko
Attorney, Agent, or Firm—Townsend and Townsend

[57] ABSTRACT

A method and apparatus for serial communication of digital information in an information processing system for high throughput fault tolerant communication is disclosed. High throughput is achieved by providing a multiplicity of communication circuits, which are preferably four-wire, full duplex bidirectional channels for serial communication of digital information, and by providing full duplex, bidirectional communication of messages at a first rate and half duplex, unidirectional communication of large blocks of data at a second higher rate over the communication circuits. Fault tolerance for serial communication of digital information is provided by the multiplicity of communication circuits so that if one communication circuit is inoperative the remainder of the communication circuits is available for communication. The method and apparatus facilitate circuit implementation of an architecture for high throughout fault tolerant serial communication of digital information in a loosely coupled information processing system. Other features are also disclosed.

12 Claims, 75 Drawing Figures

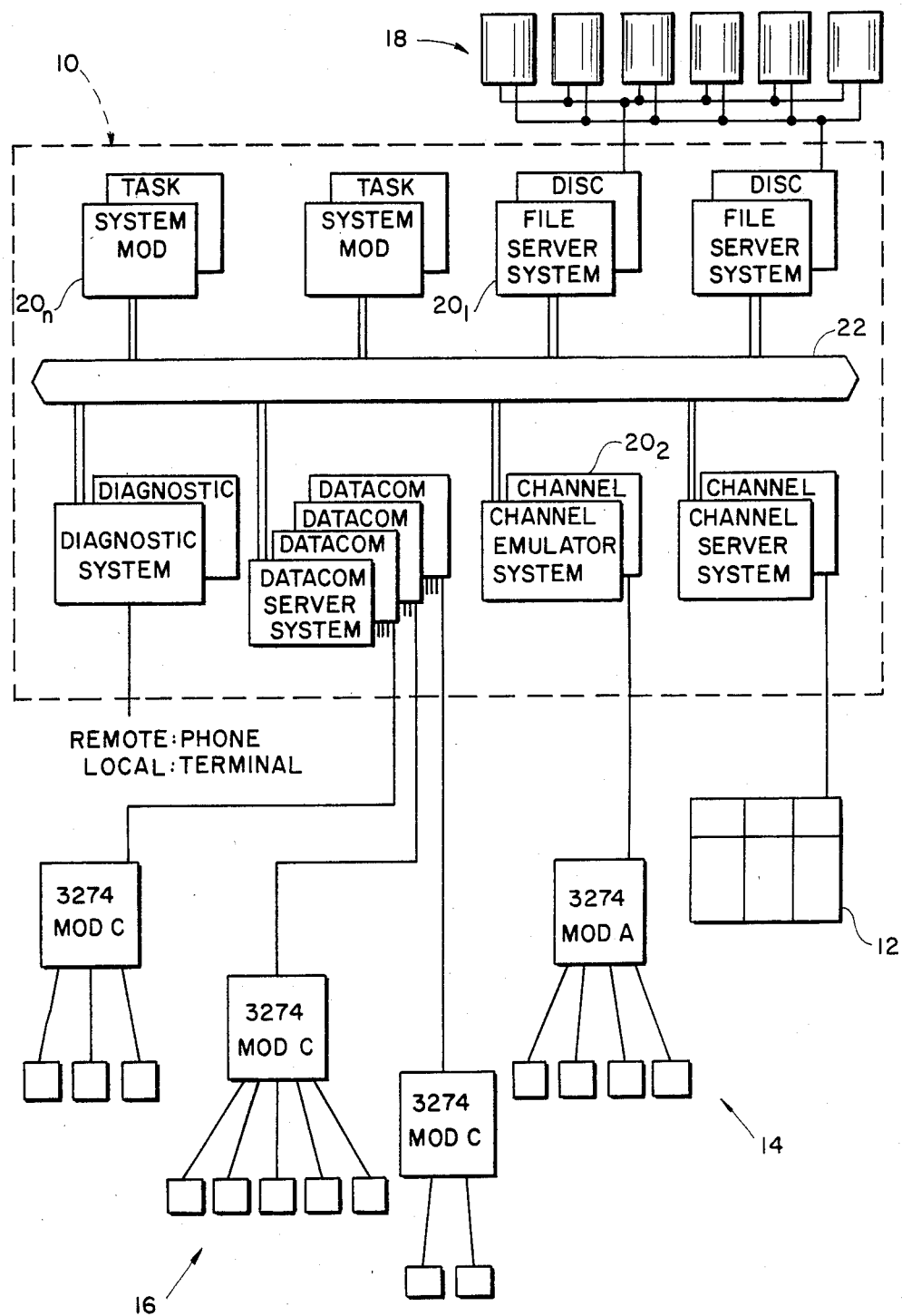
FIG._1.

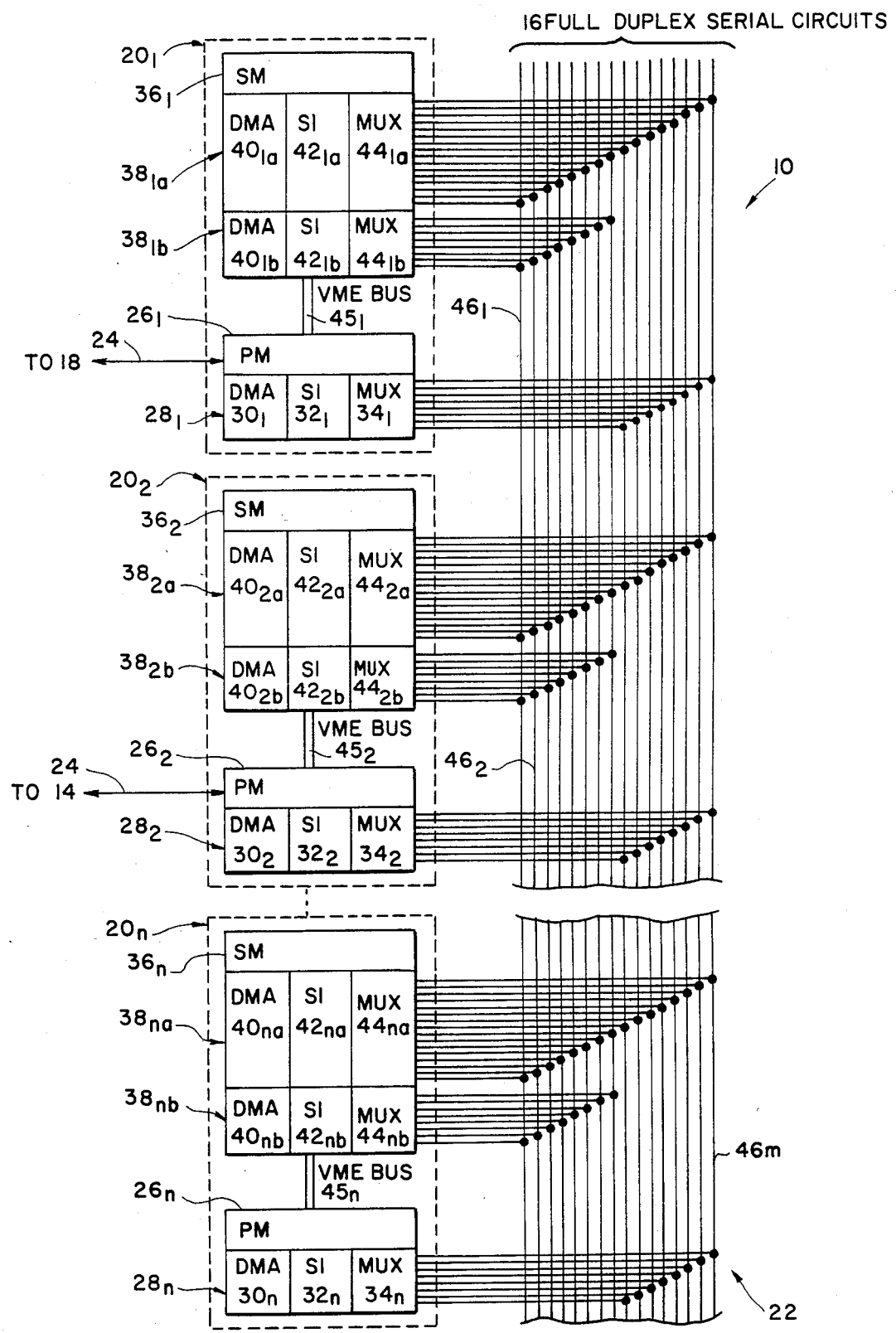
FIG._2.

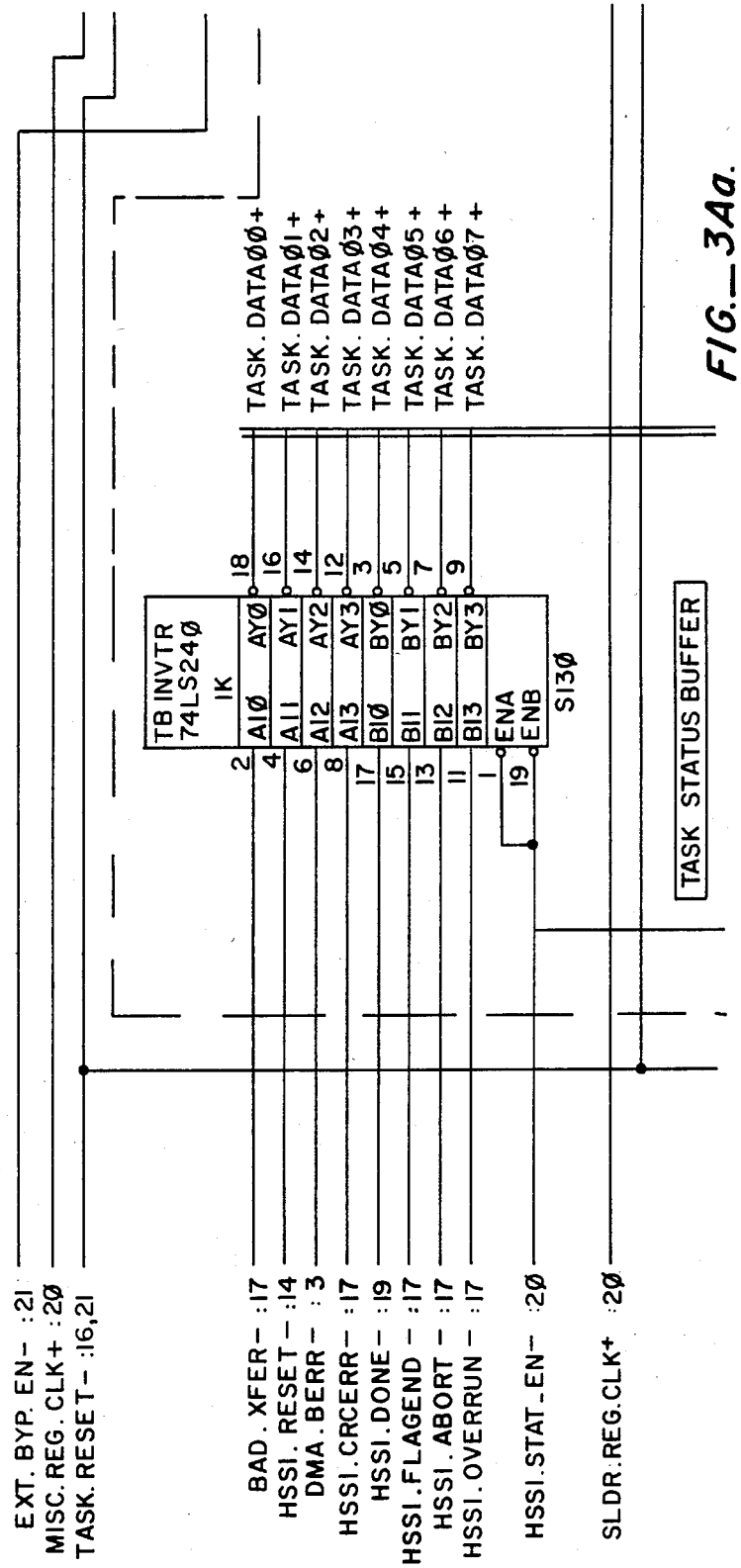

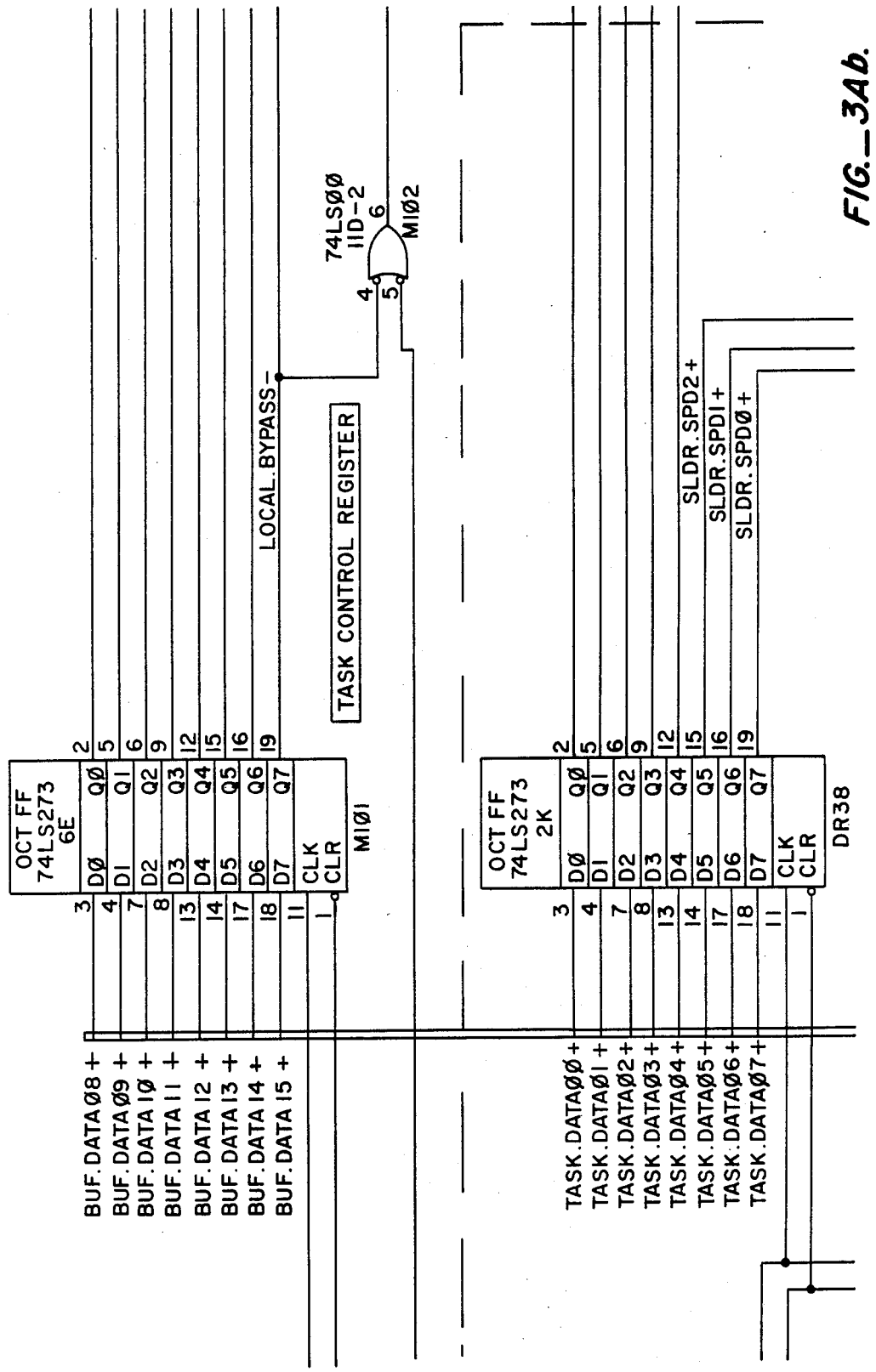

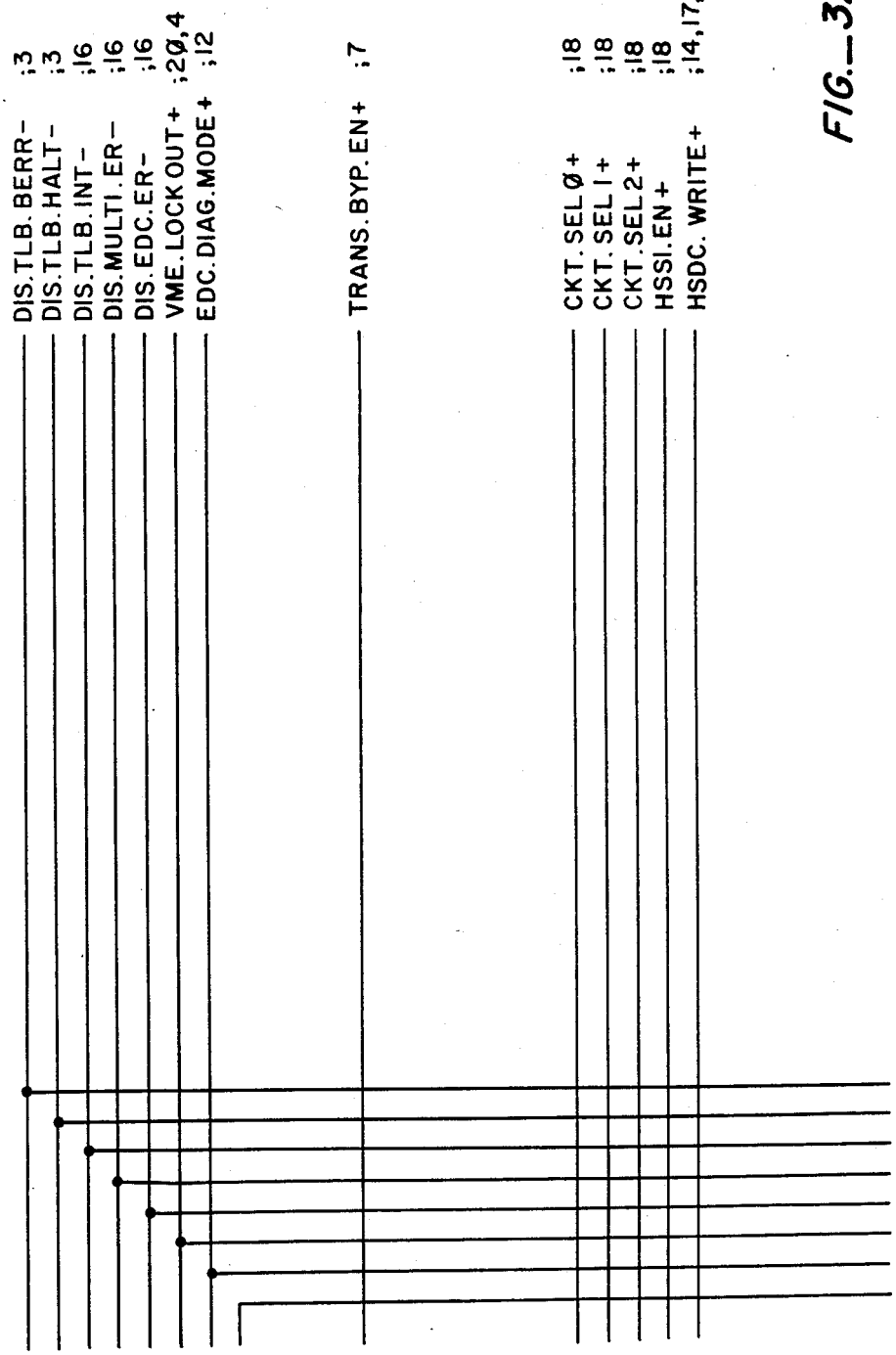
FIG._3Ac.

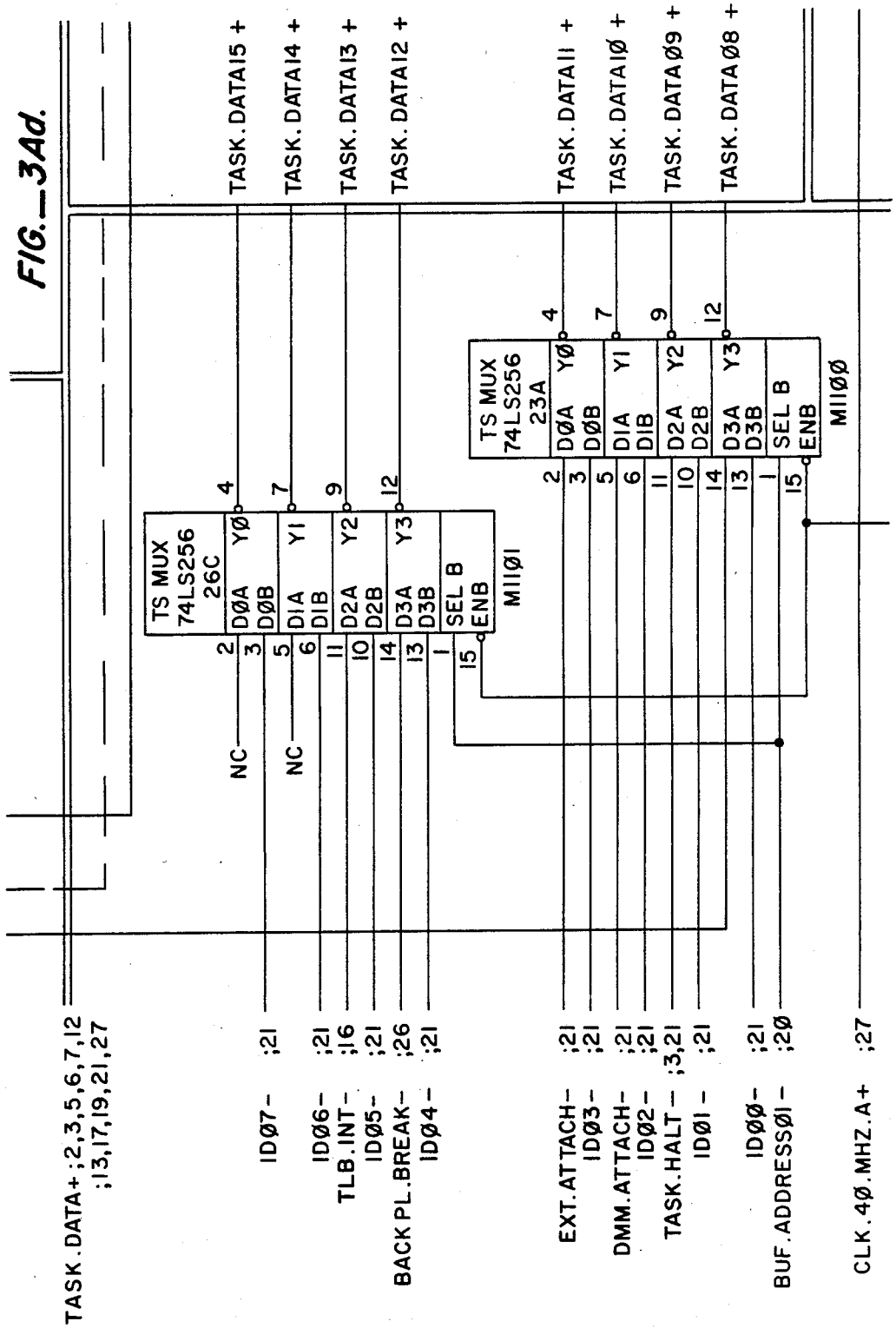
FIG._3Ad.

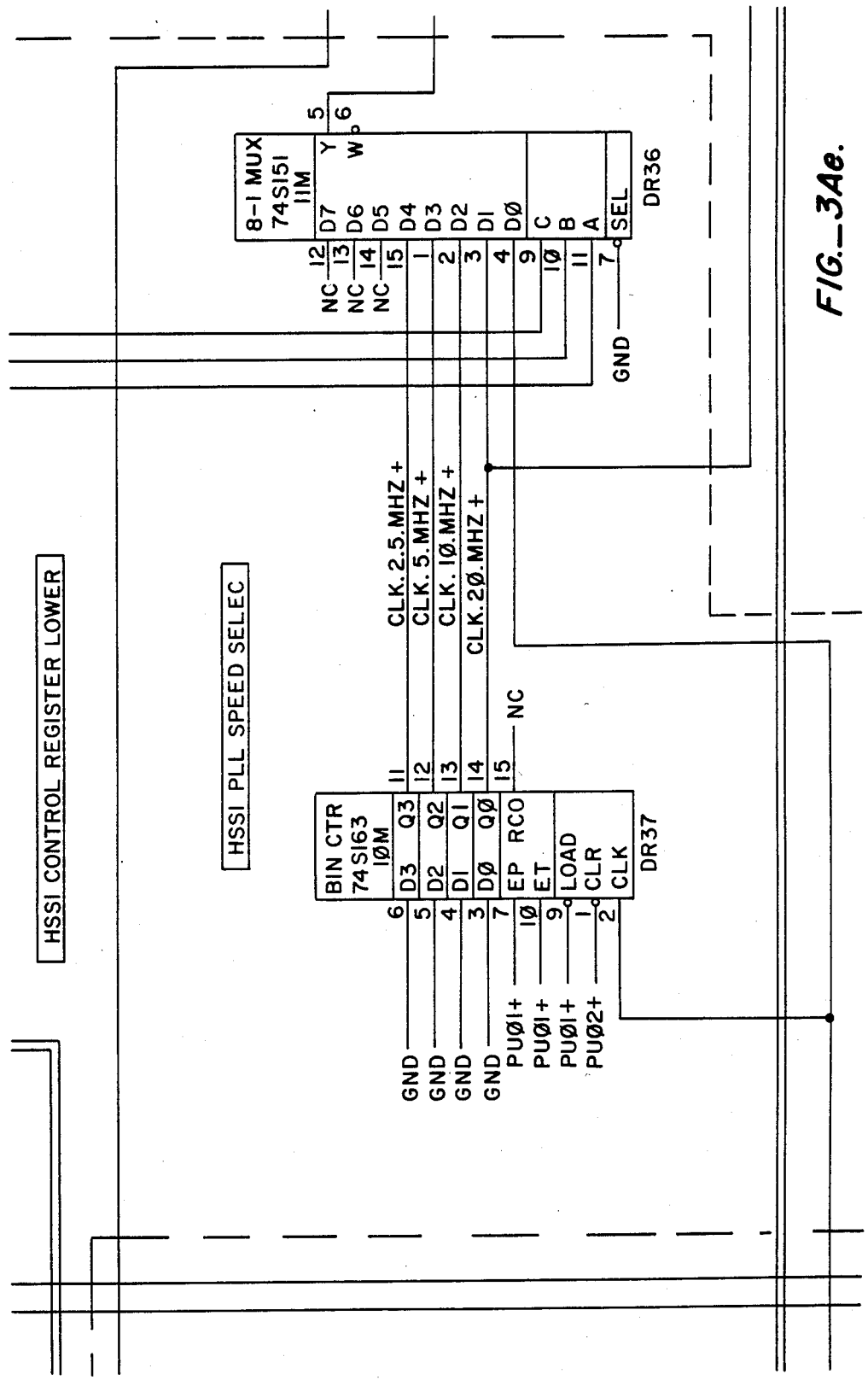

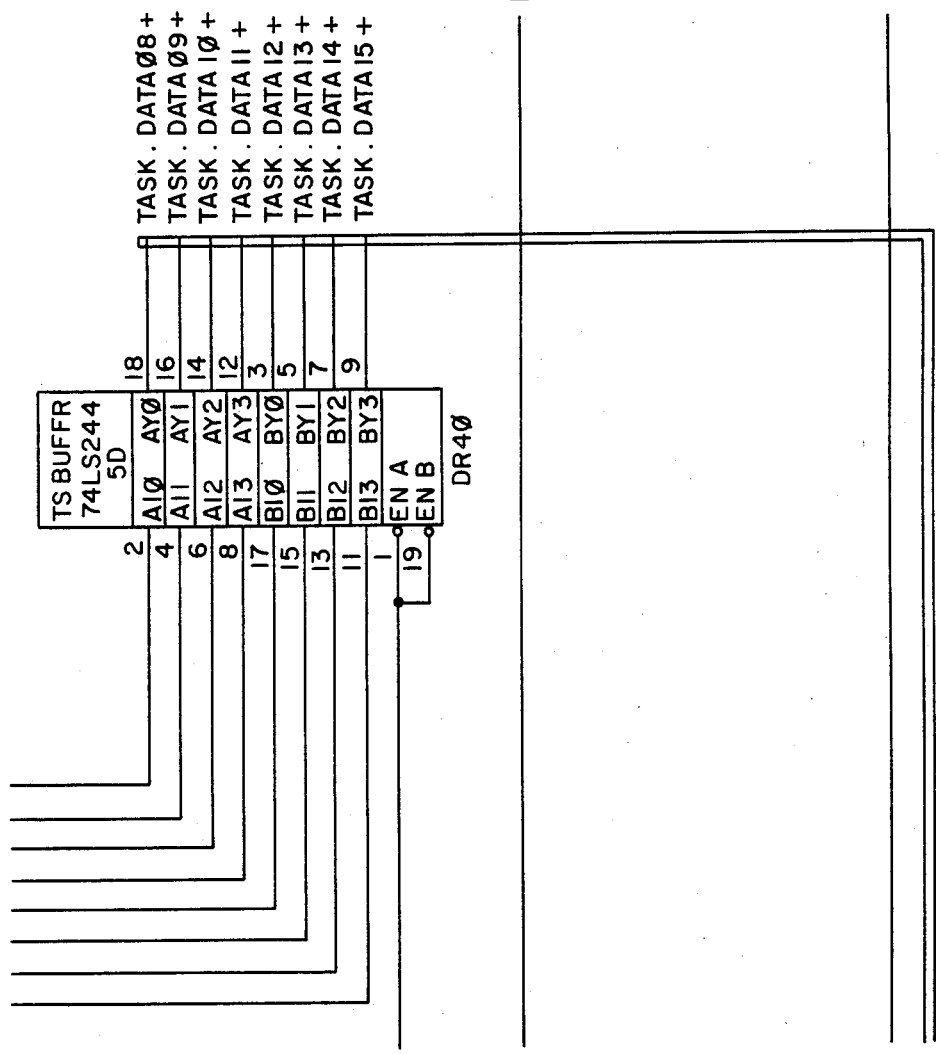

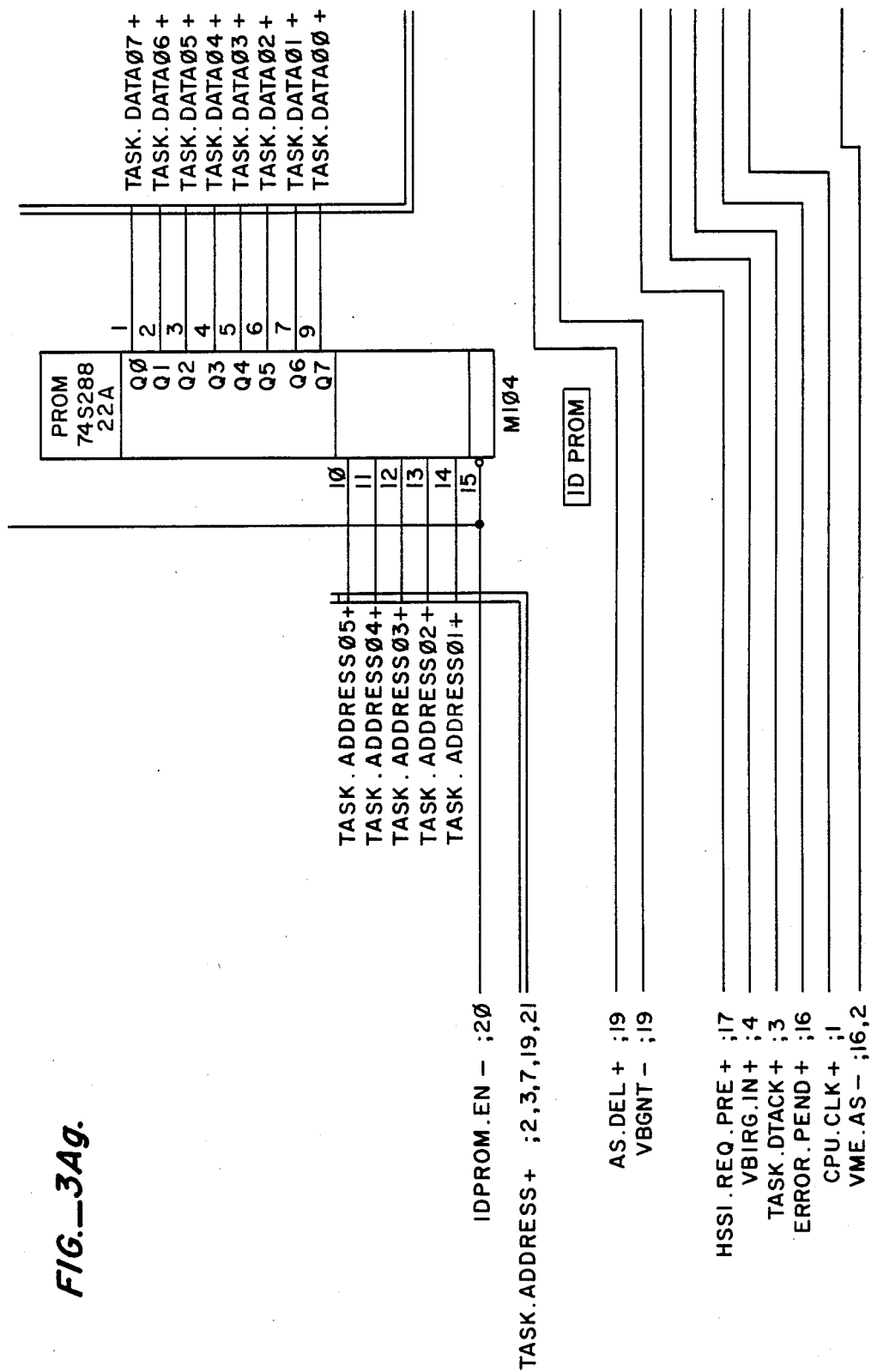

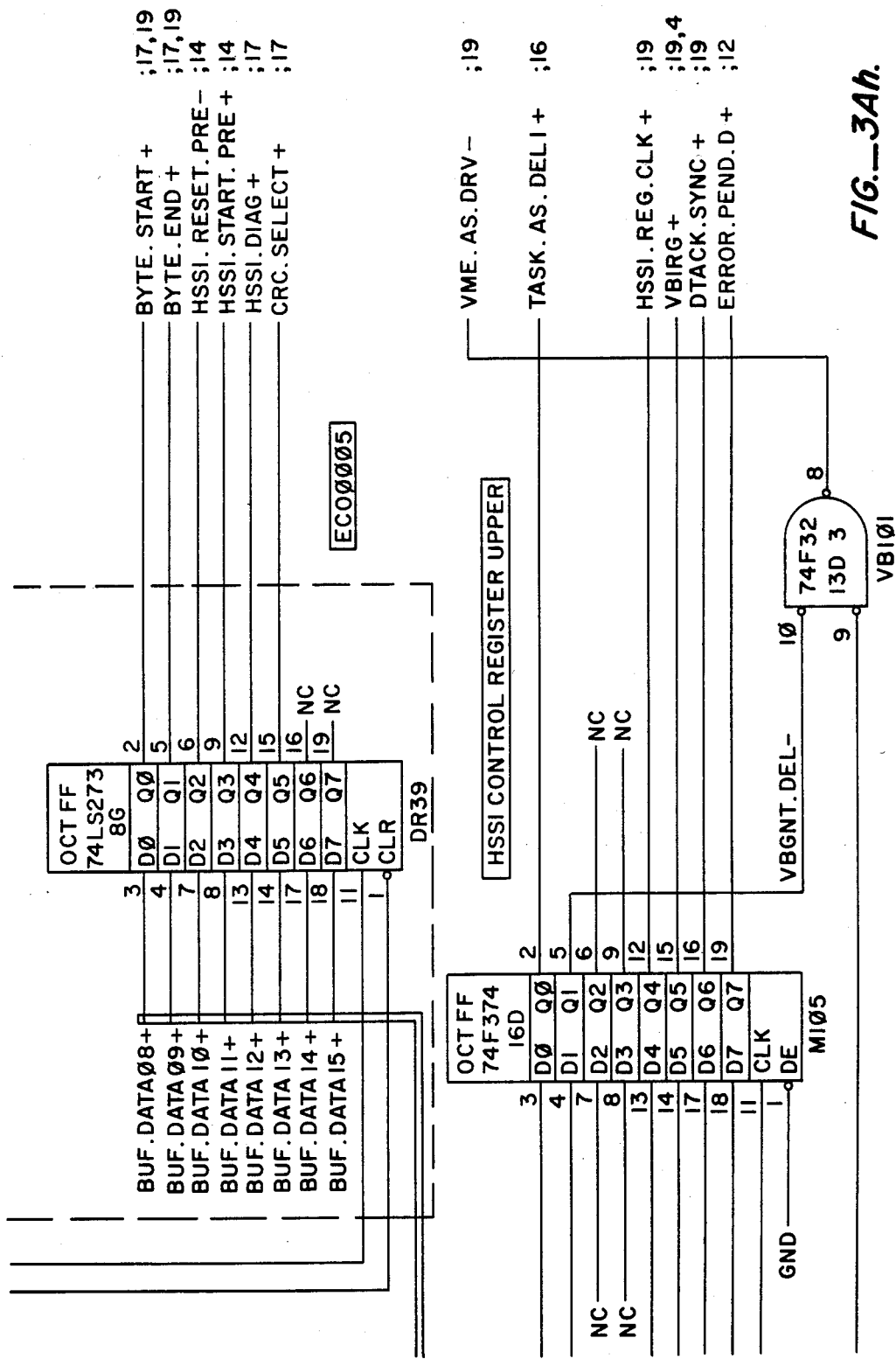
FIG._3Ah.

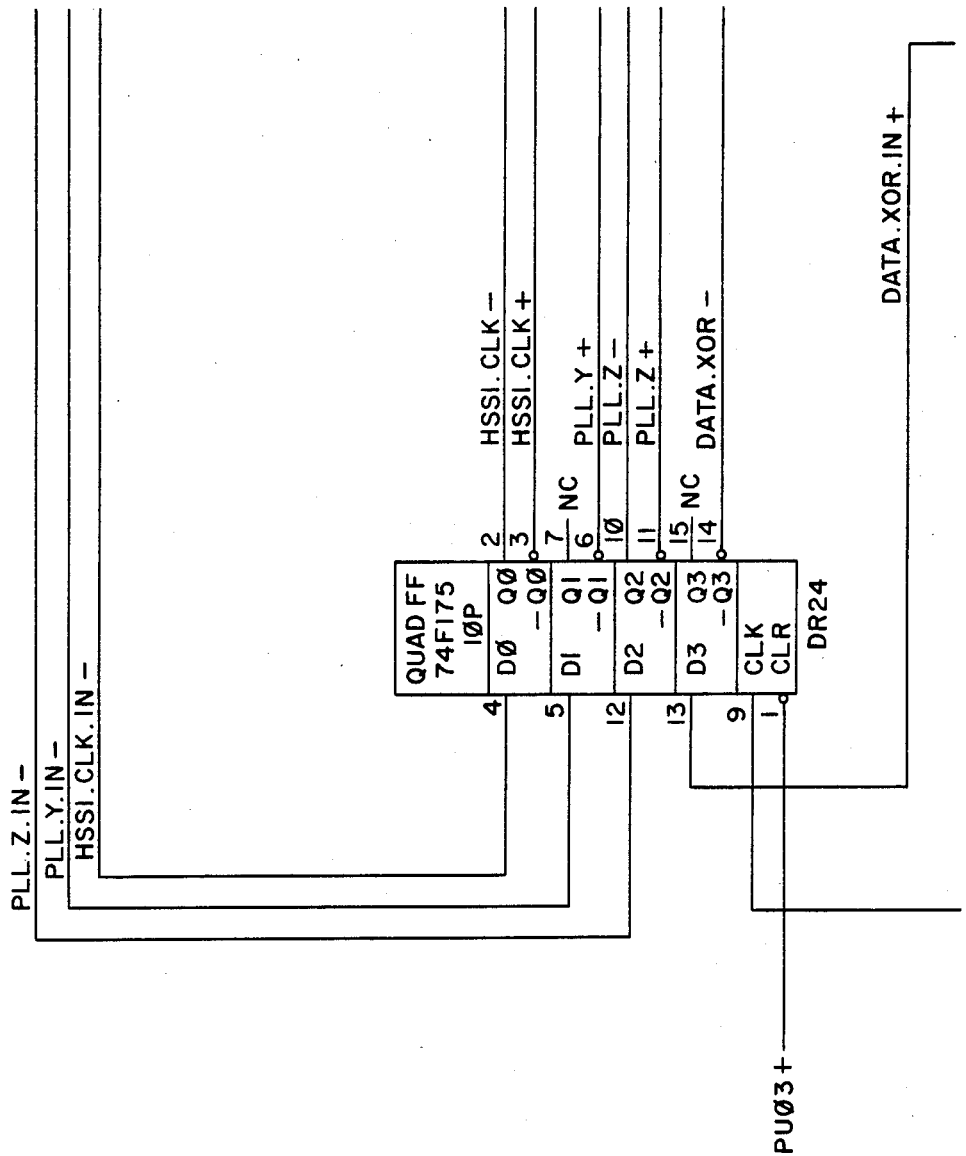

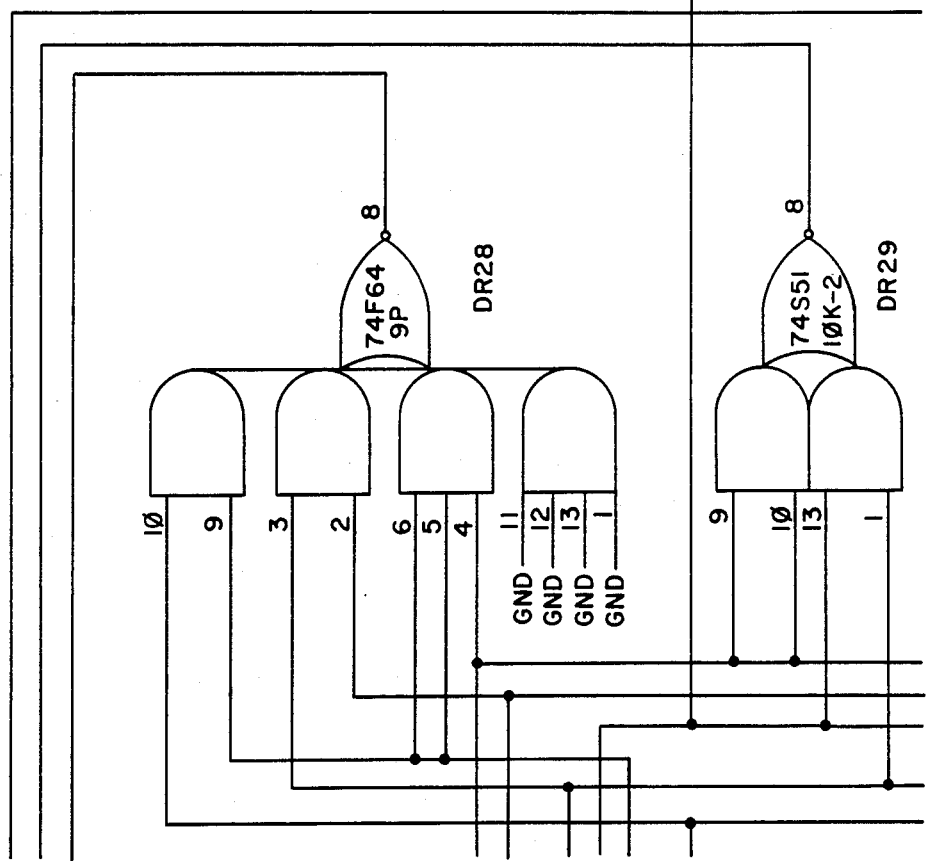

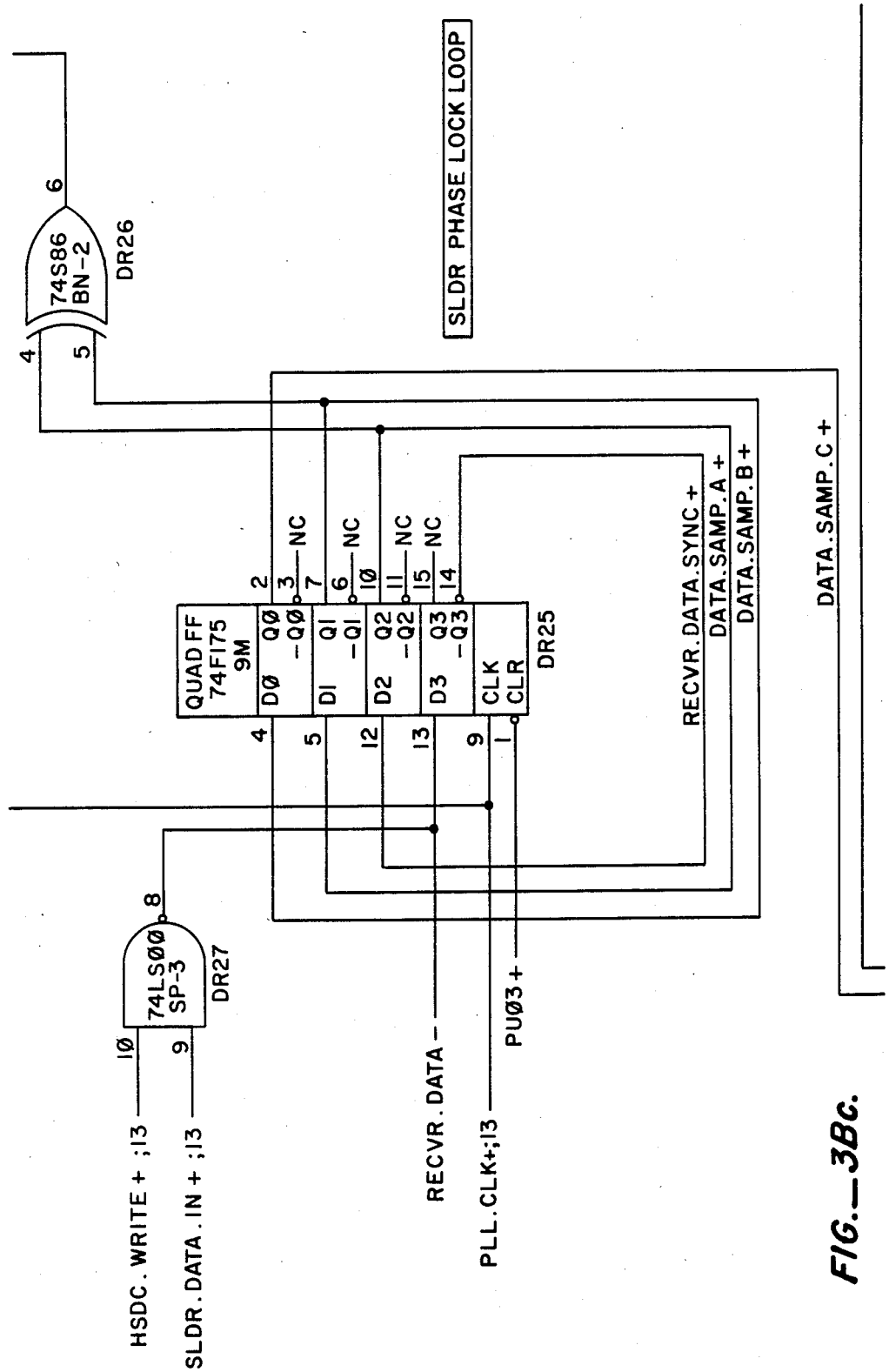
FIG.—3Bc.

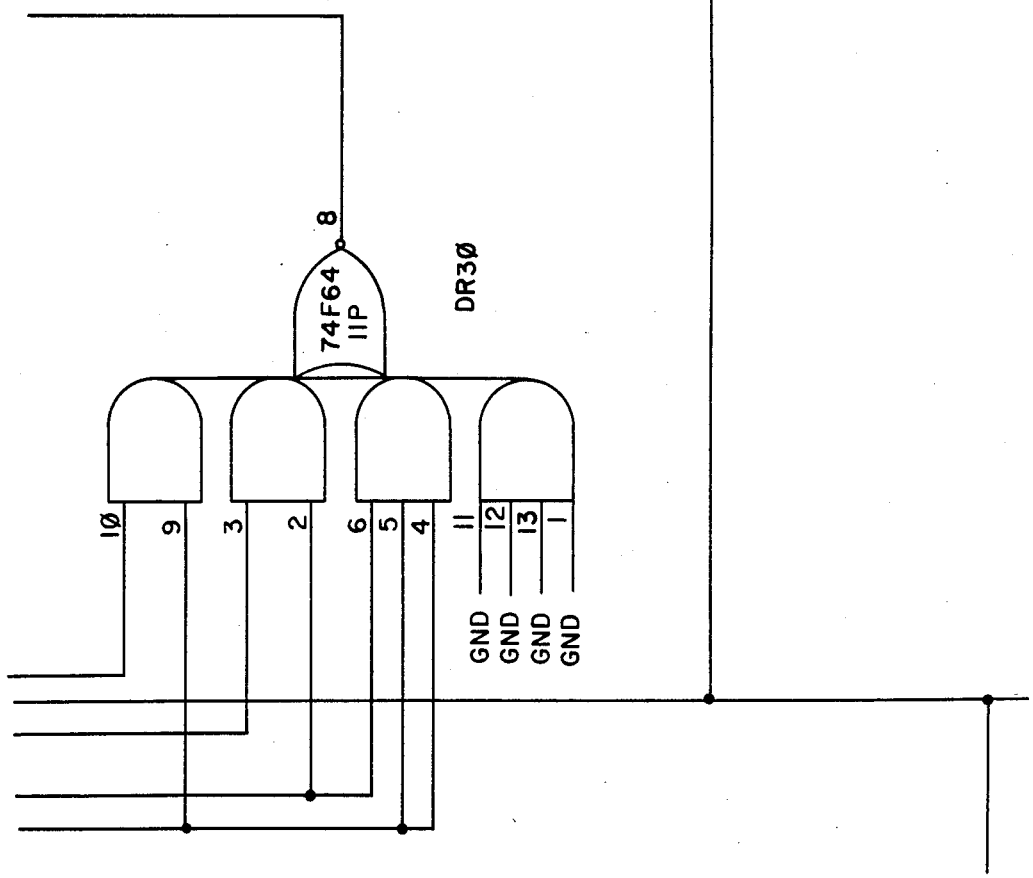
FIG._3Bd.

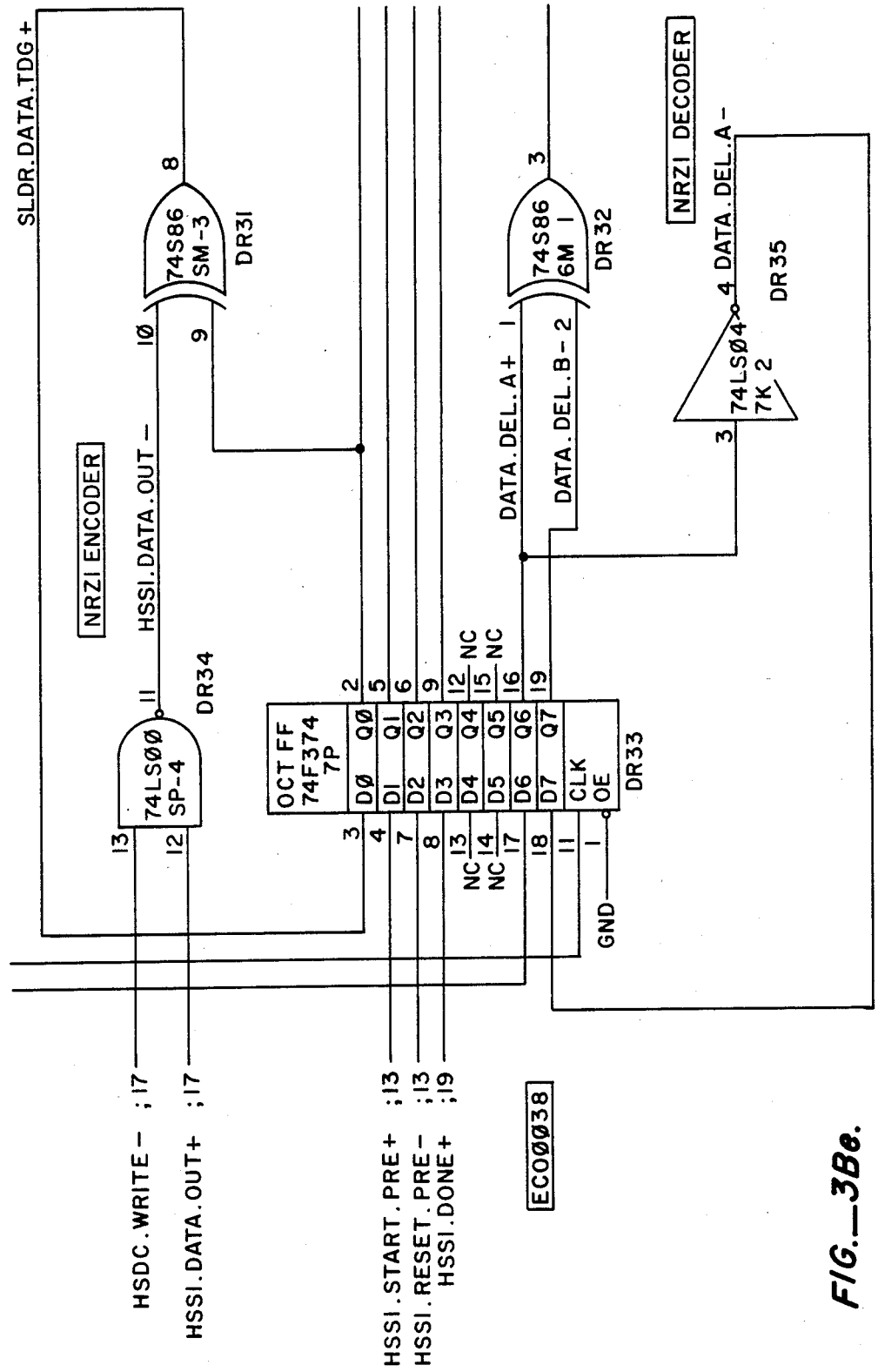
FIG._3B0.

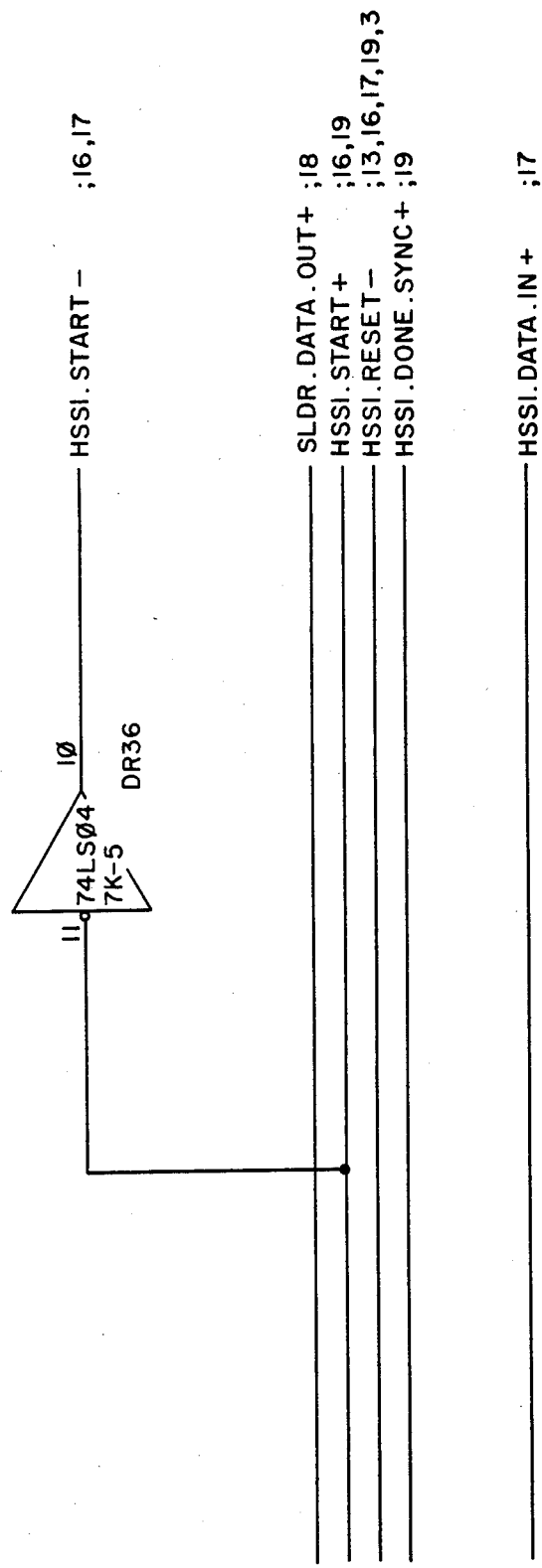
FIG._3Bf.

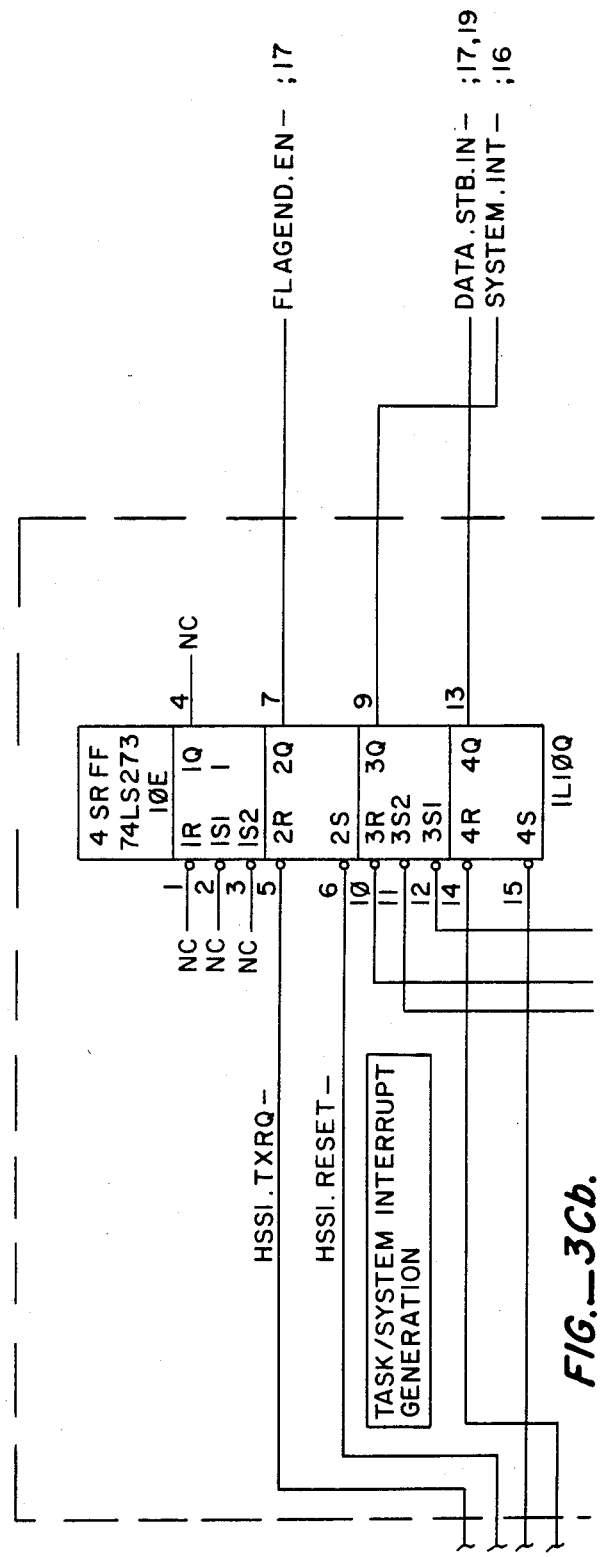

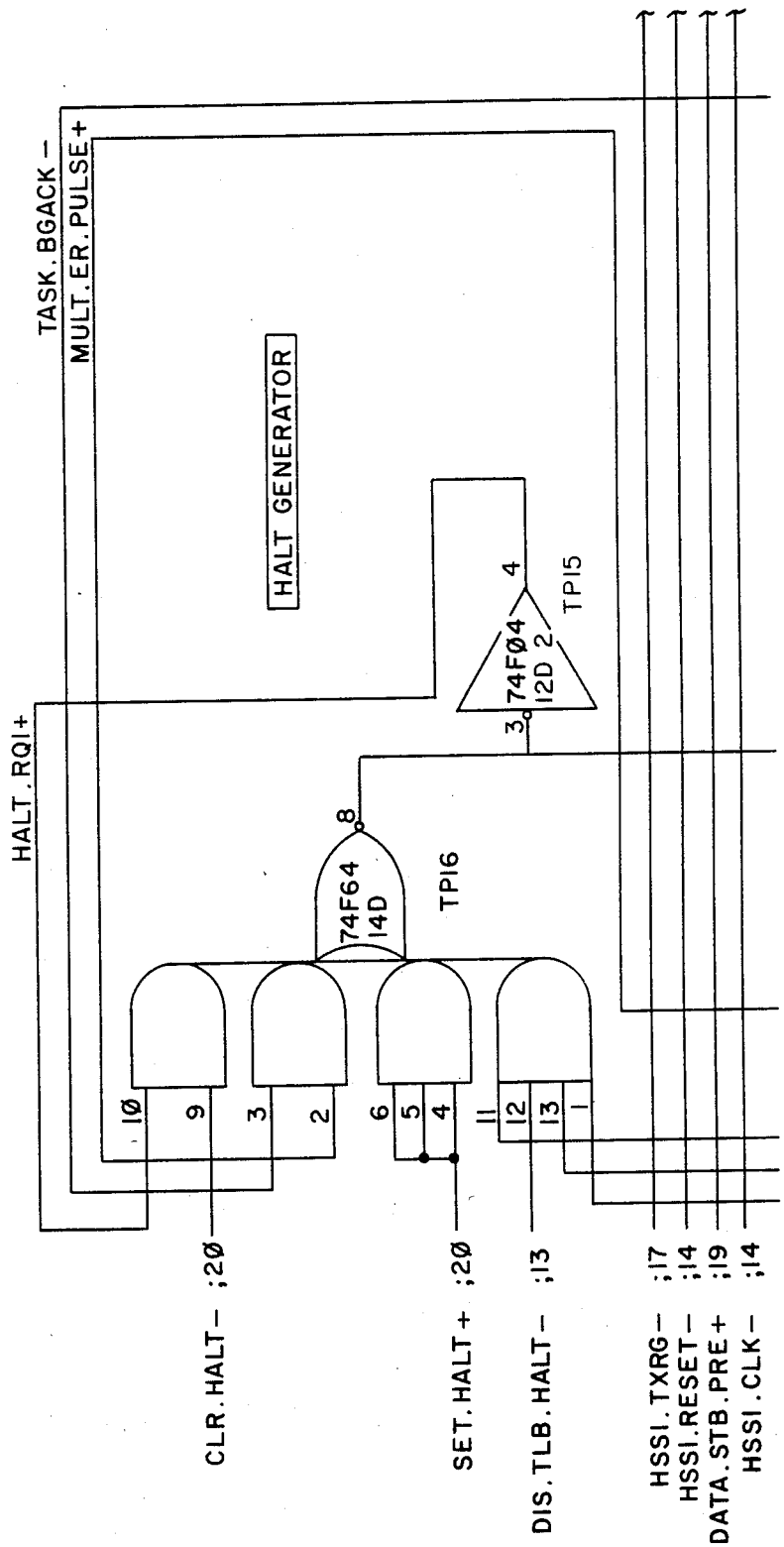
FIG._3Ca.

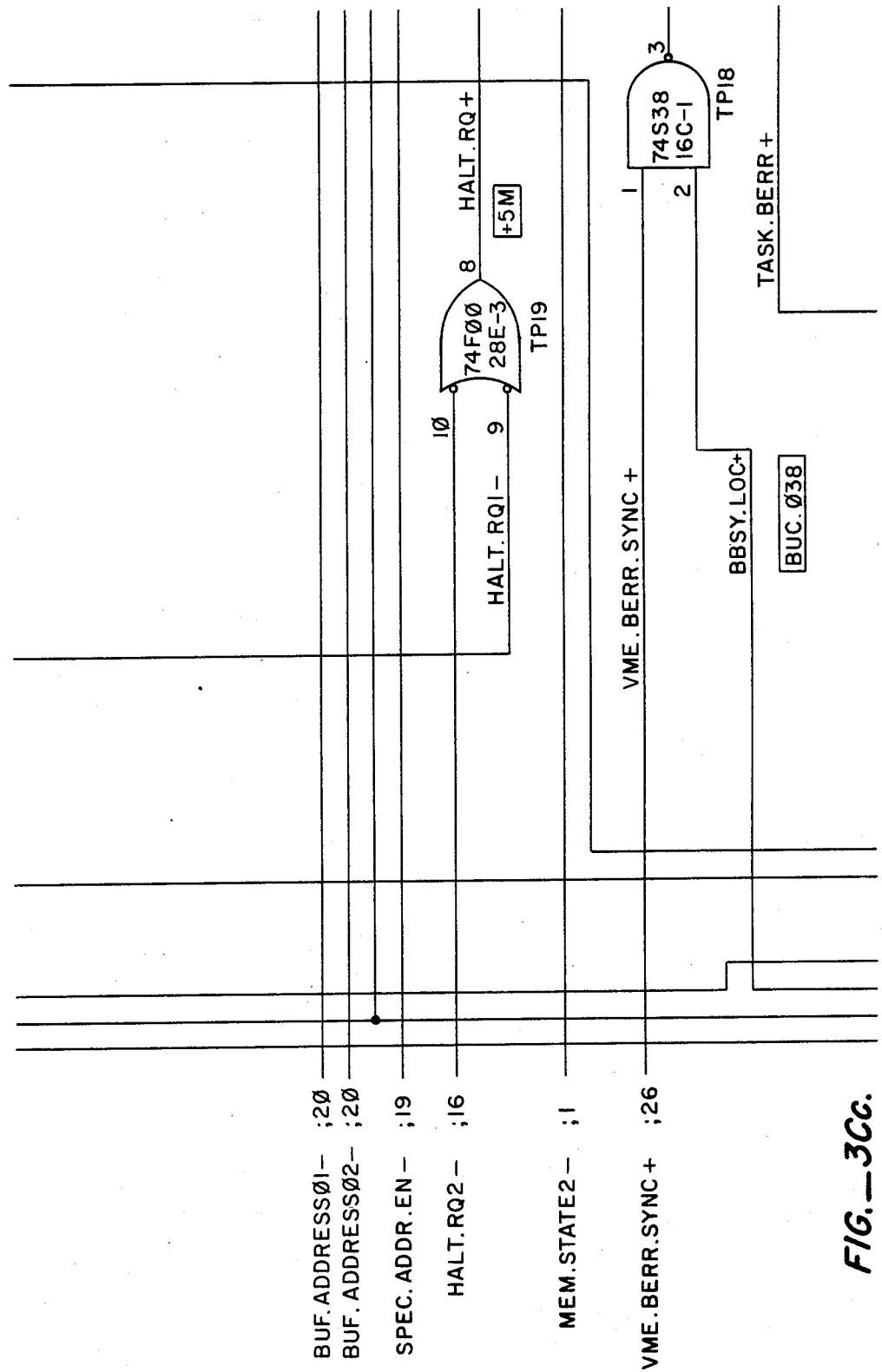
FIG._3Cc.

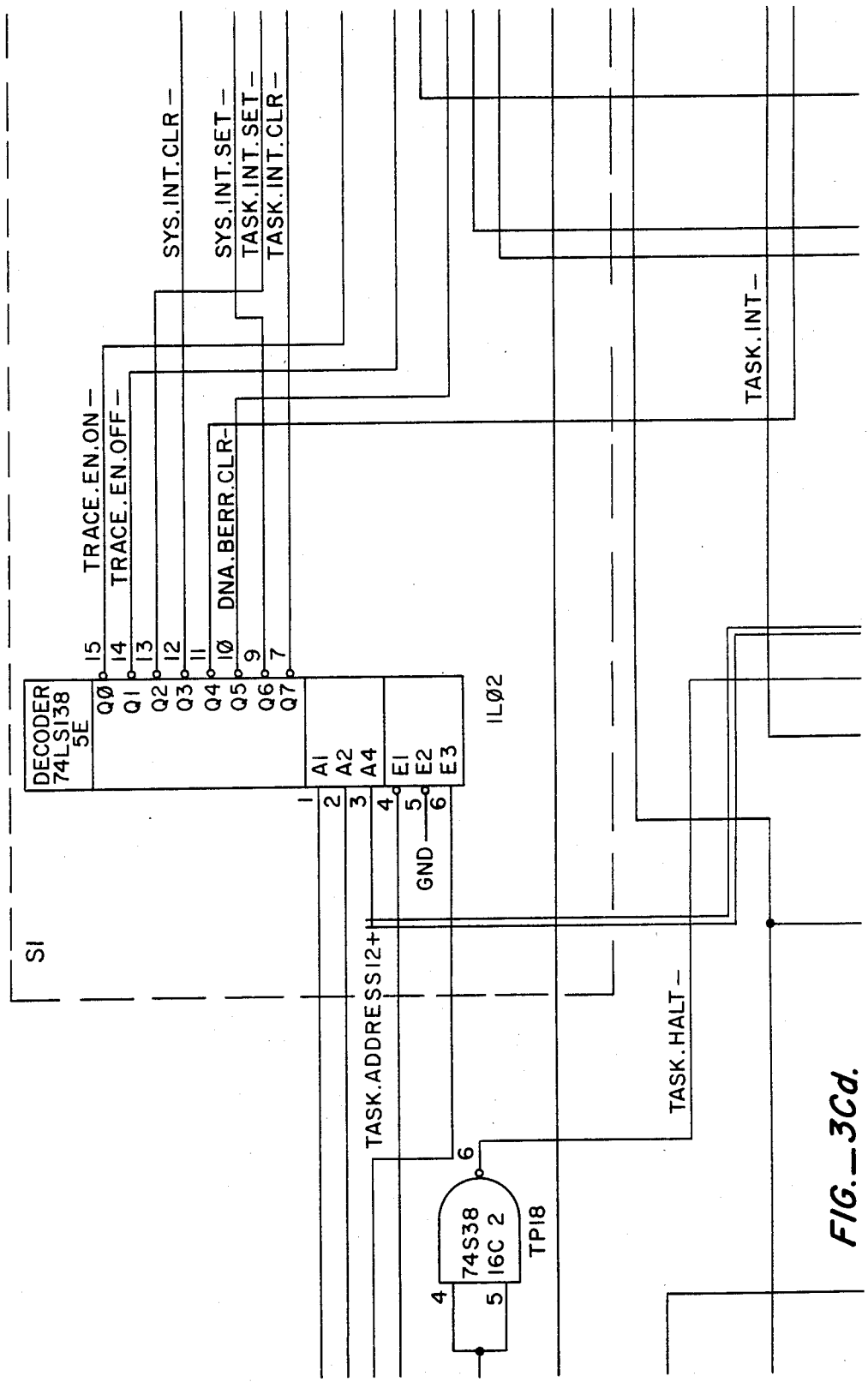
FIG._3Cd.

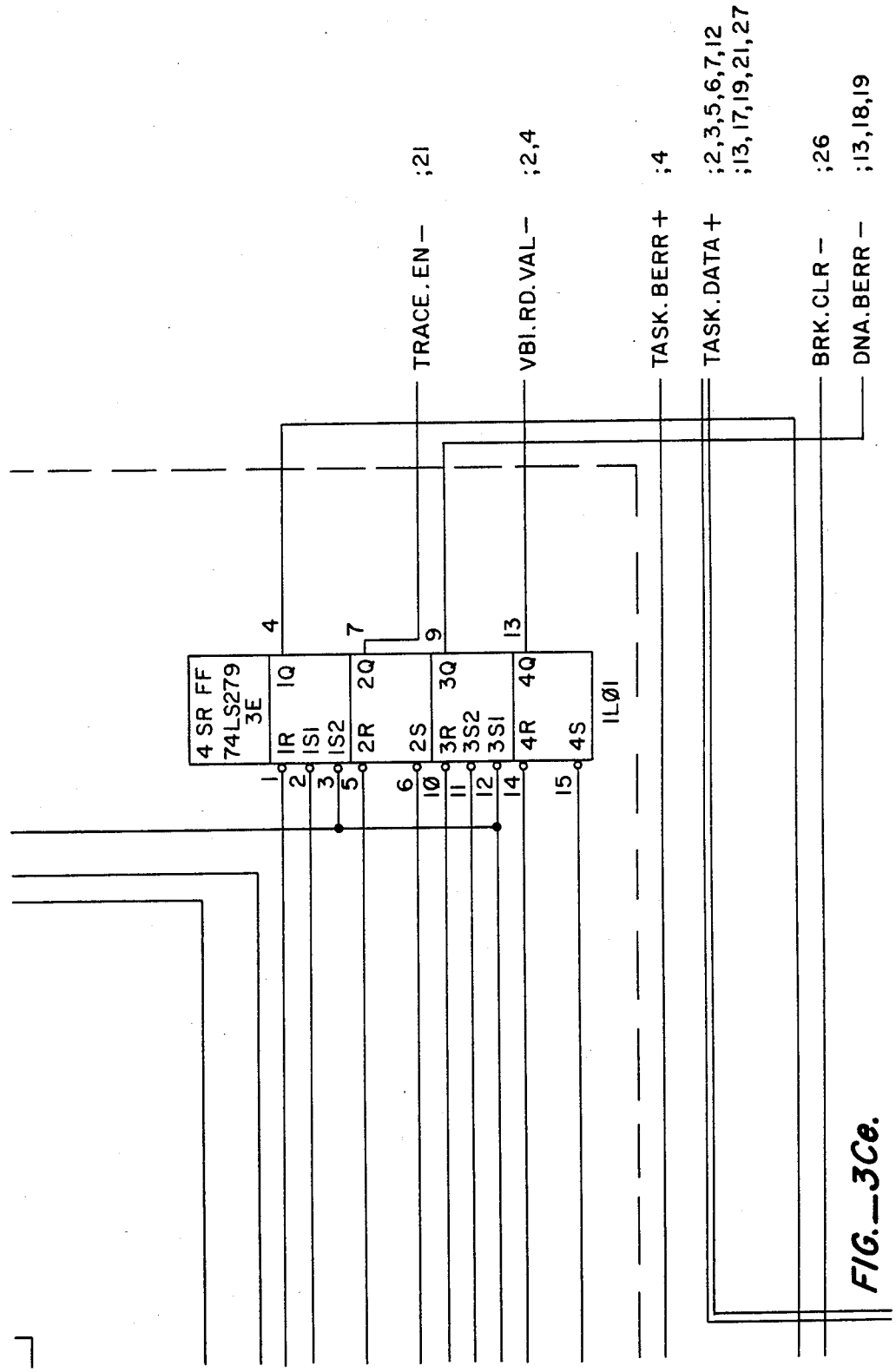

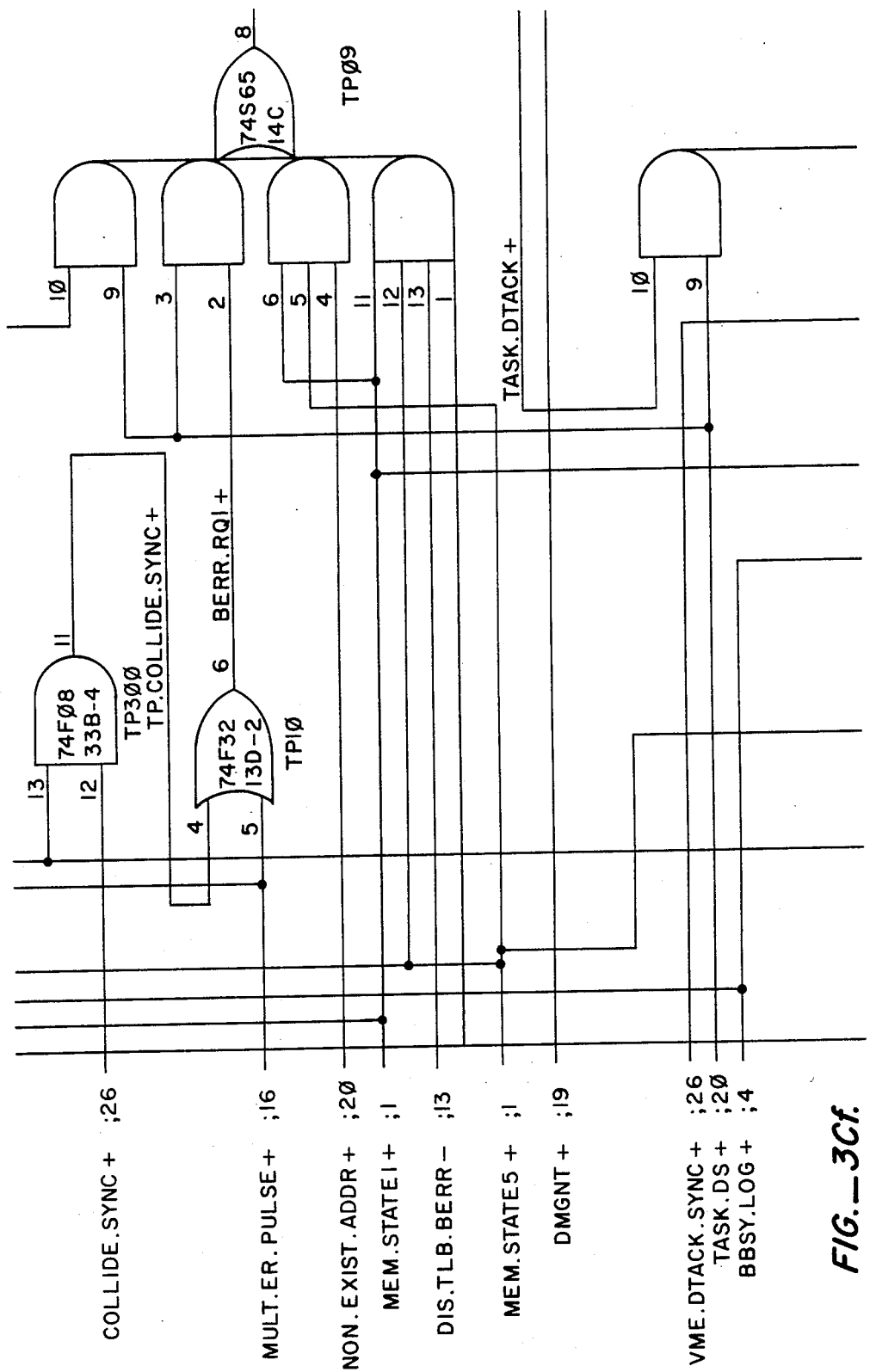
FIG._3Cf.

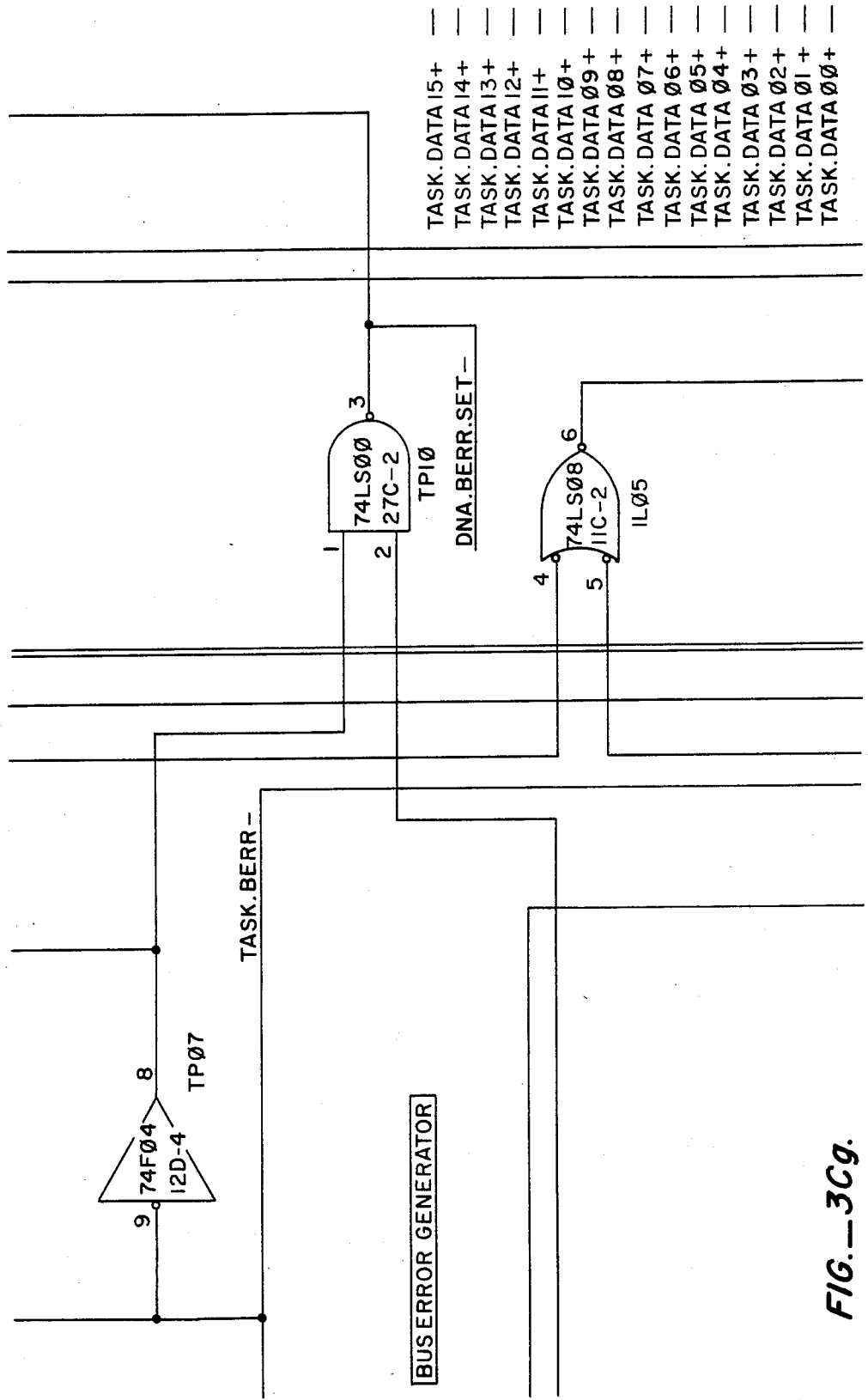
FIG.—3Cg.

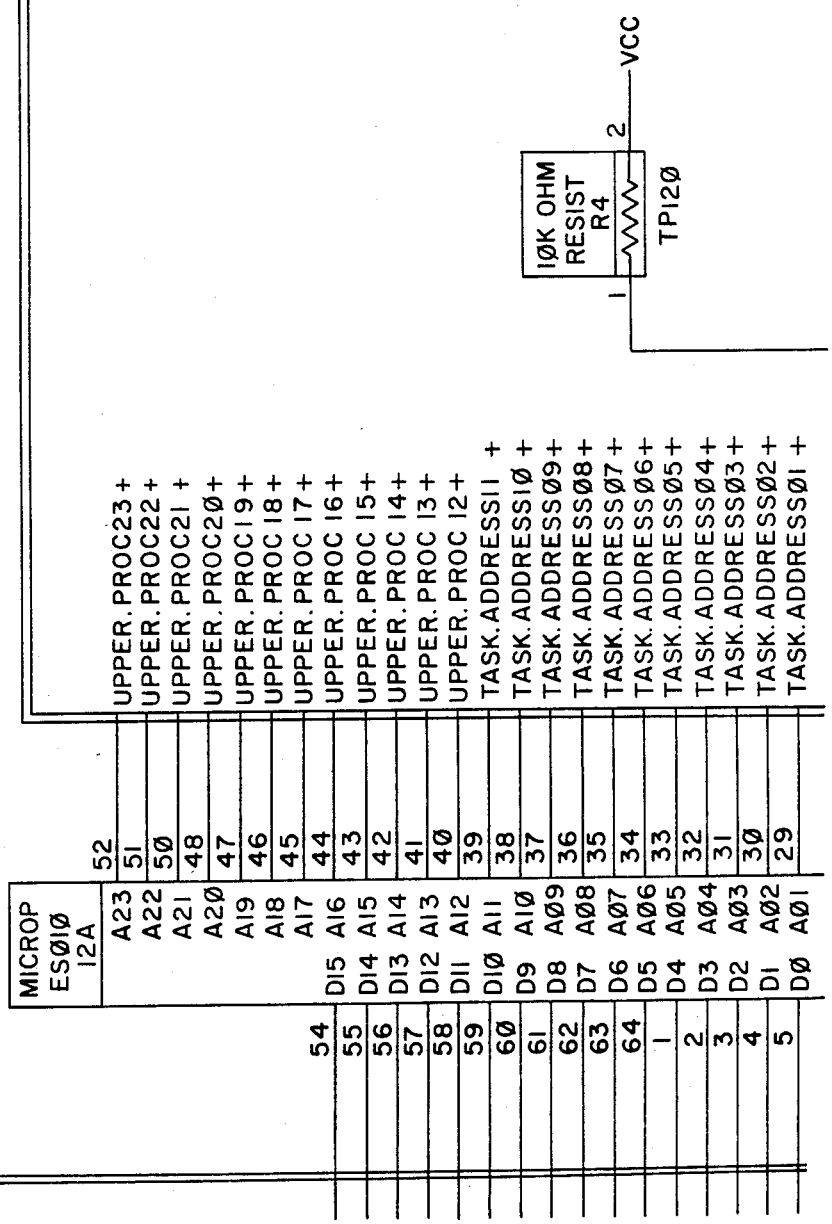
FIG._3Ch.

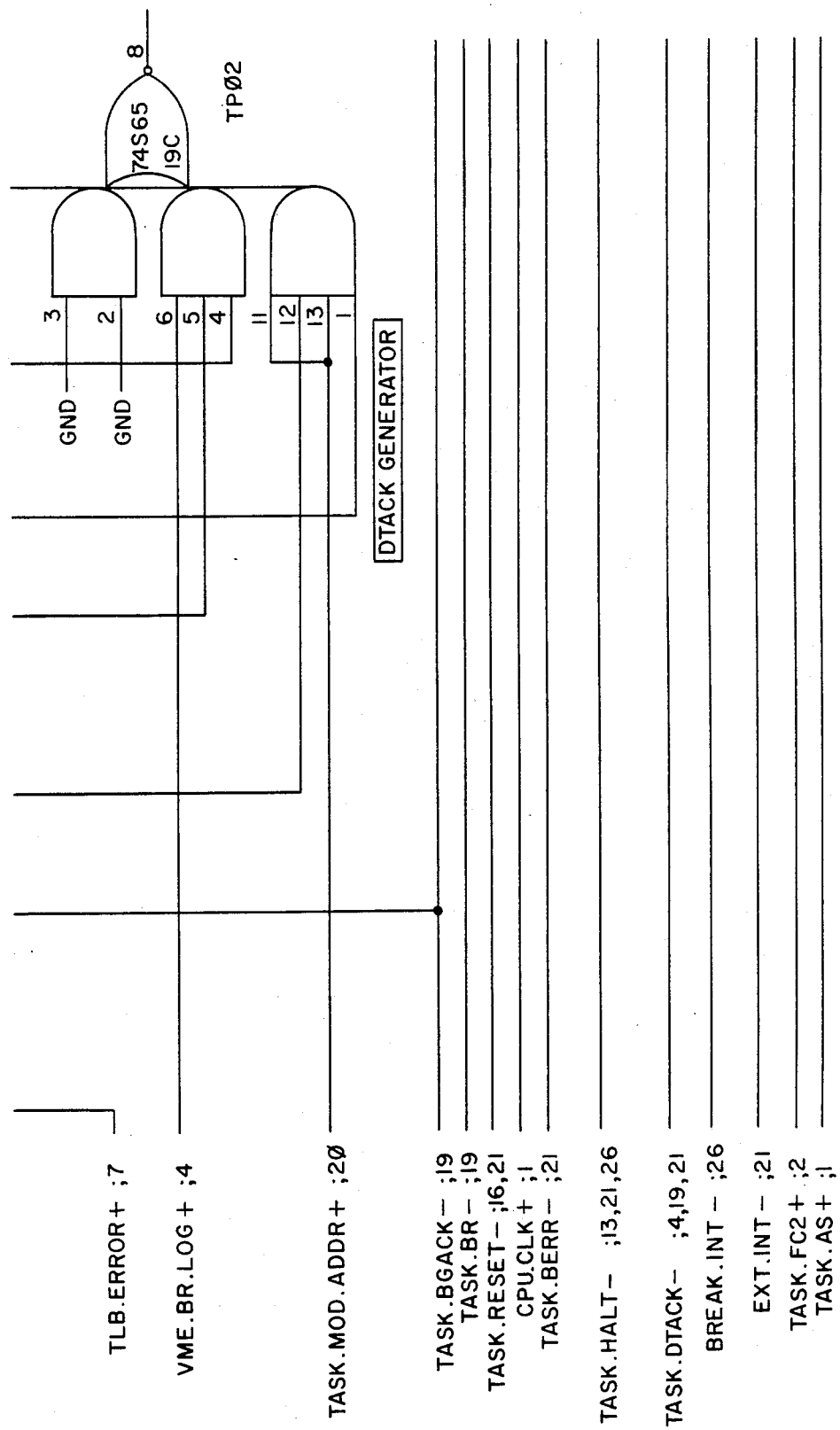
FIG._3Ci.

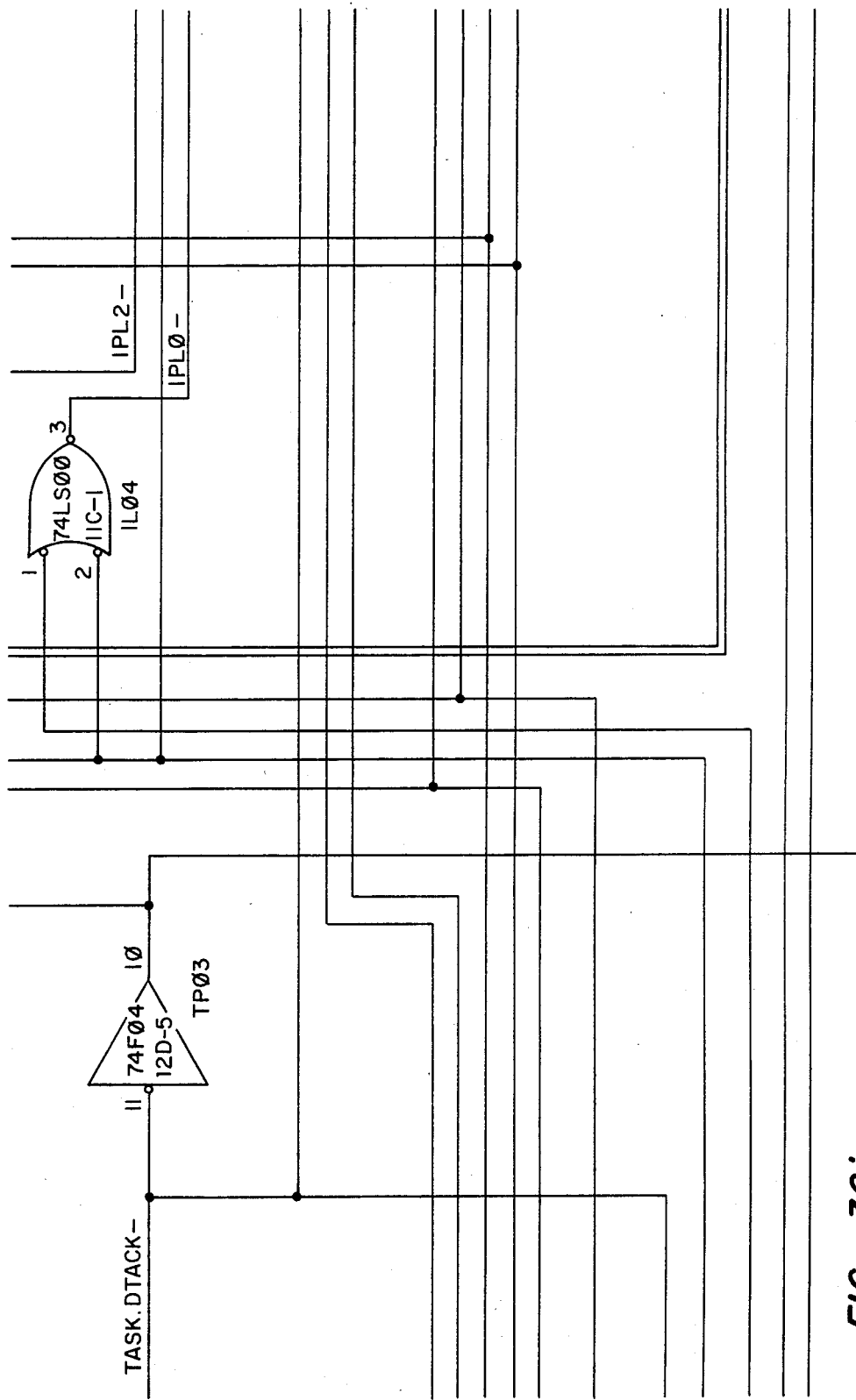
FIG._3Cj.

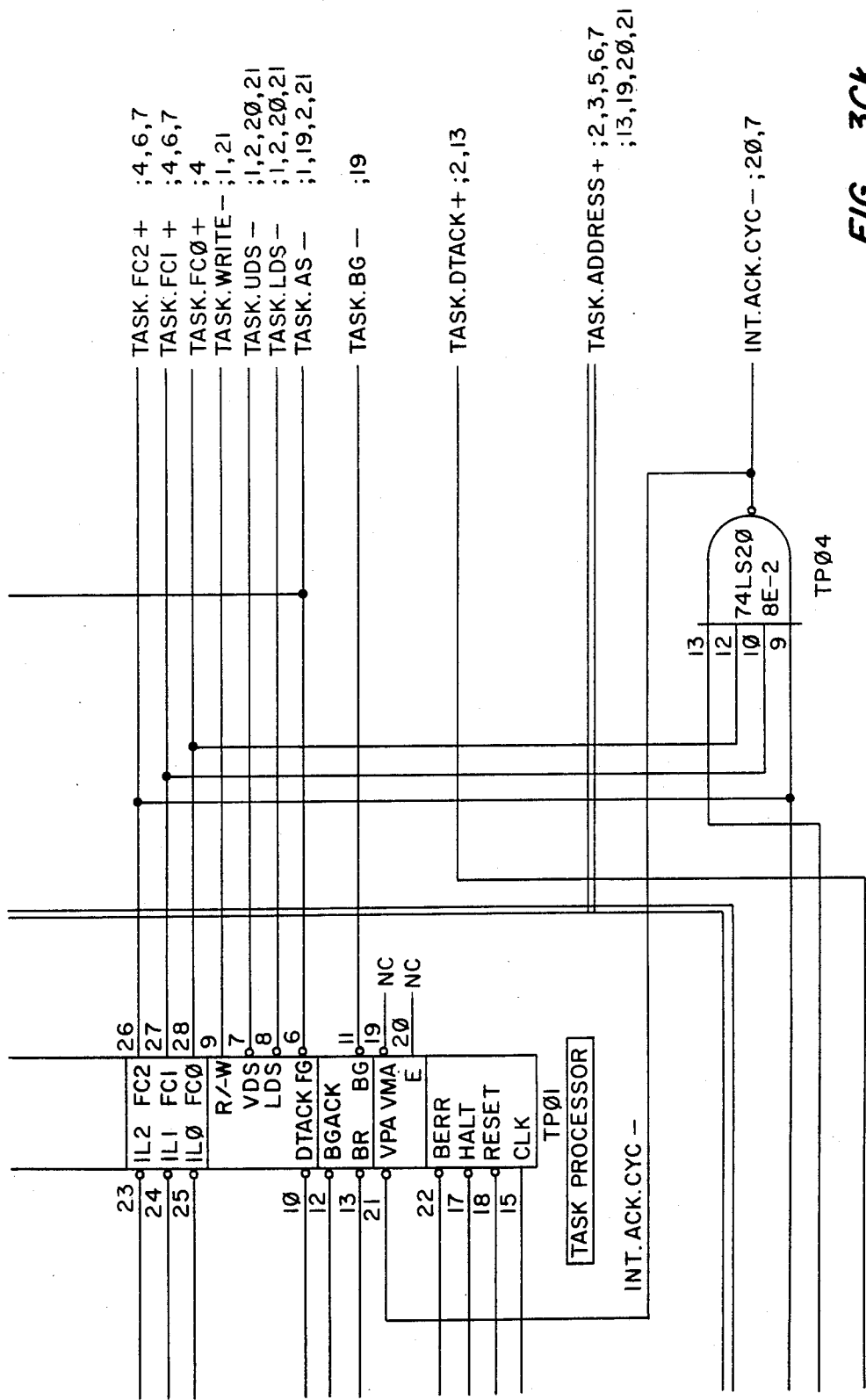
FIG._3Ck.

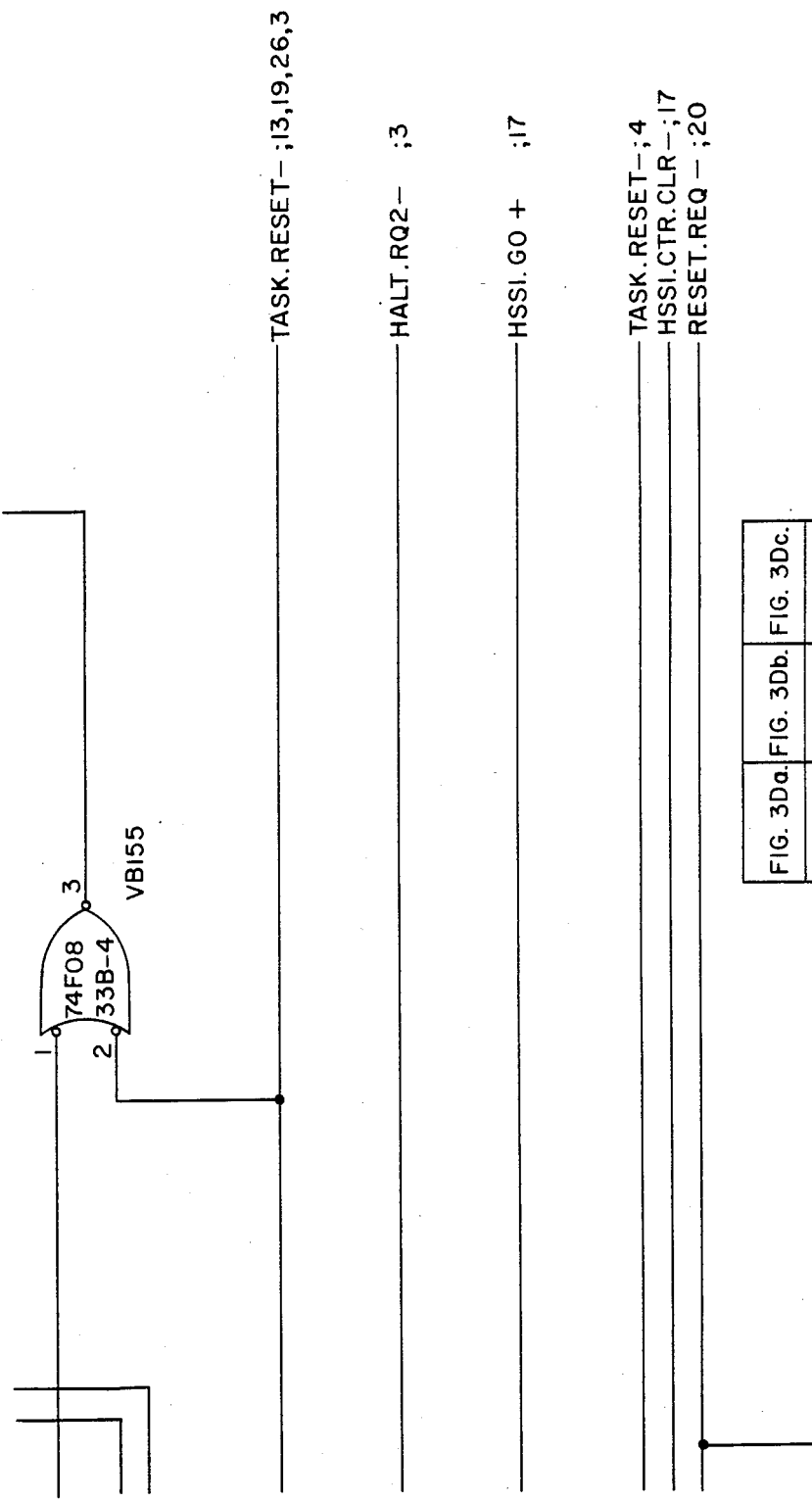

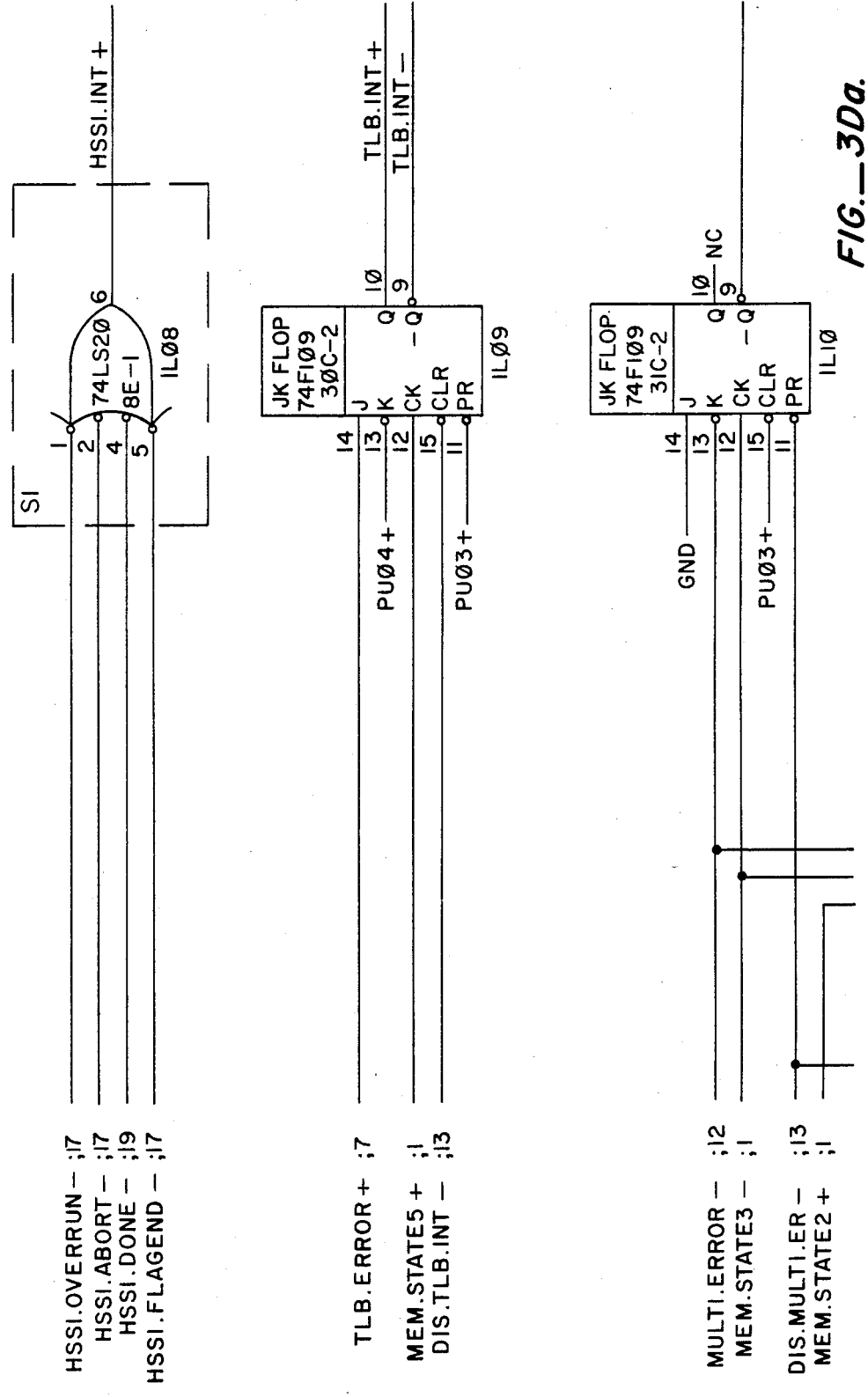
FIG._3Da.

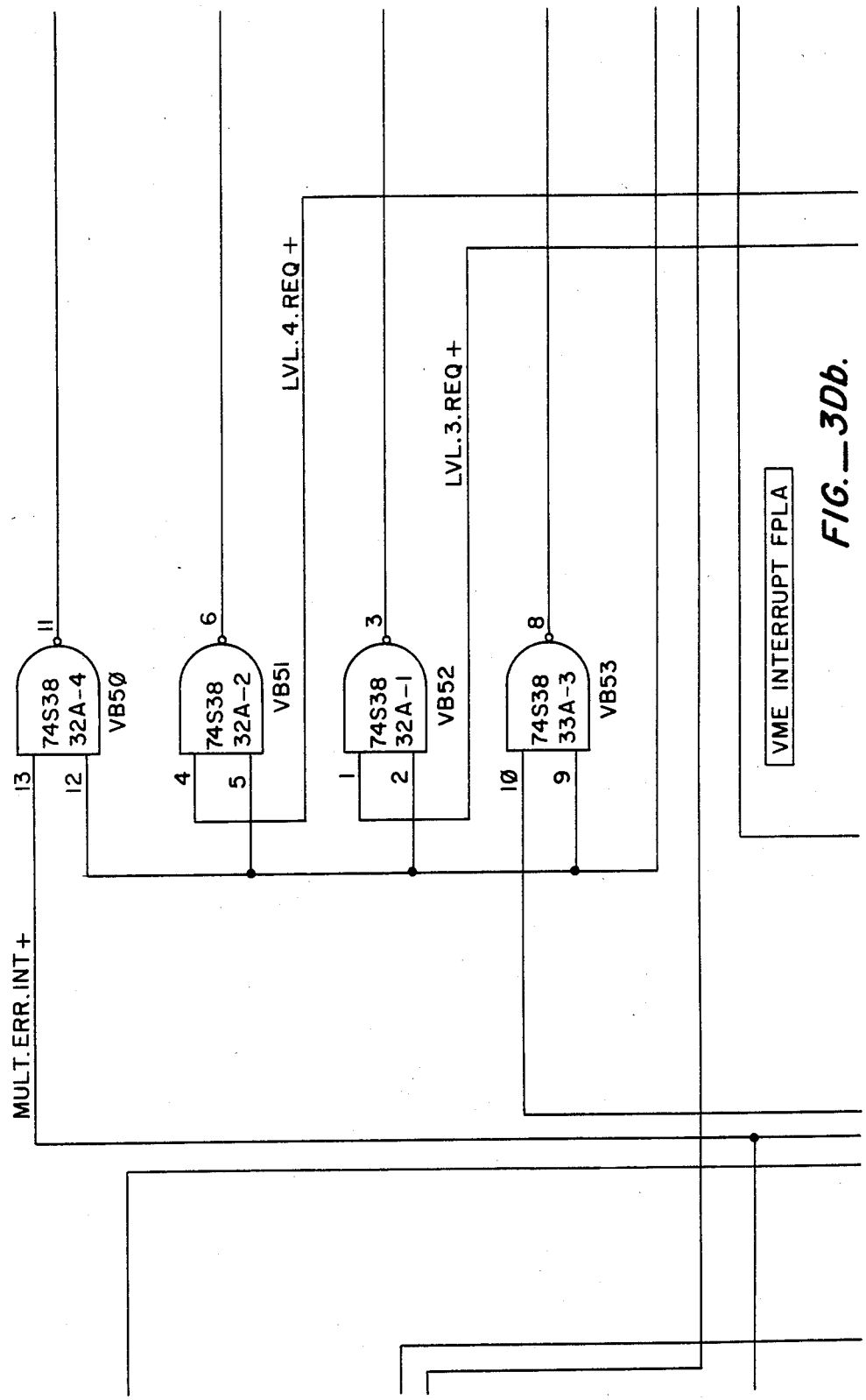
FIG._3Db.

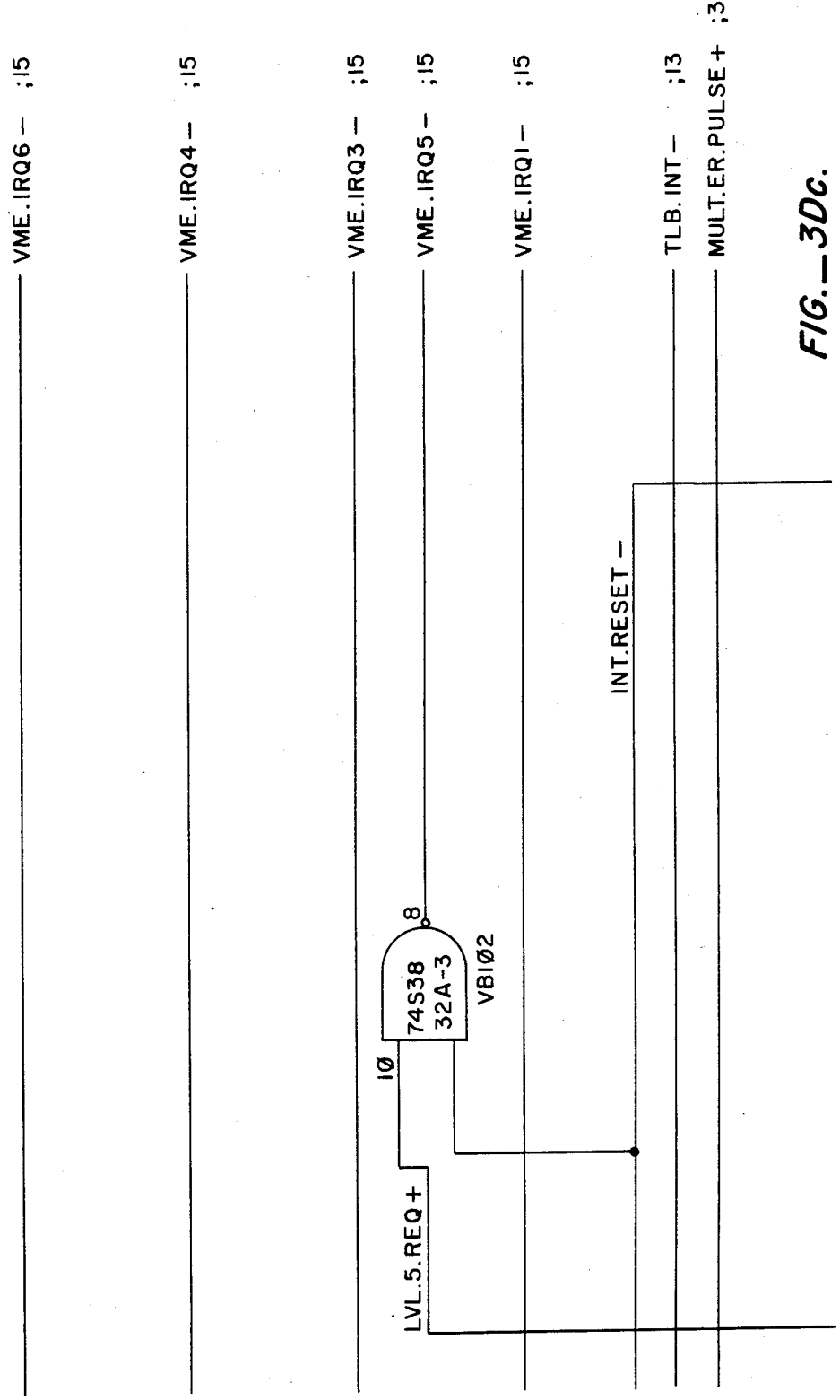
FIG._3Dc.

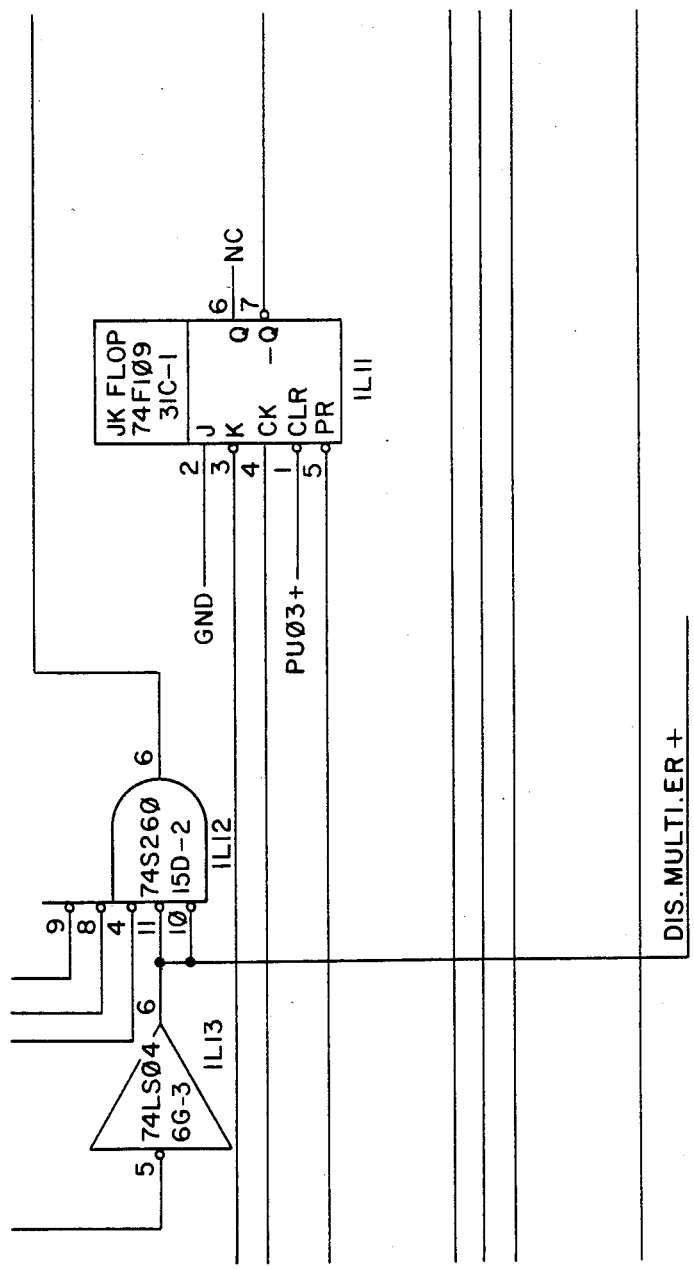
FIG._3Dd.

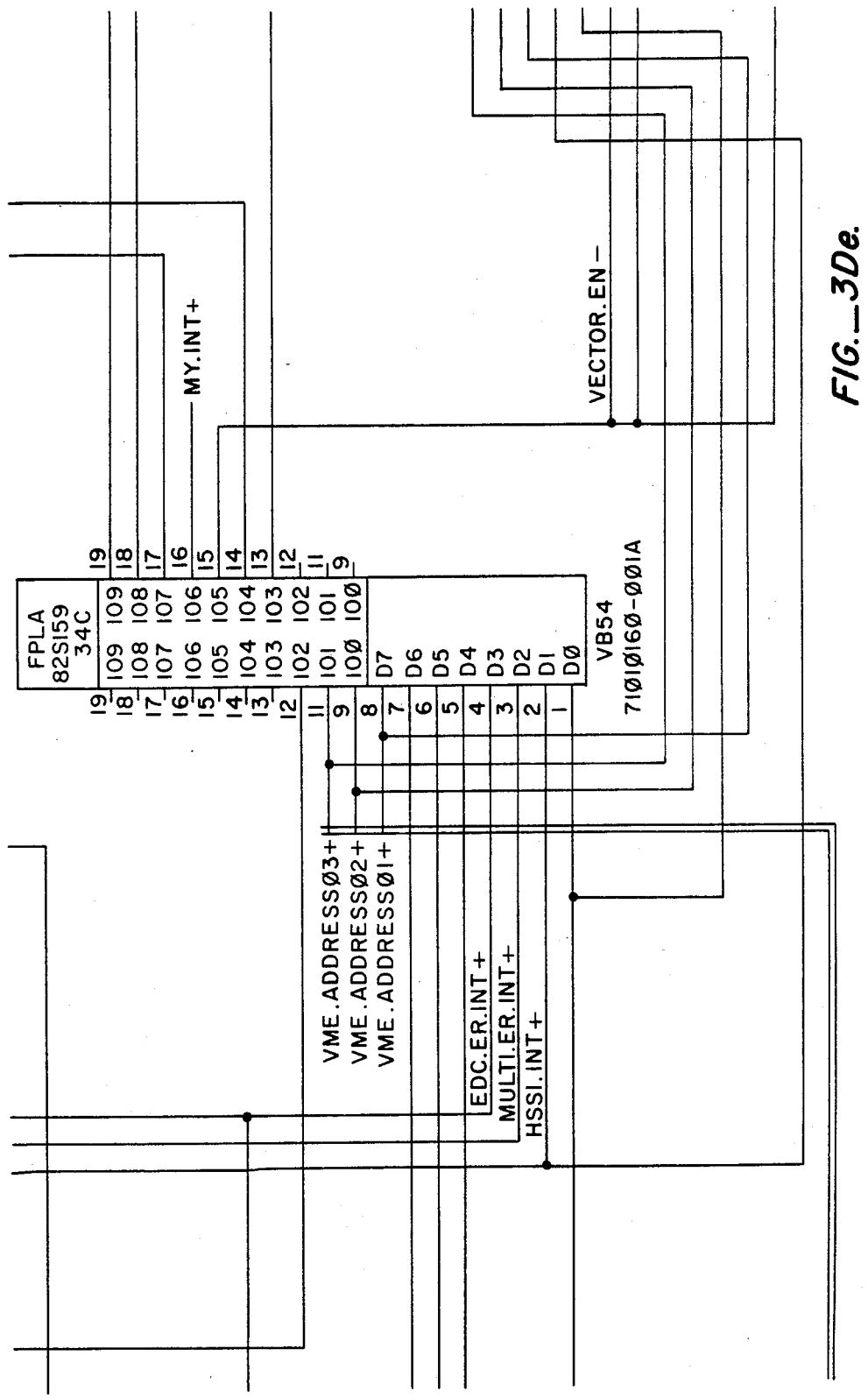
FIG._3De.

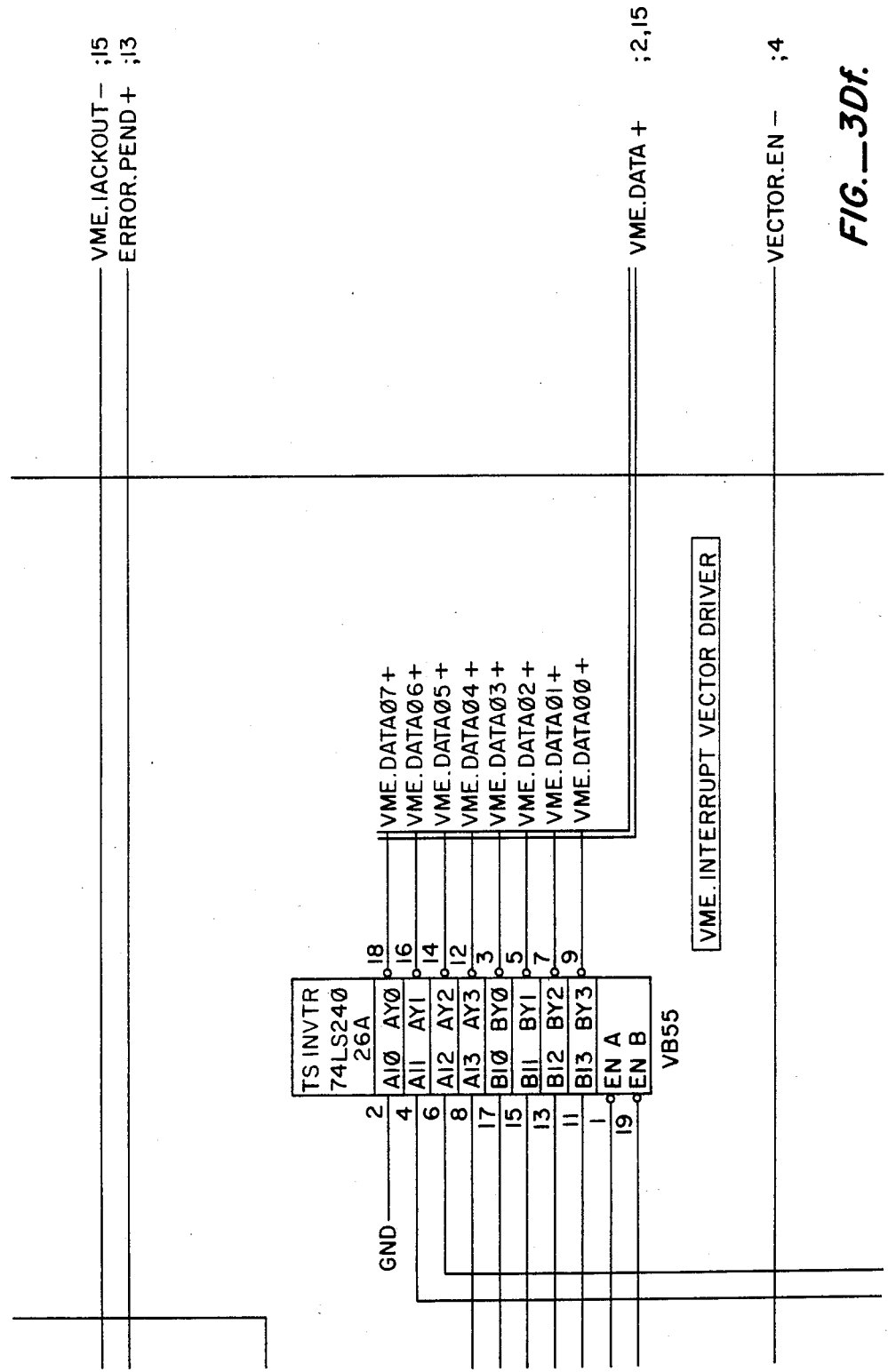
FIG._3Df.

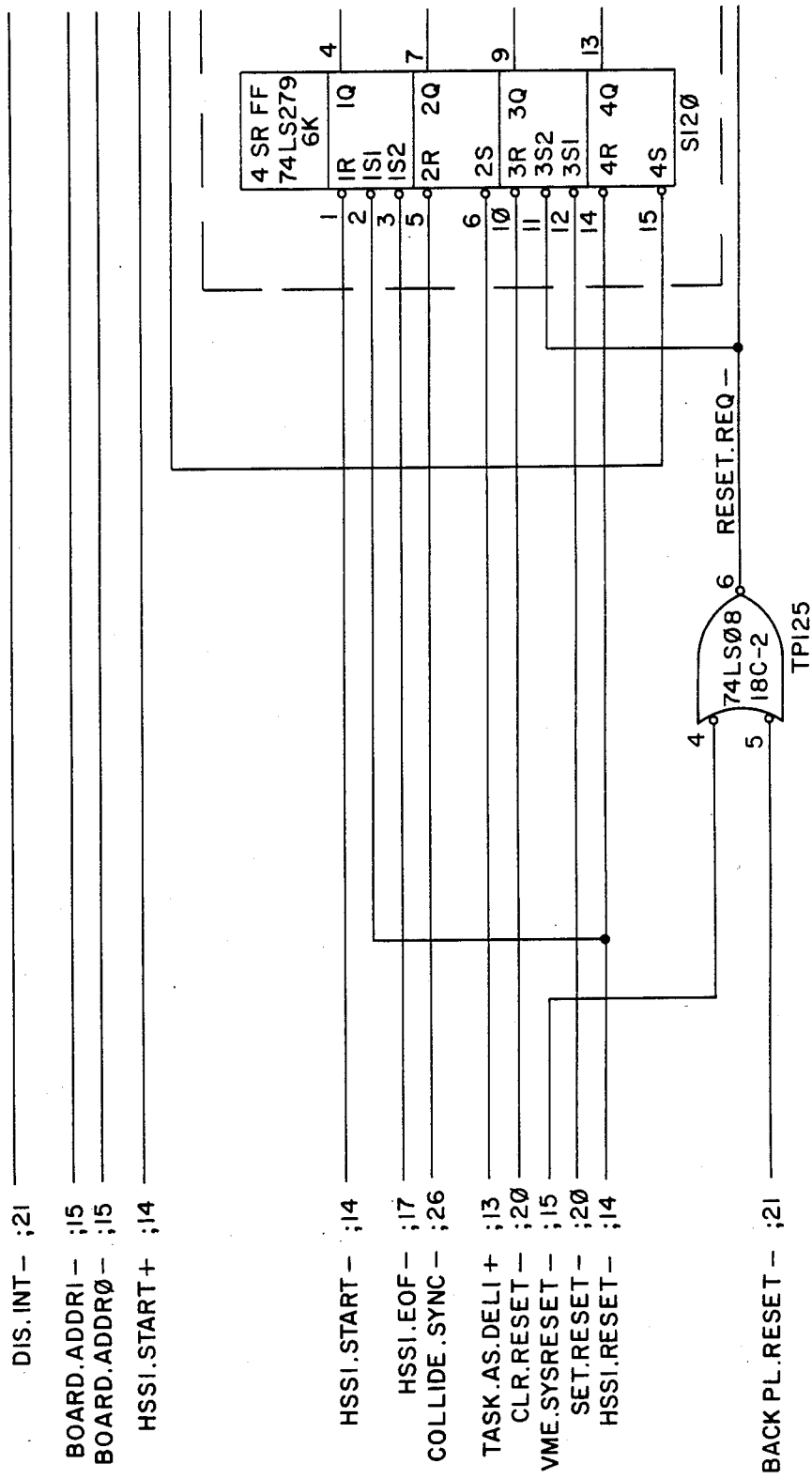

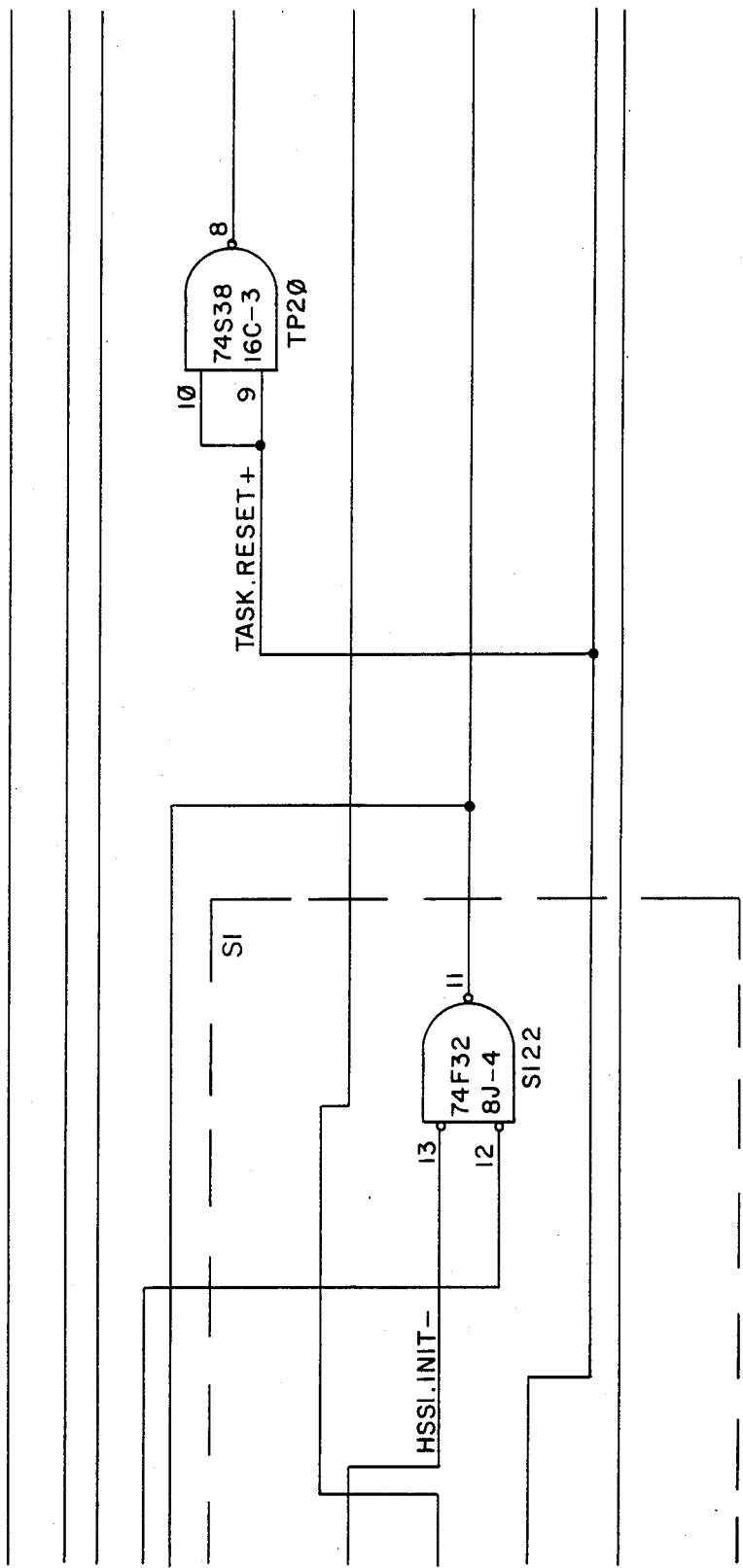

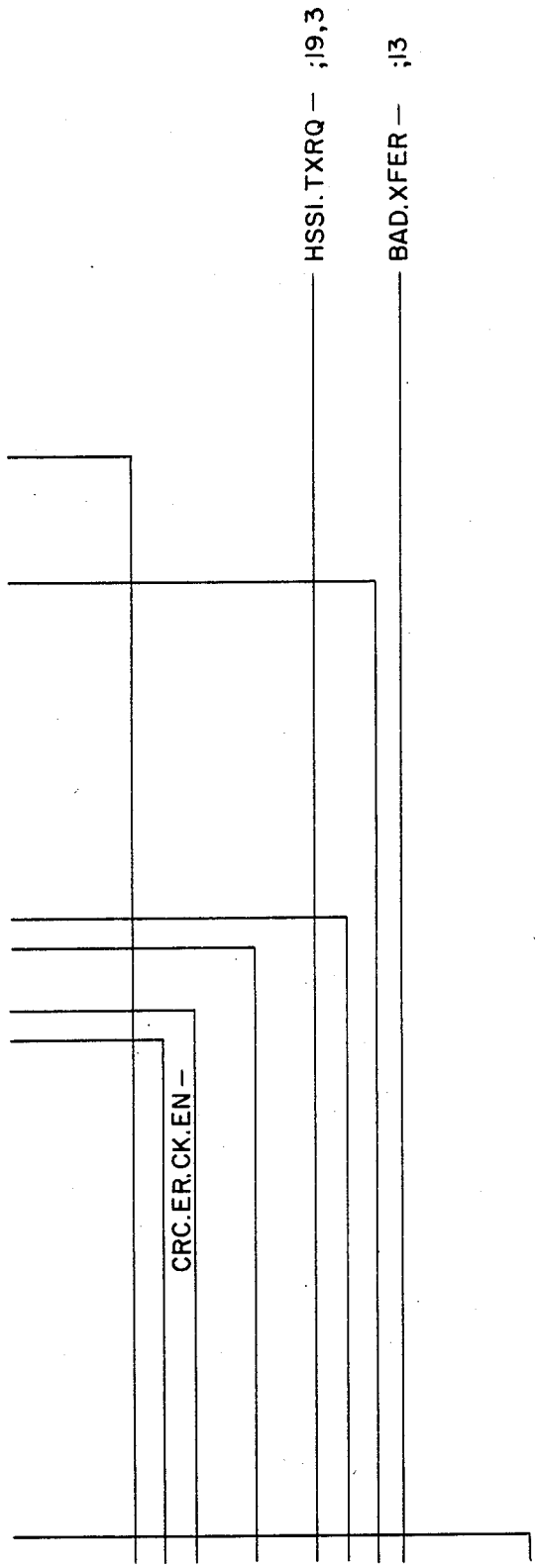
FIG._3EI.
FIG._3E.

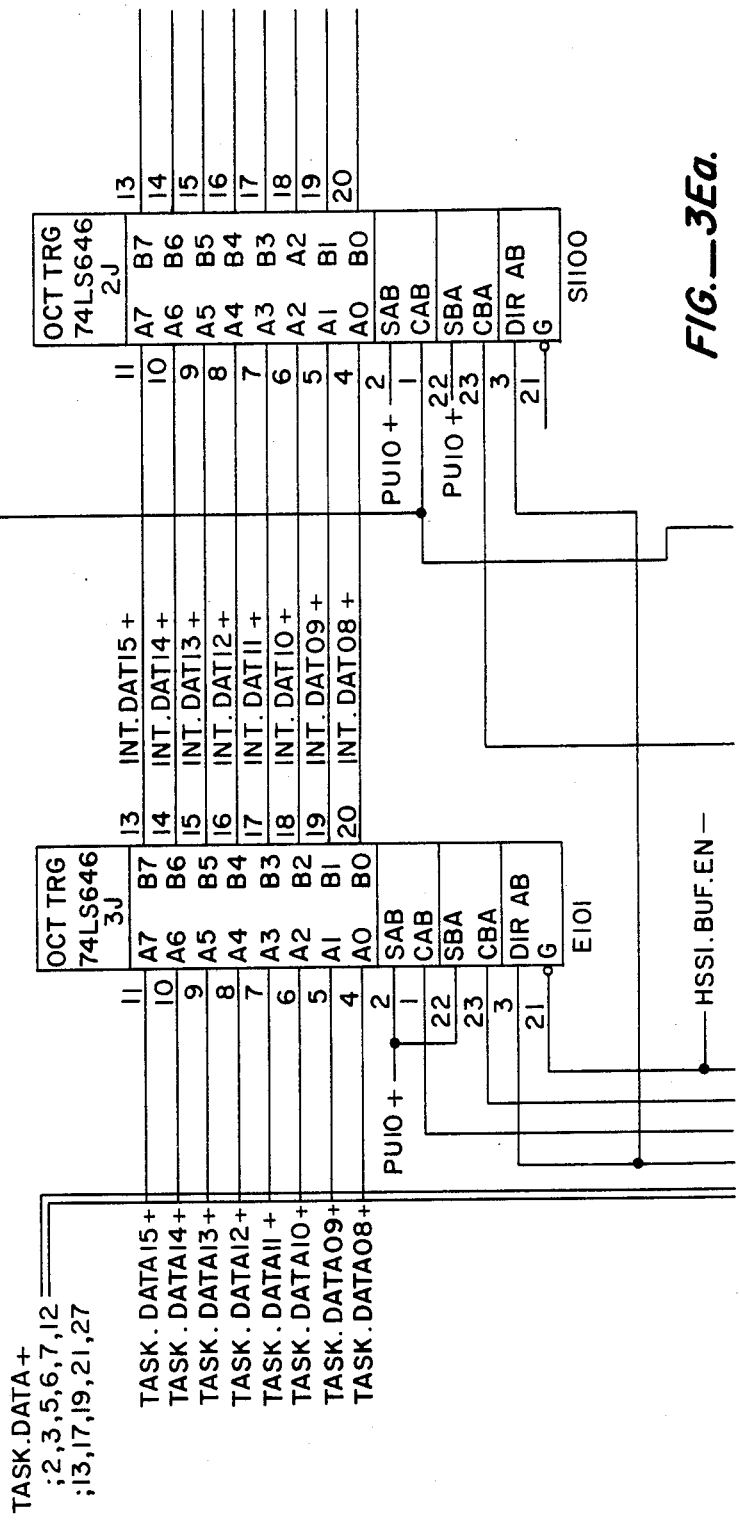

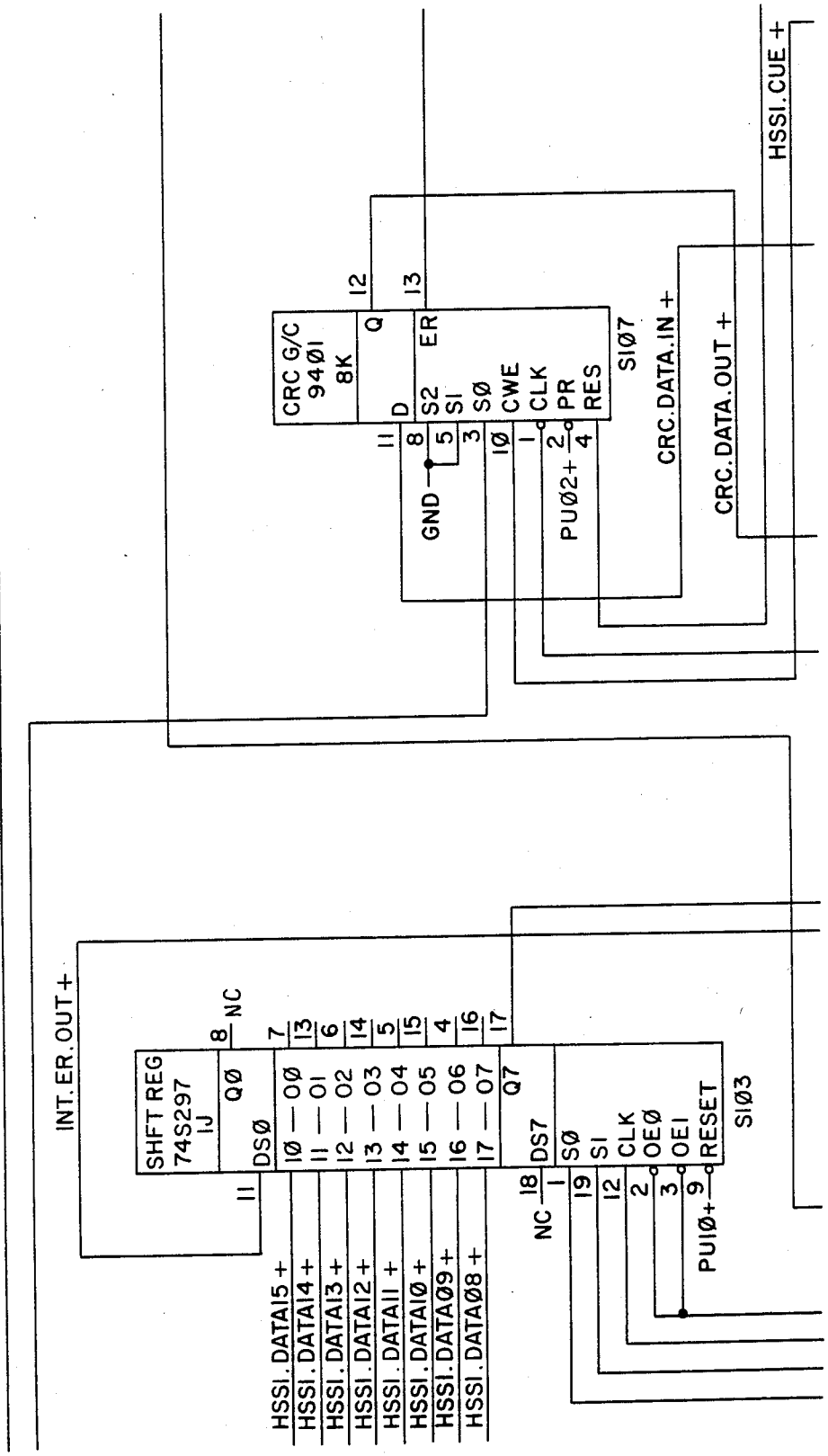
FIG._3Eb.

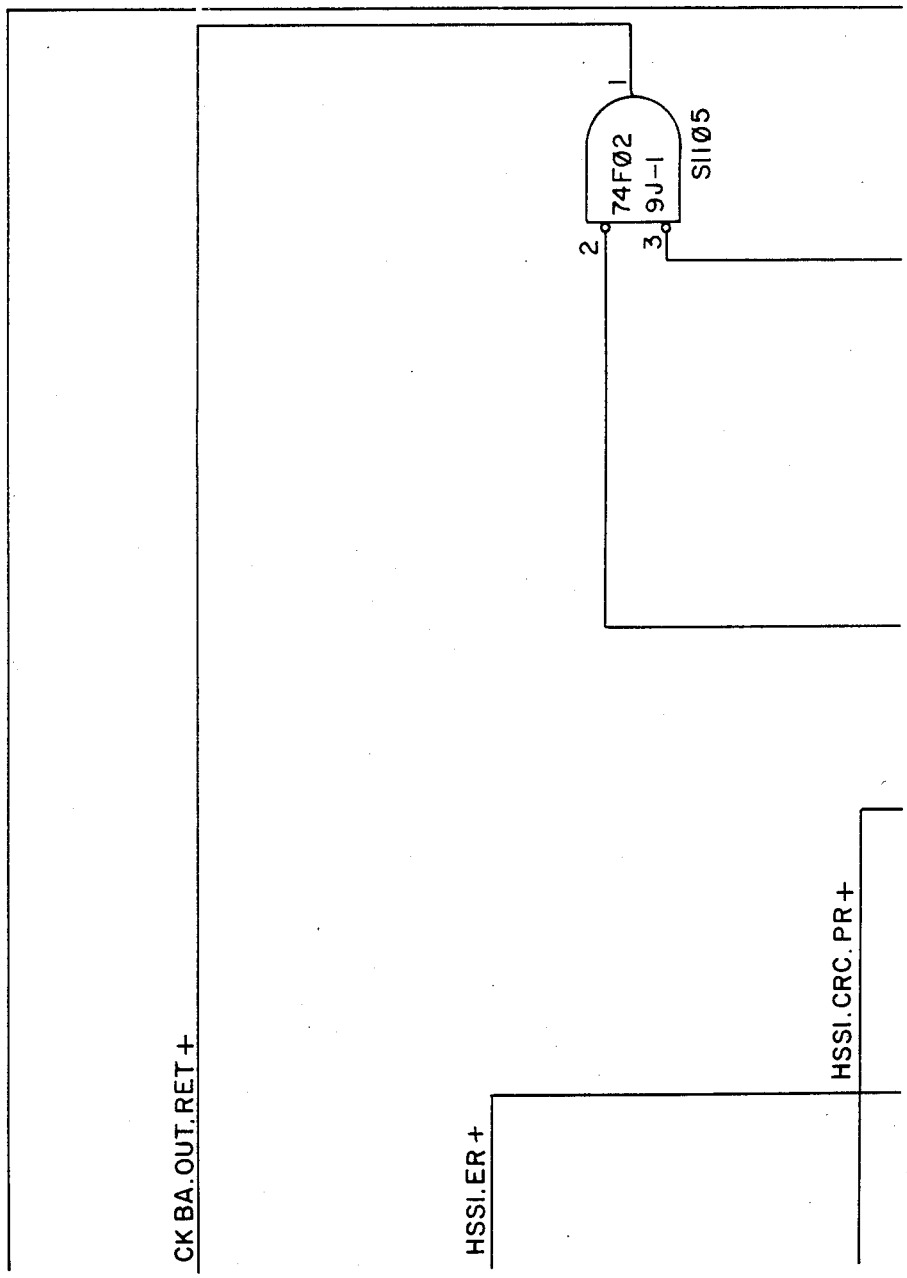
FIG._3Ec.

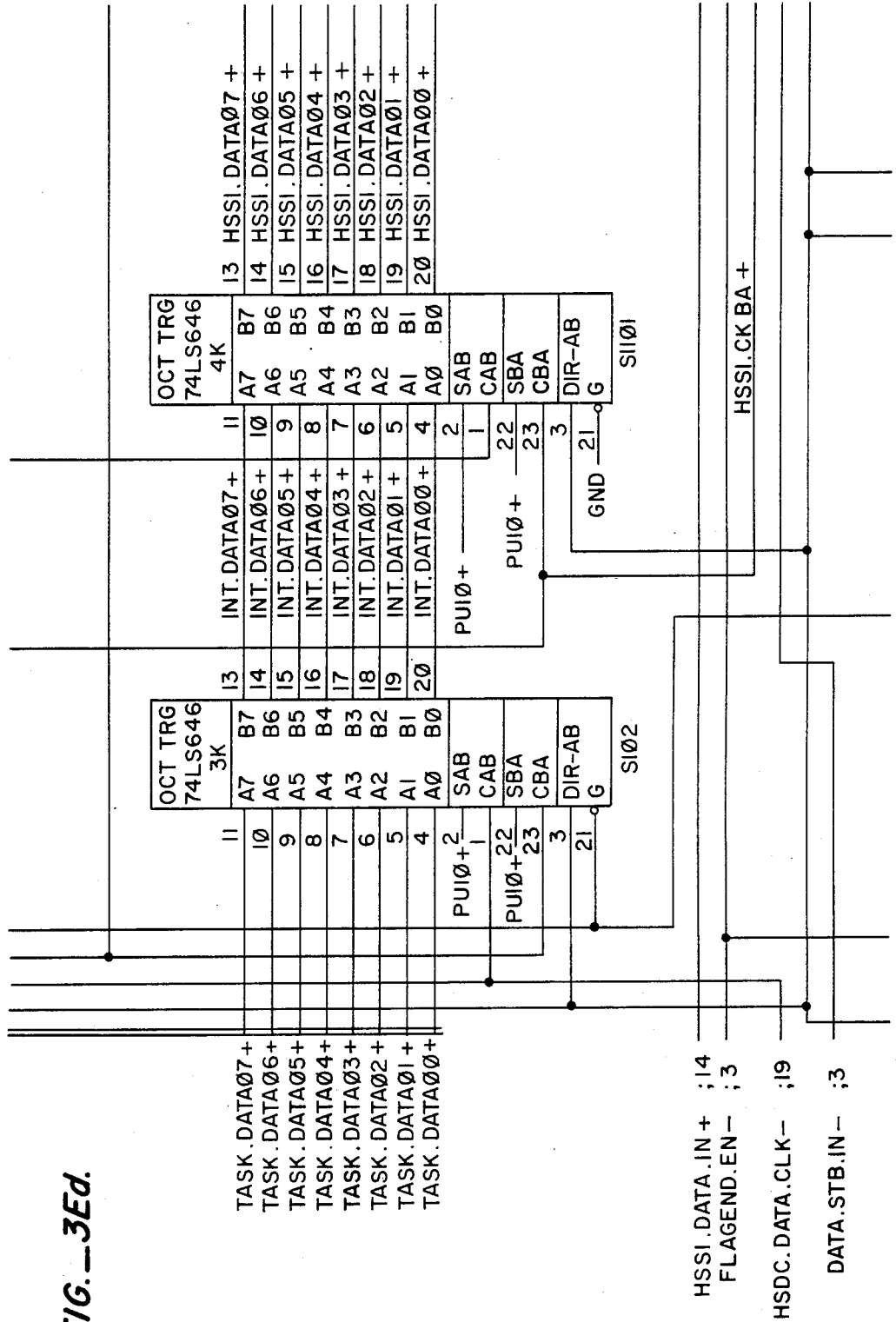

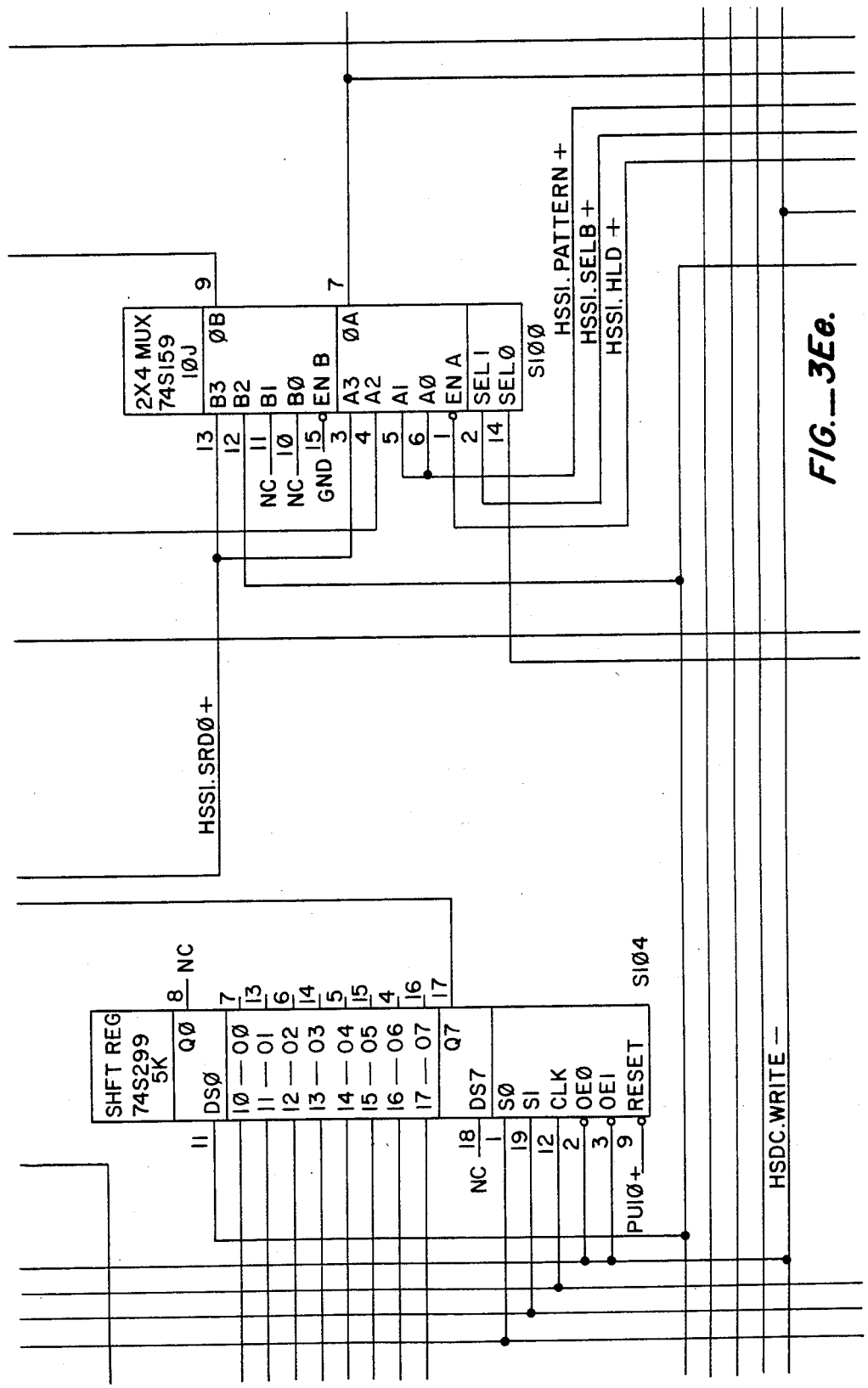
FIG._3Ee.

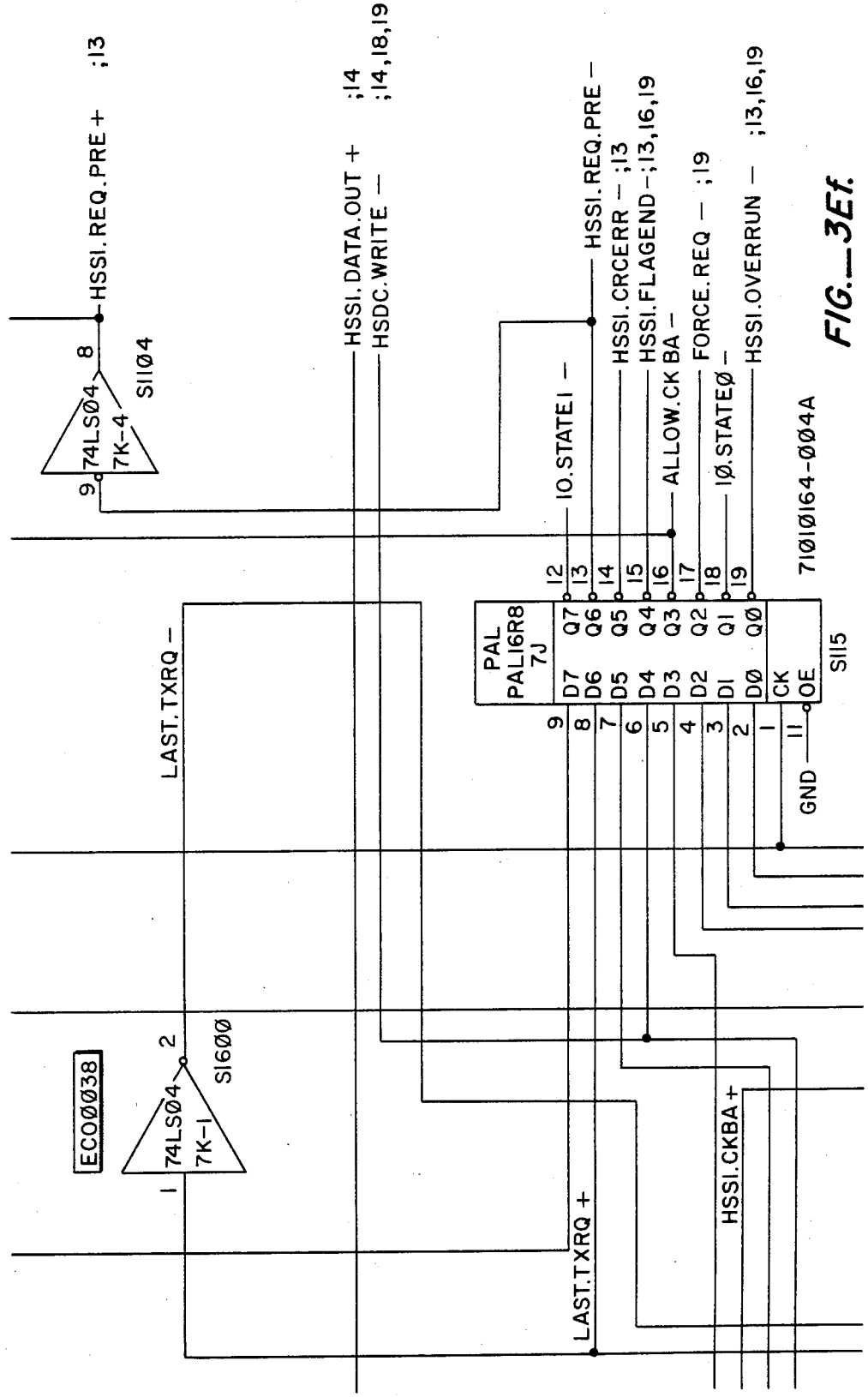
FIG.—3Ef.

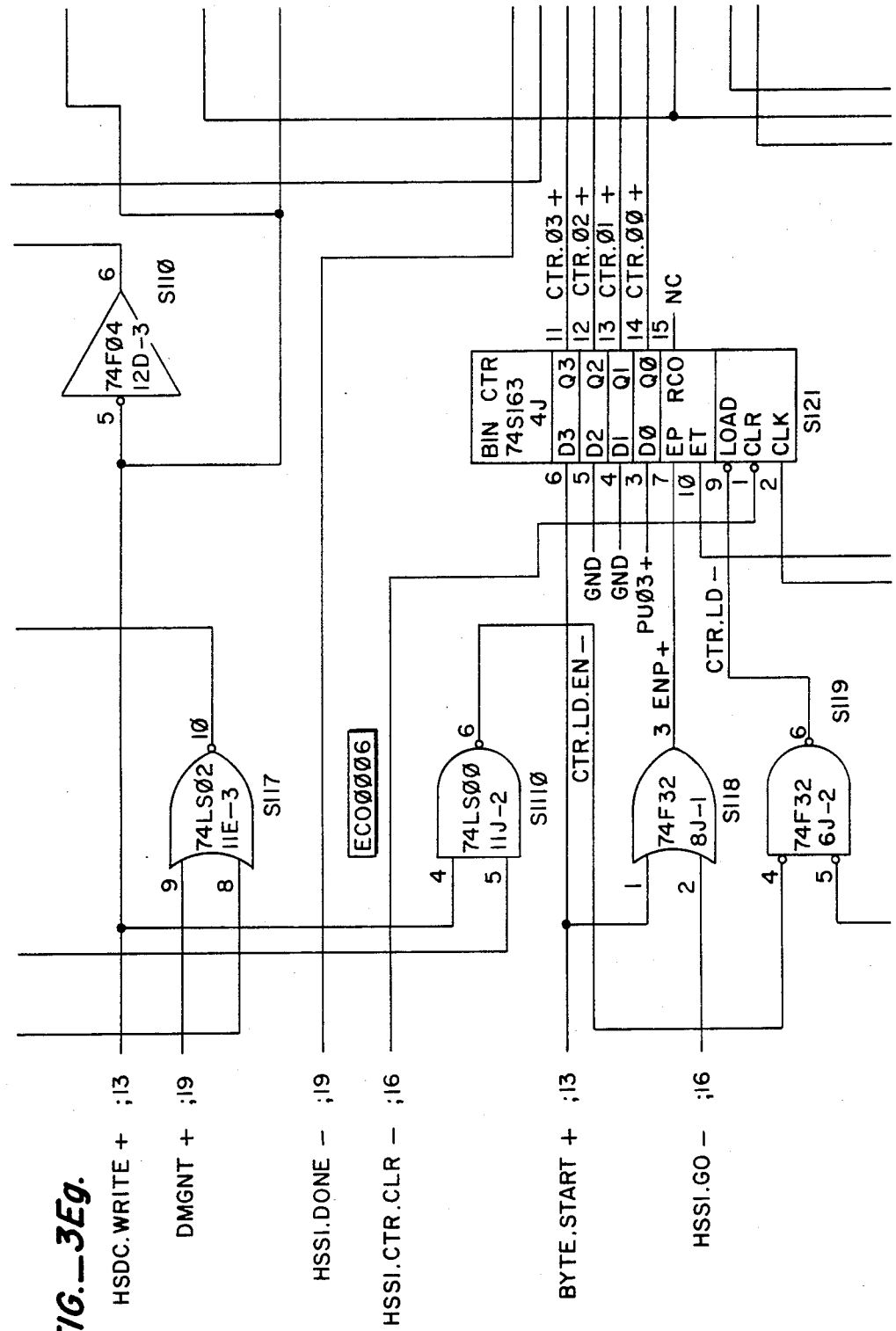

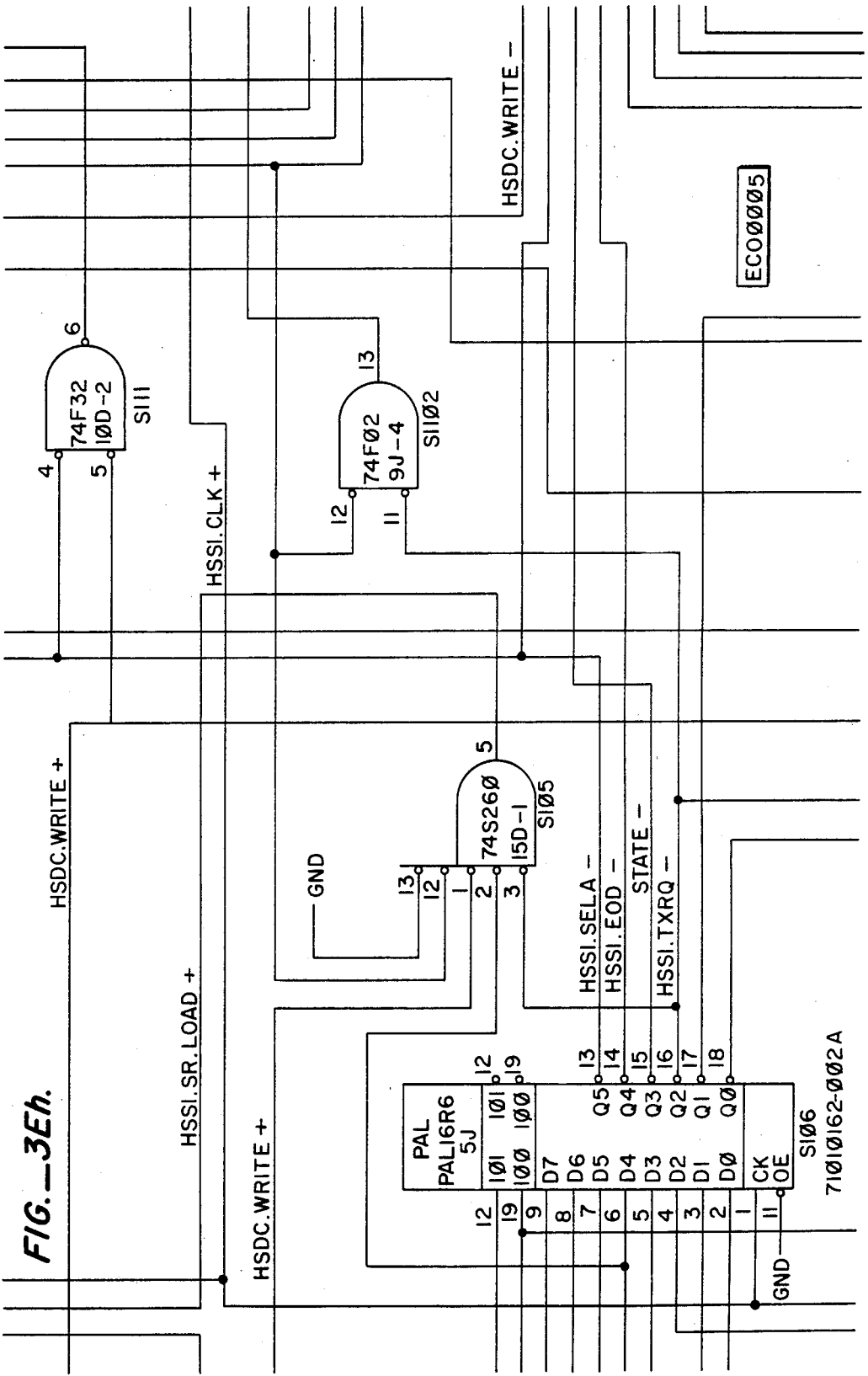
FIG._3Eh.

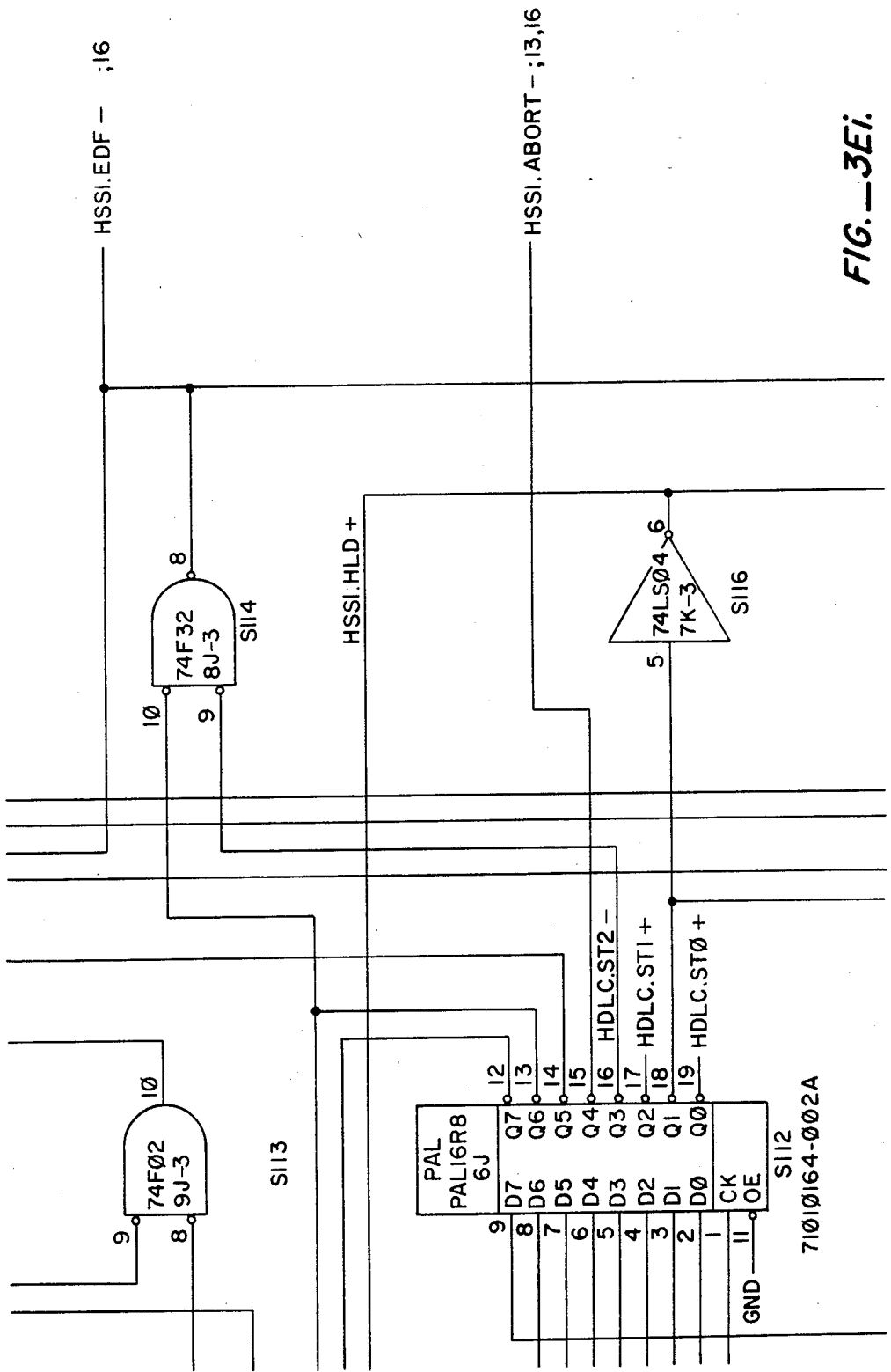
FIG._3Ei.

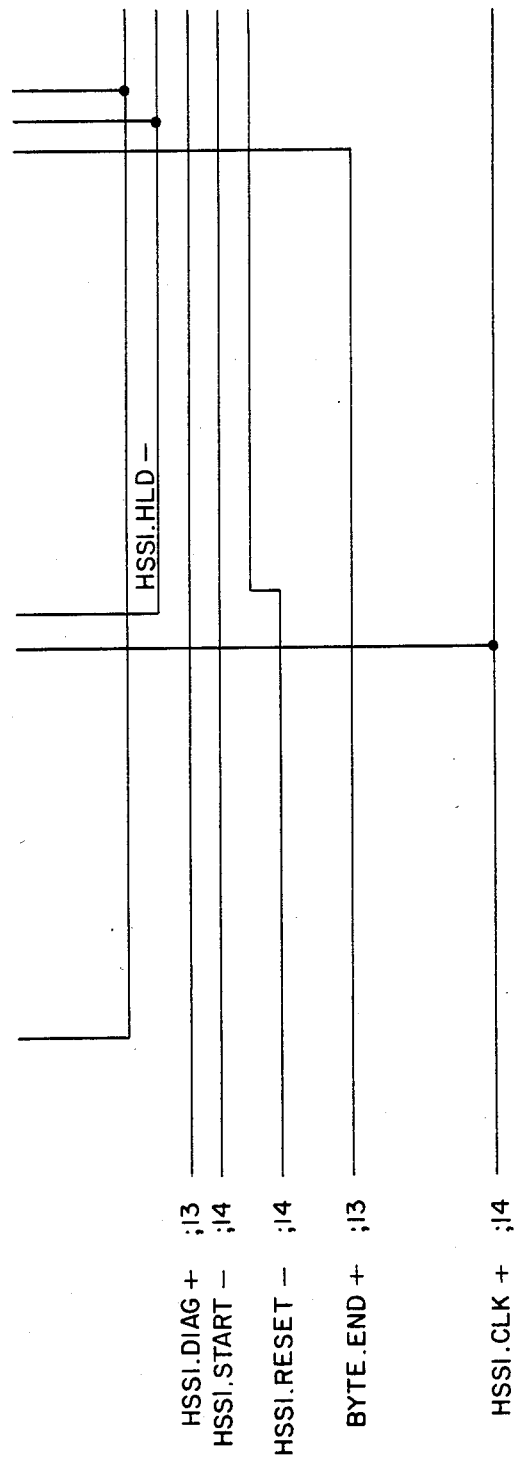
FIG._3Ej.

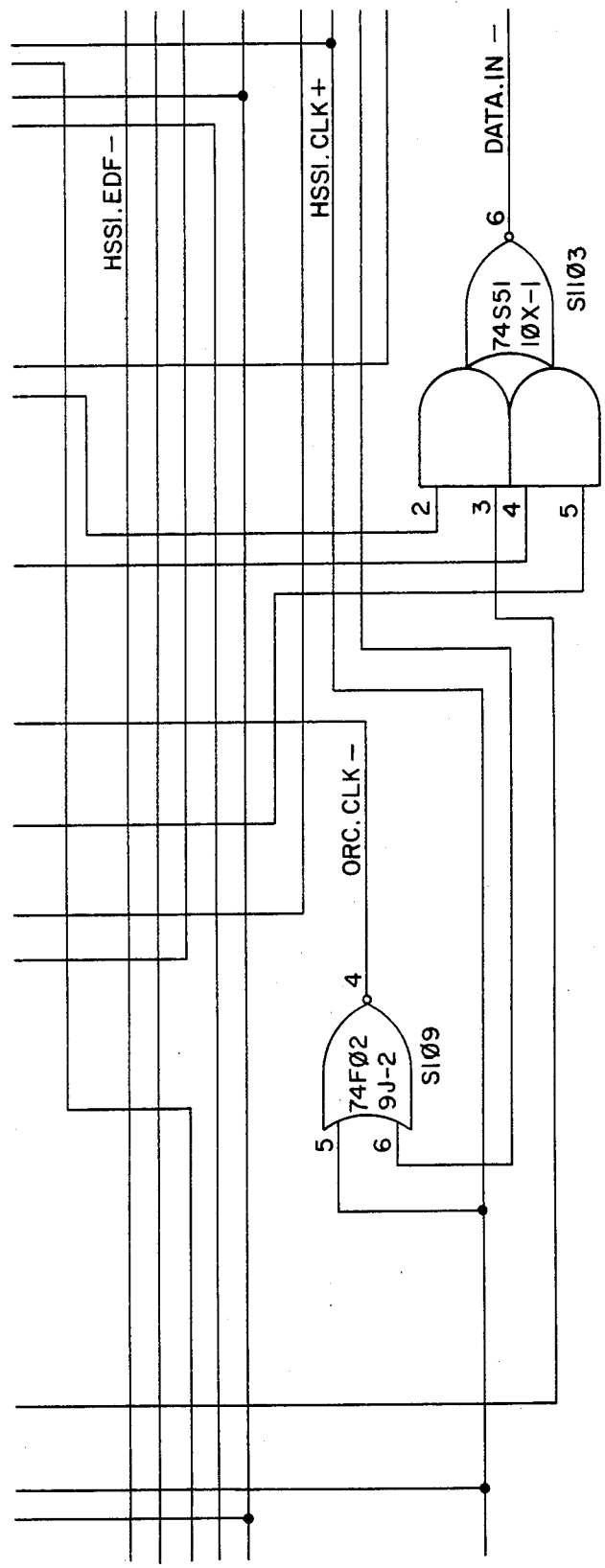
FIG.—3Ek.

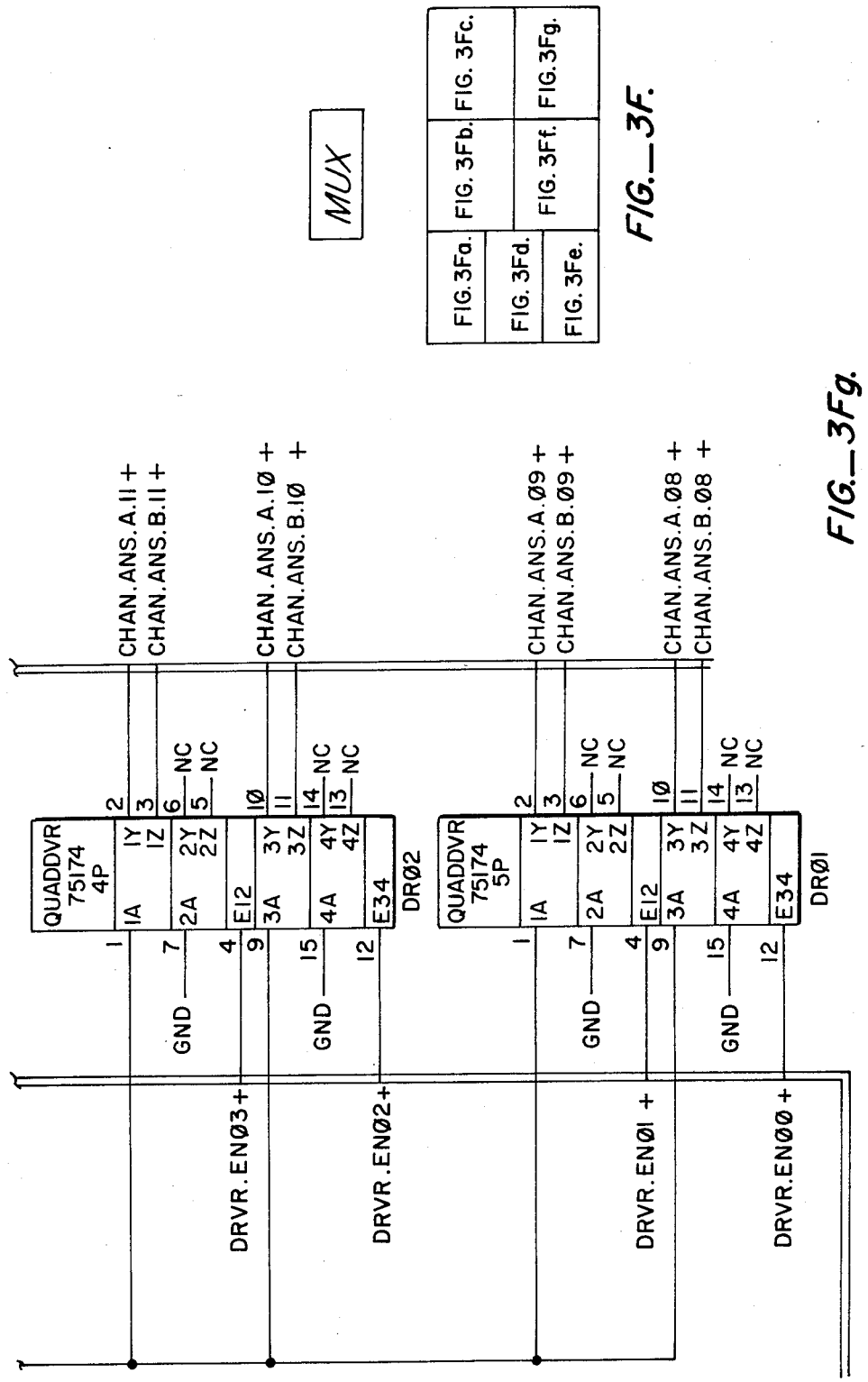

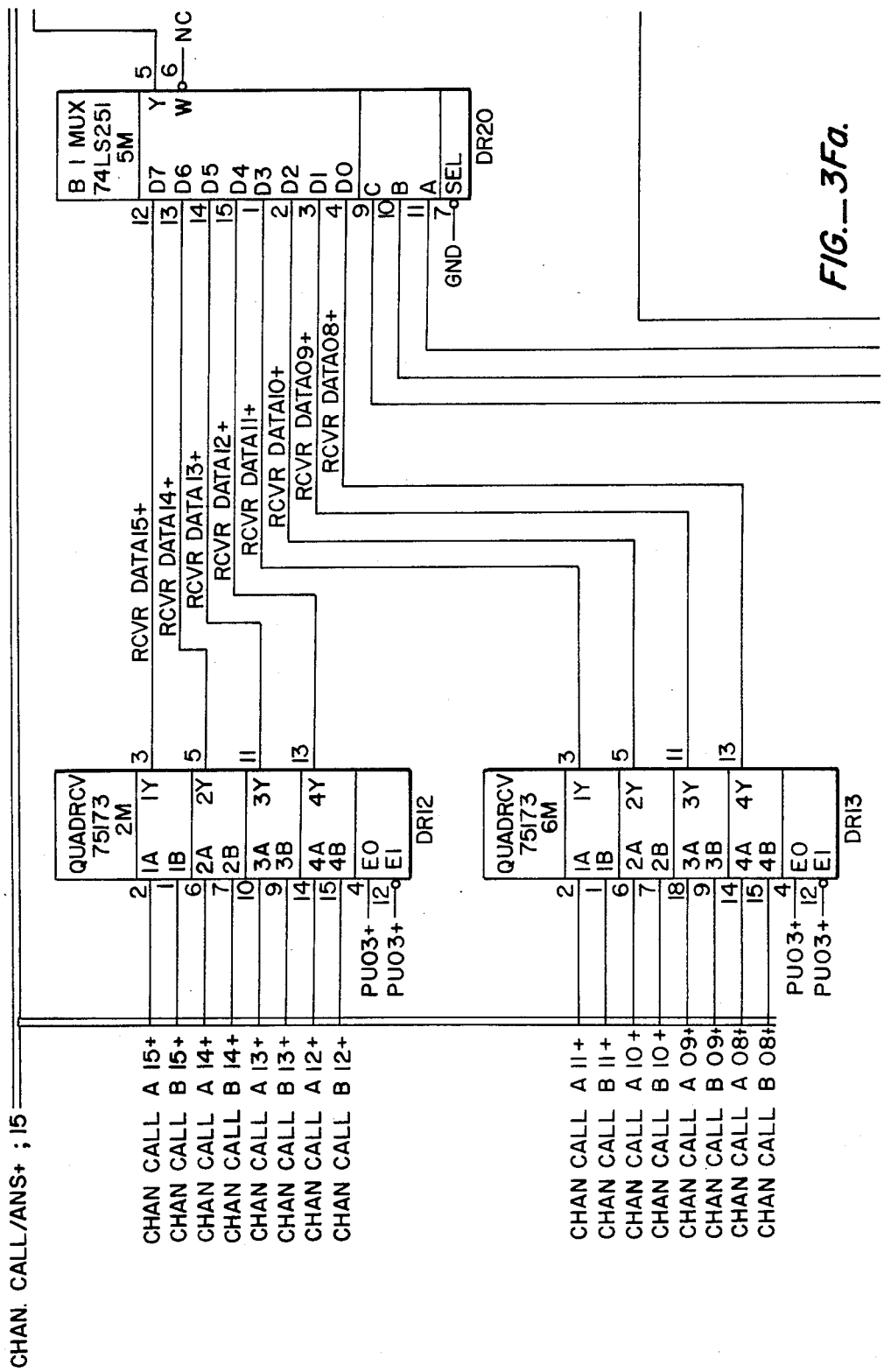
FIG._3Fa.

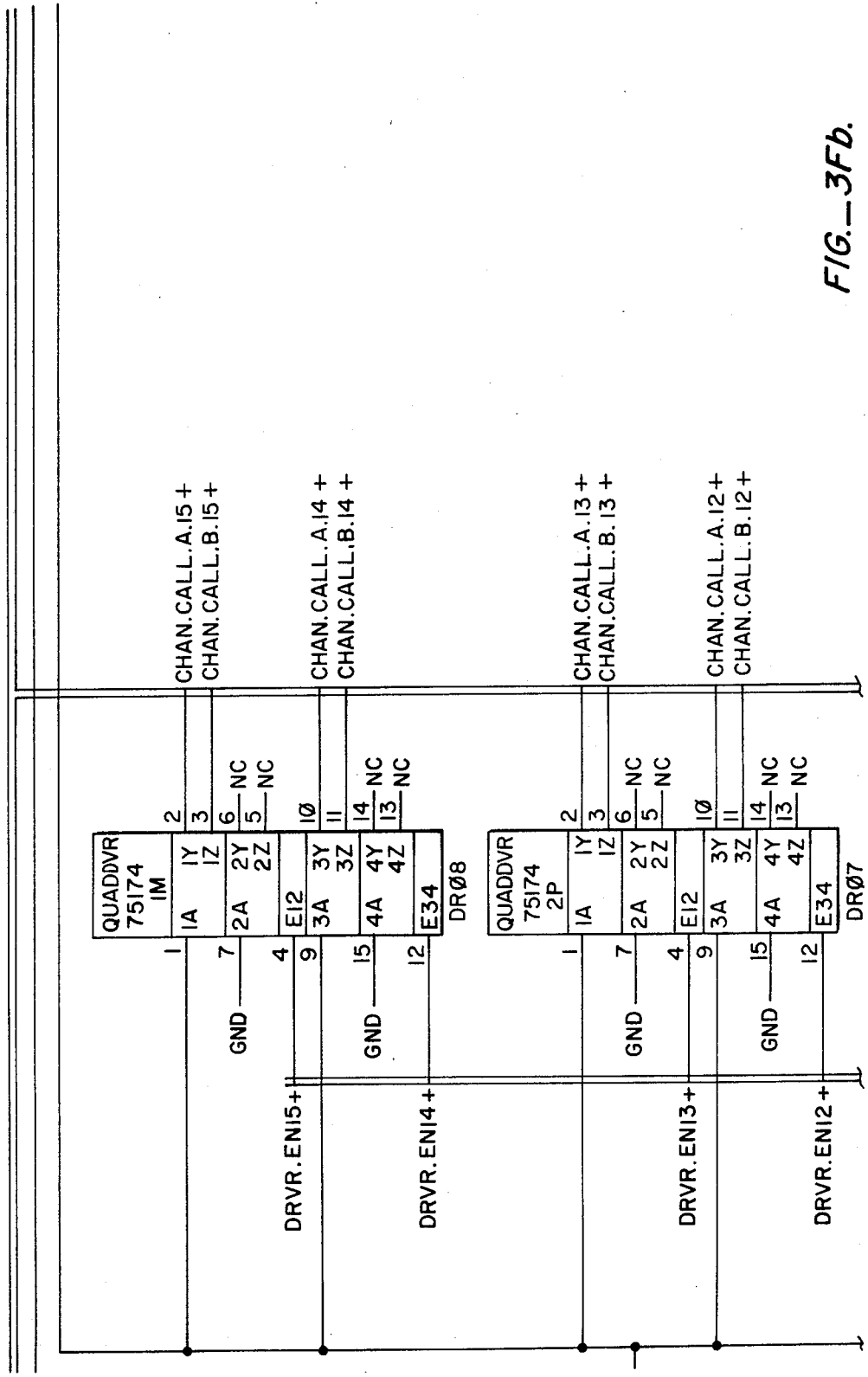

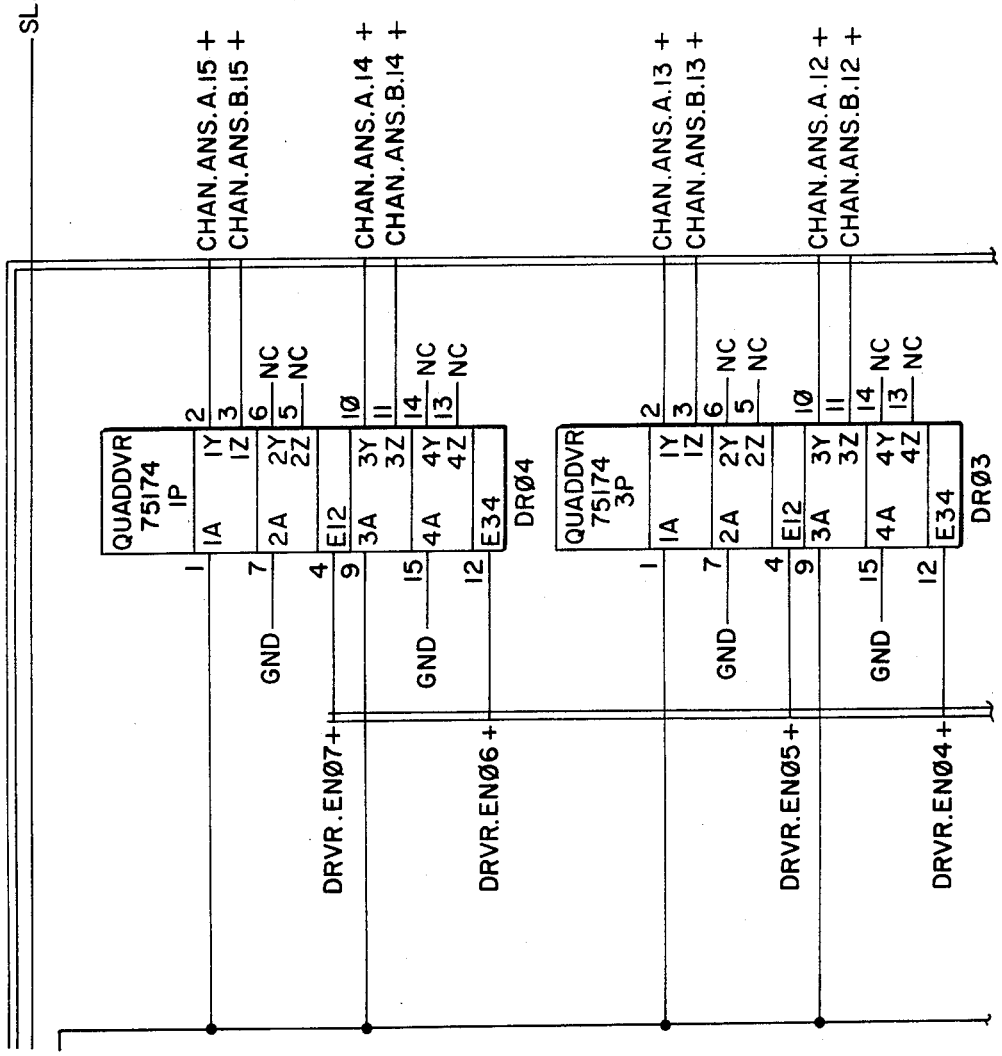

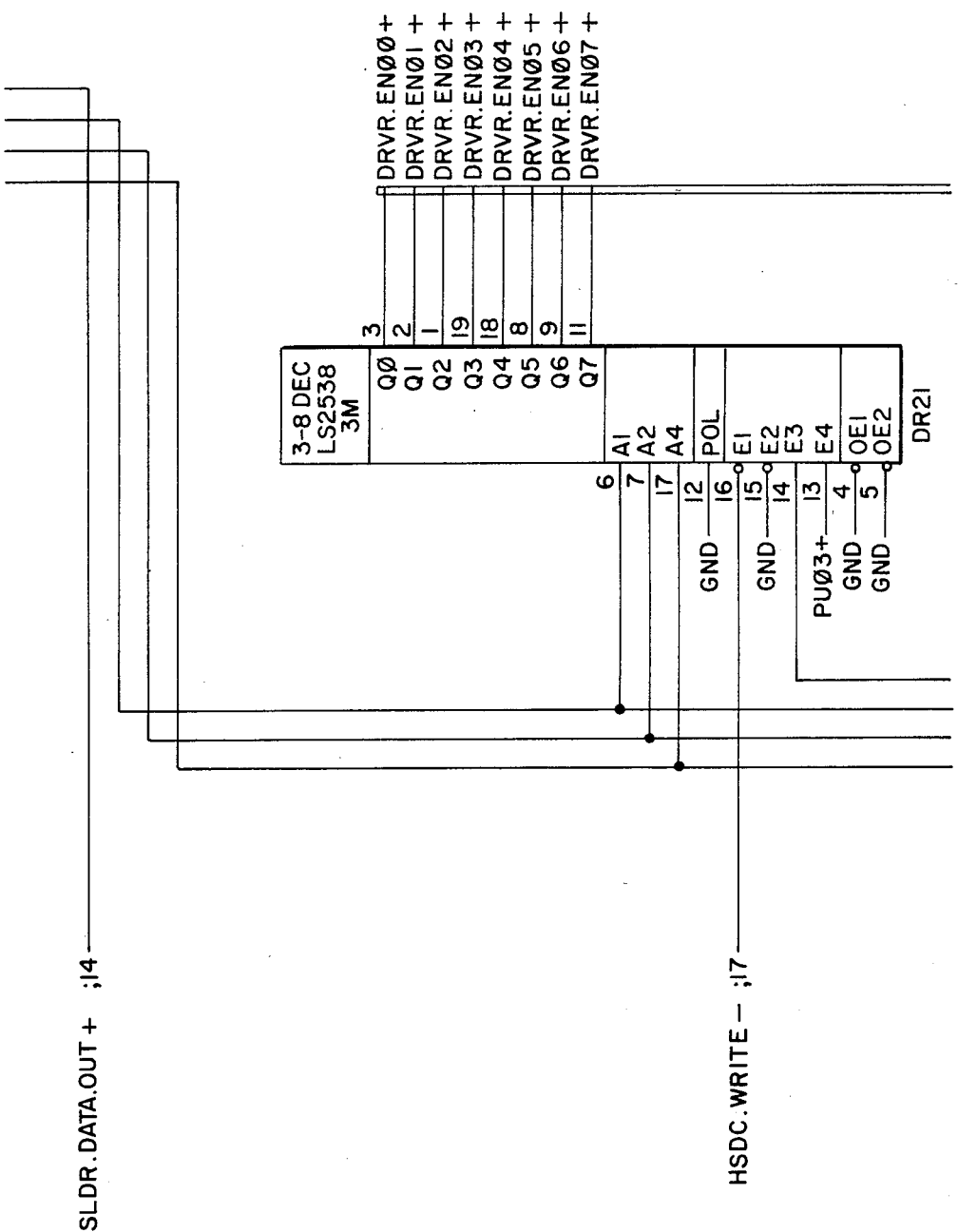
FIG._3Fd.

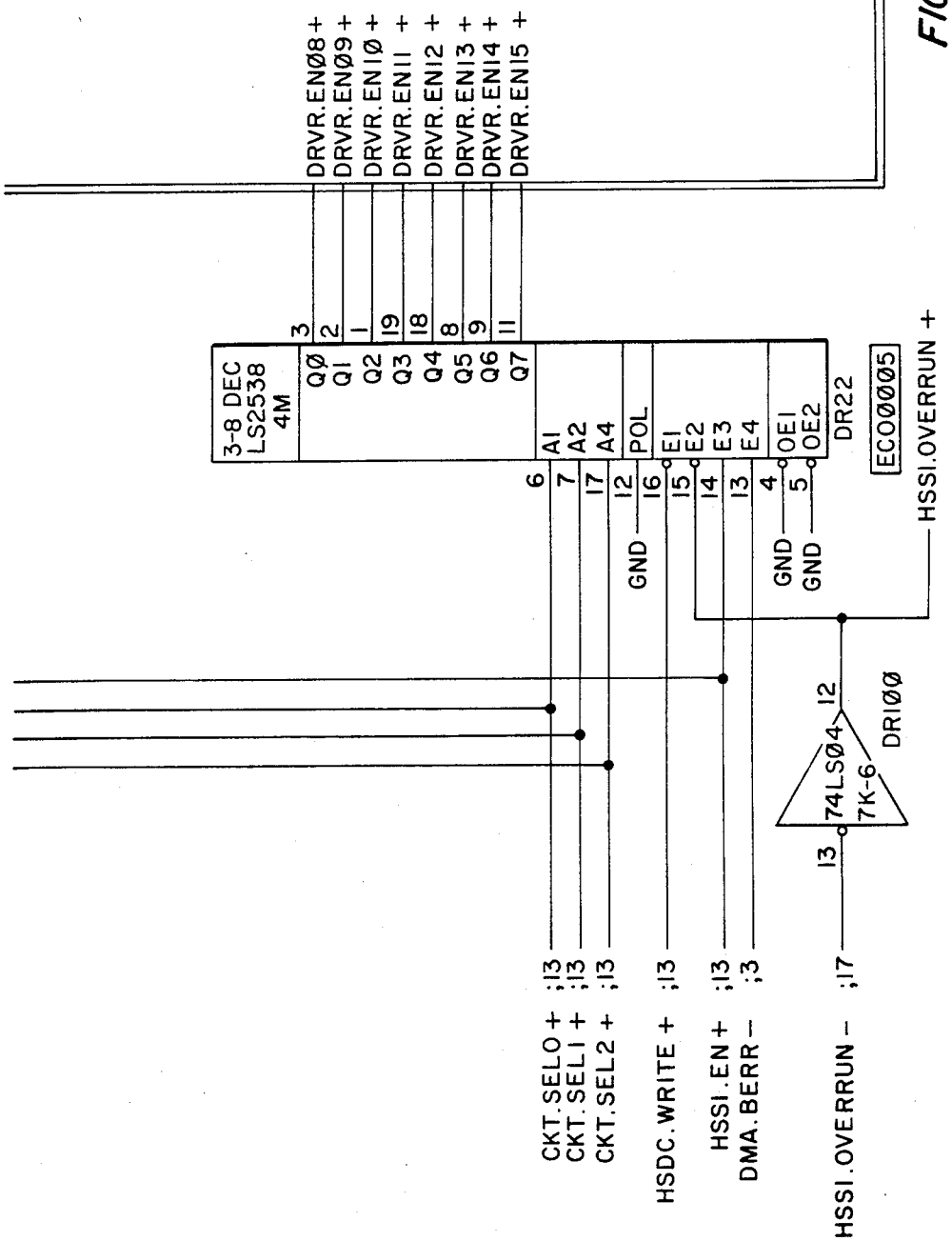
FIG._3Fe.

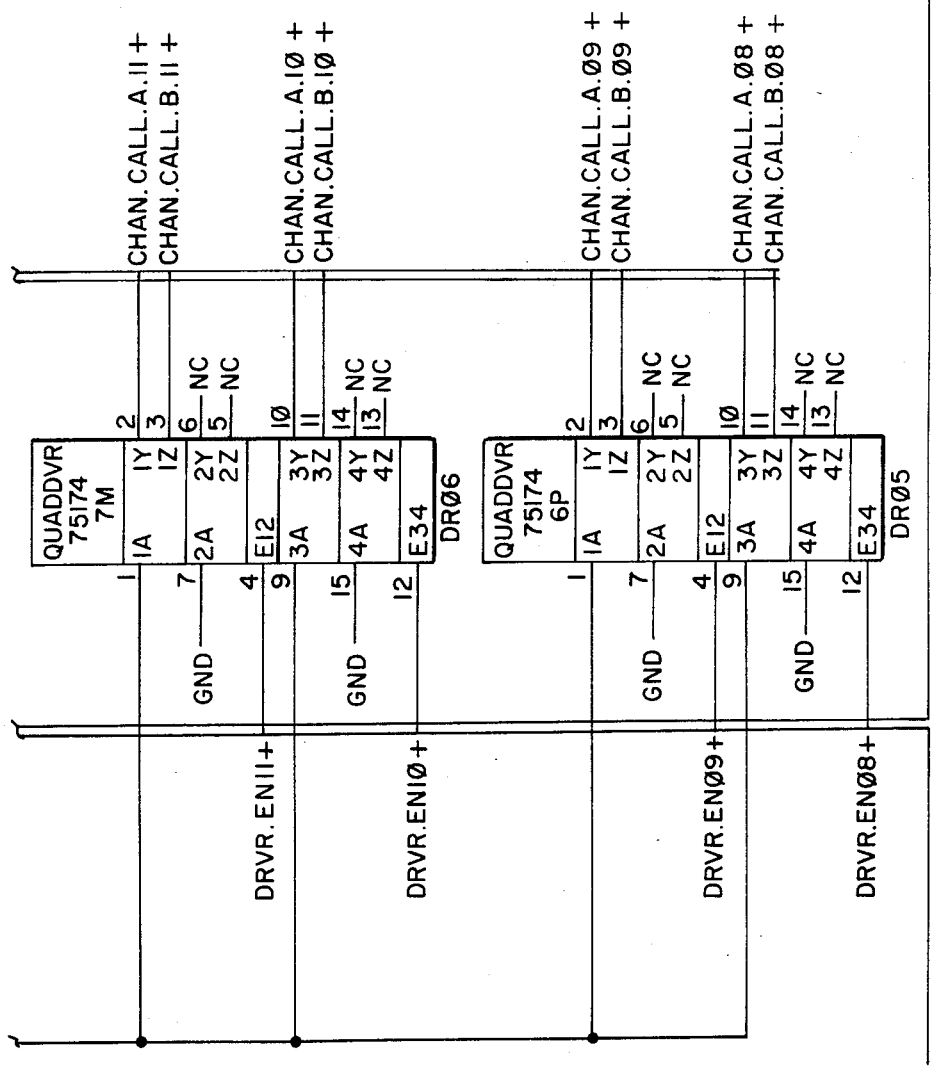
FIG._3Ff.

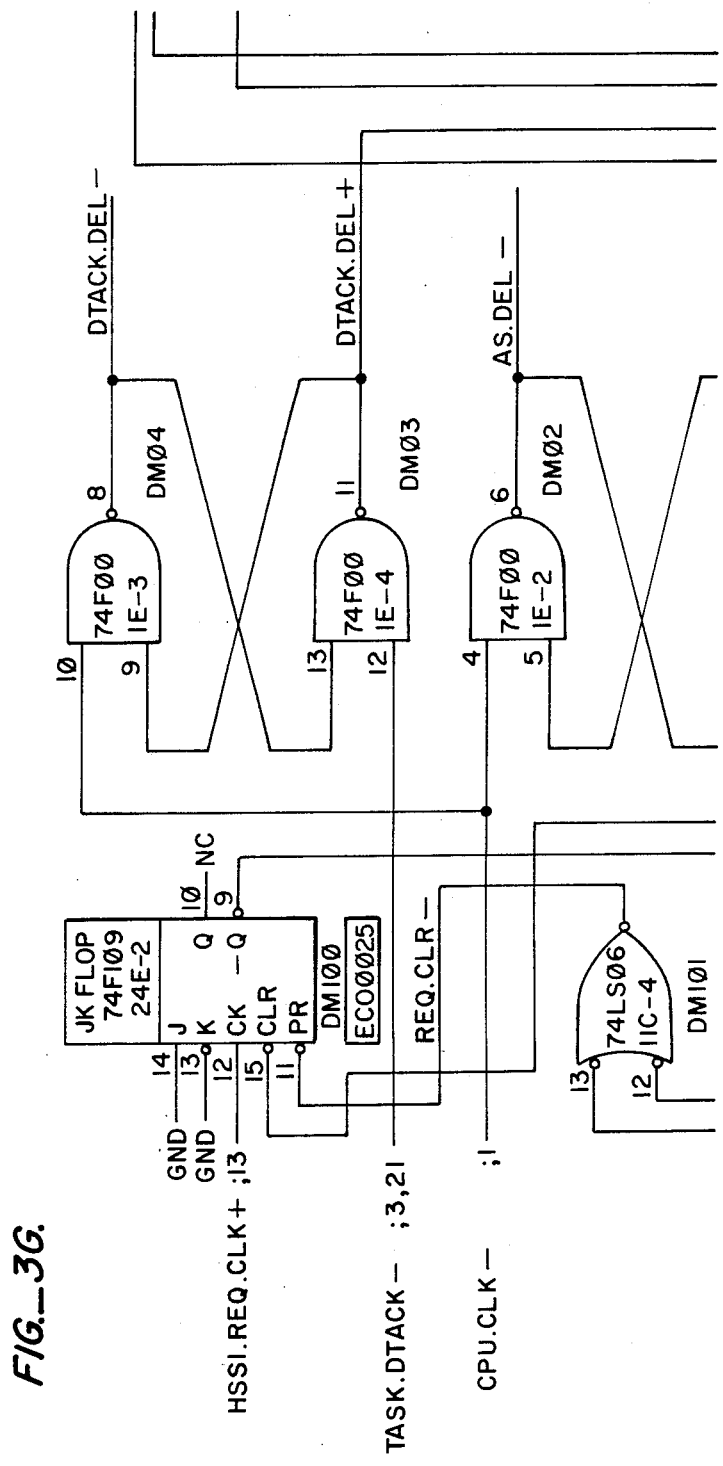

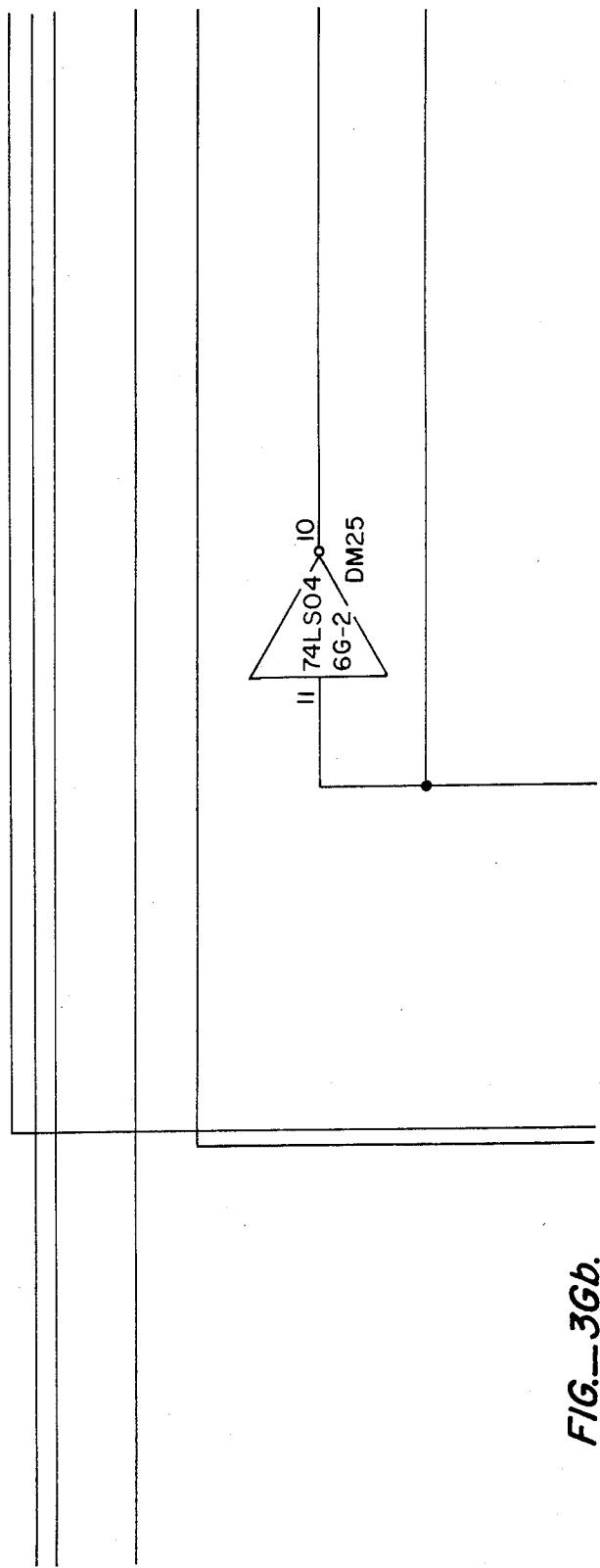
FIG._3Gb.

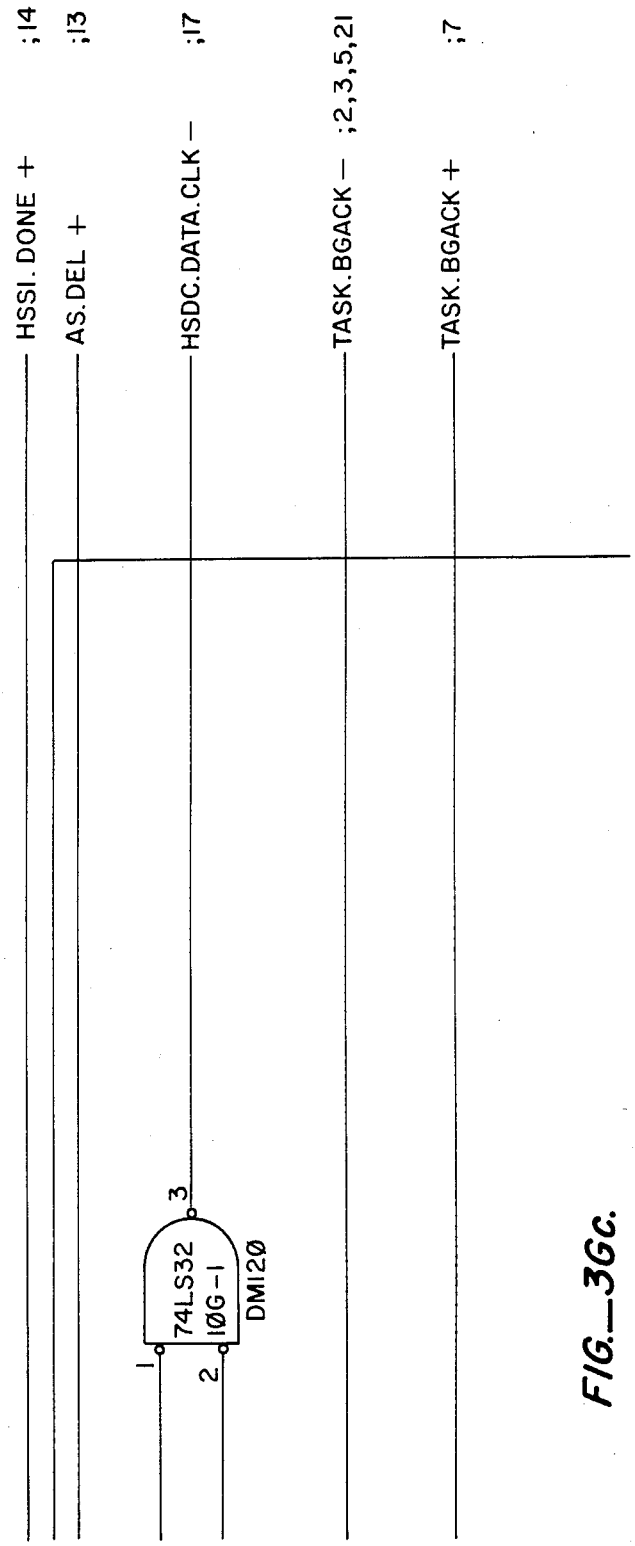
FIG._3Gc.

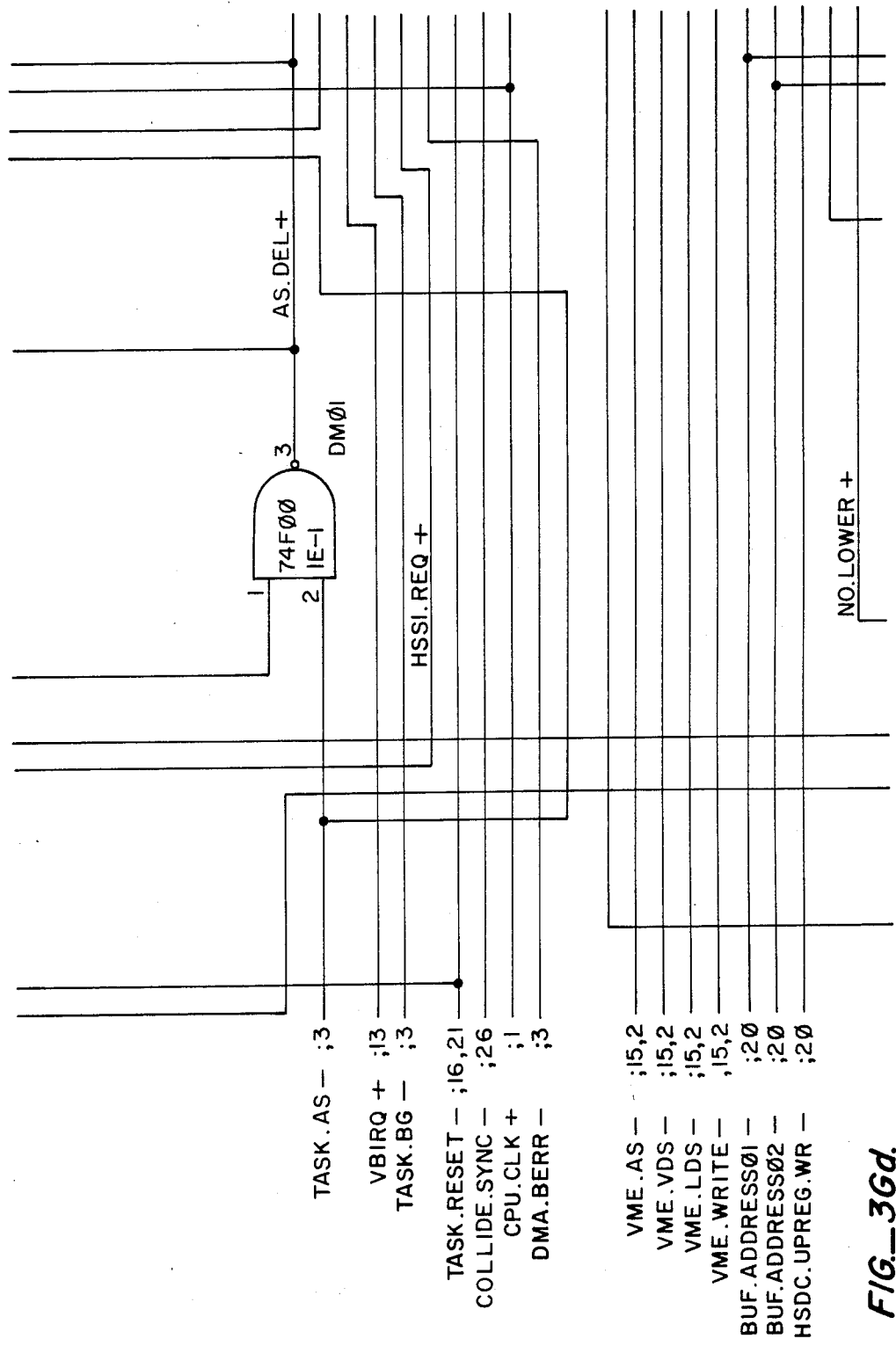

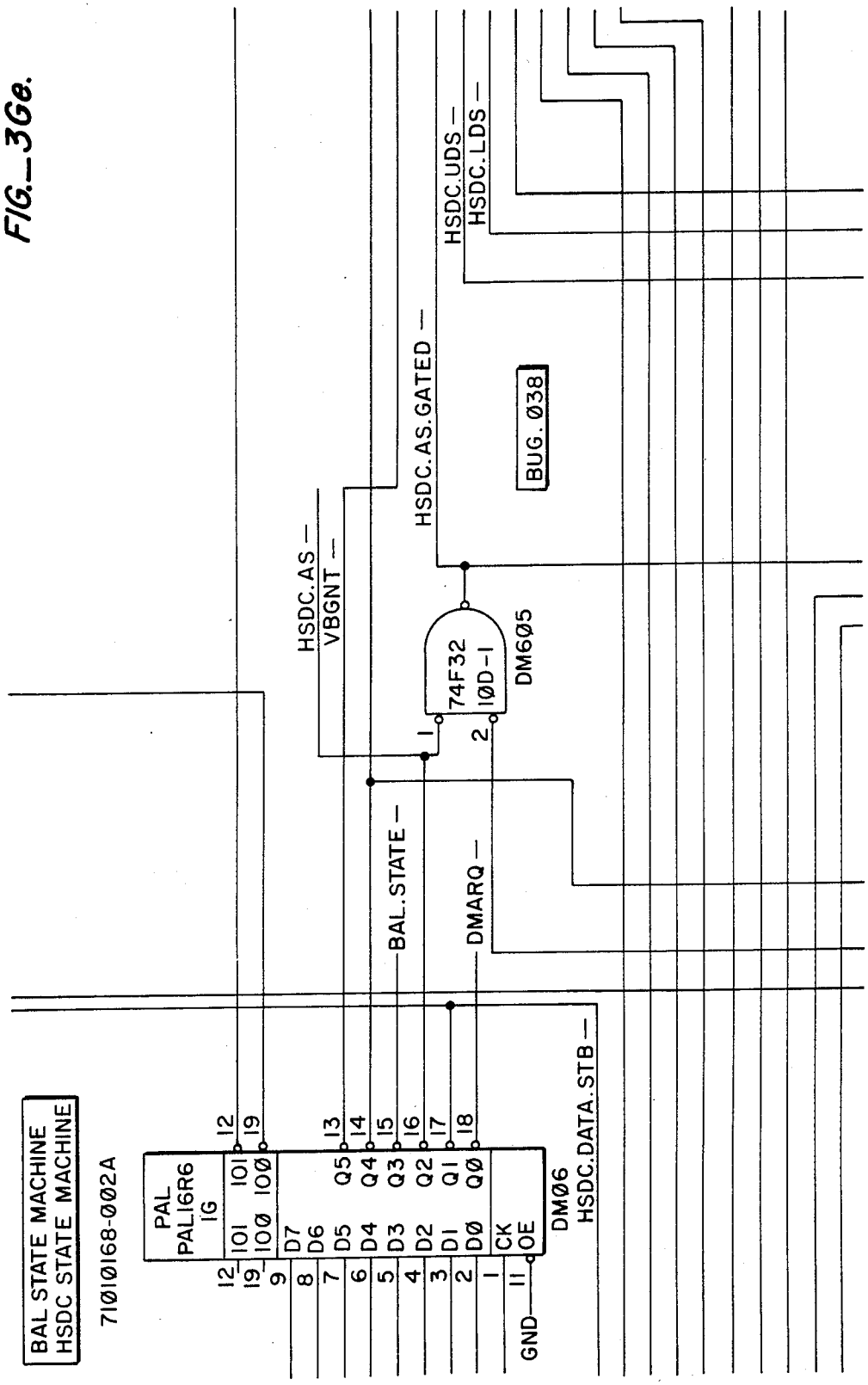
FIG._3Ge.

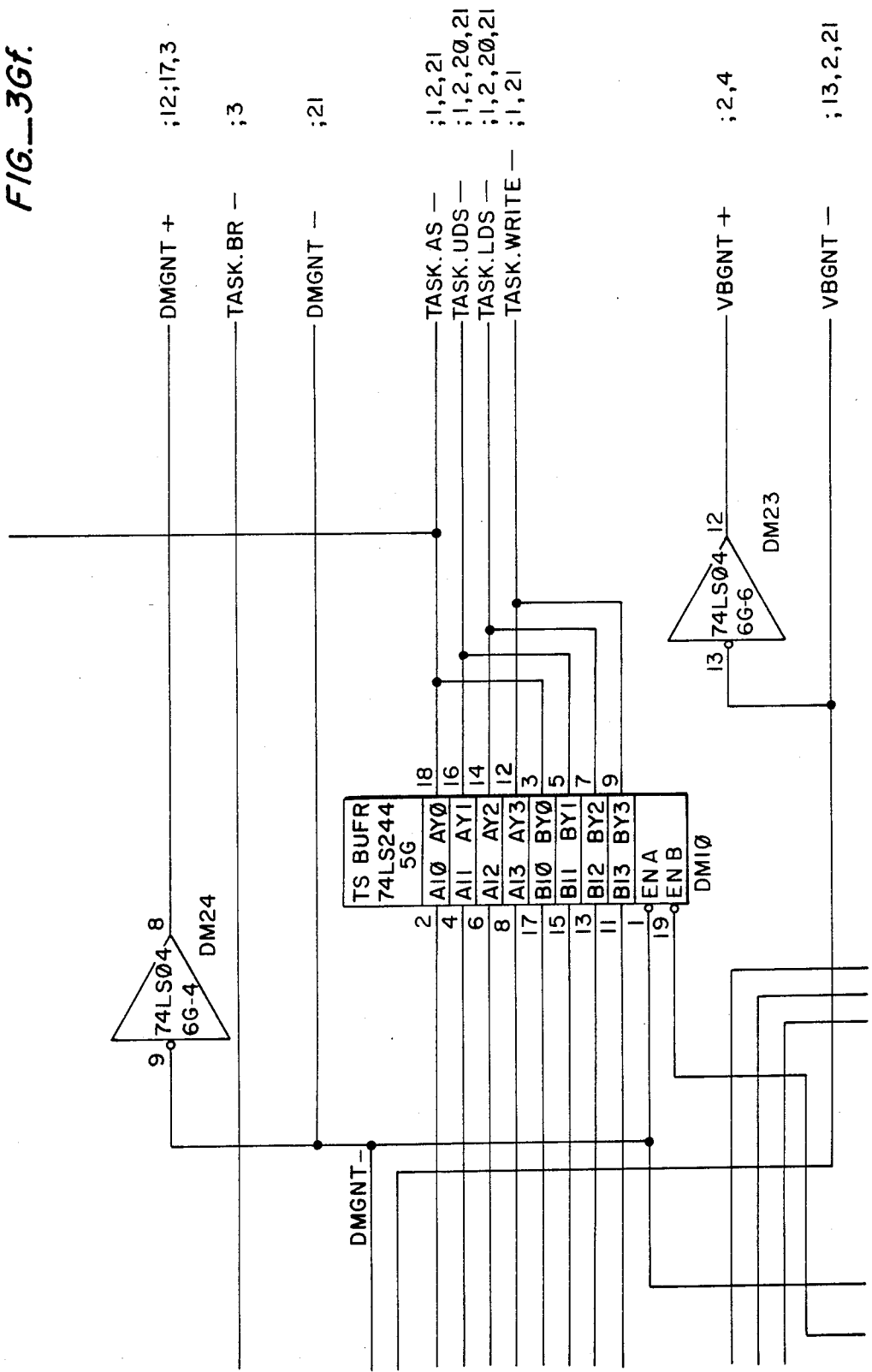

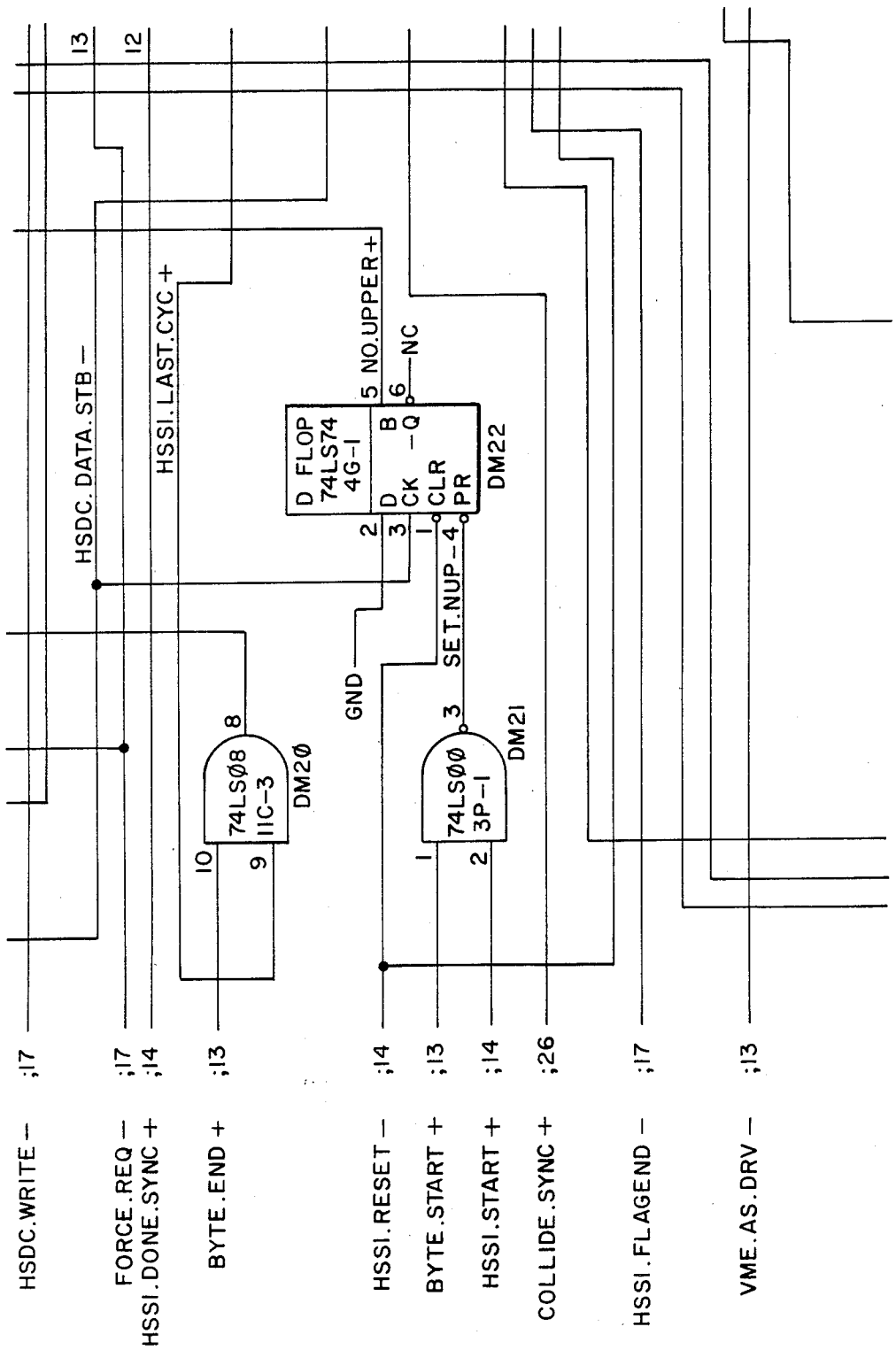
FIG.—3Gg.

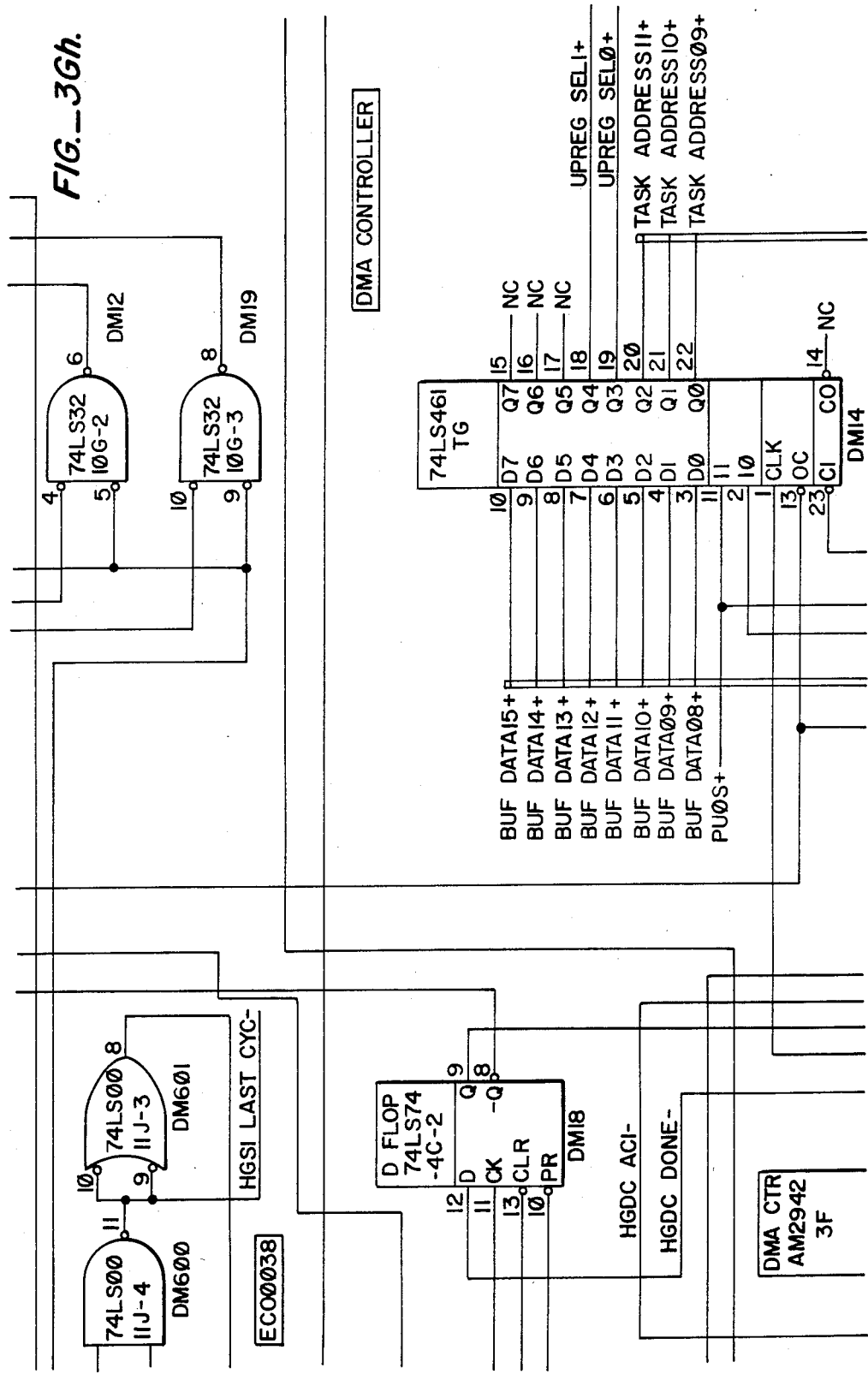

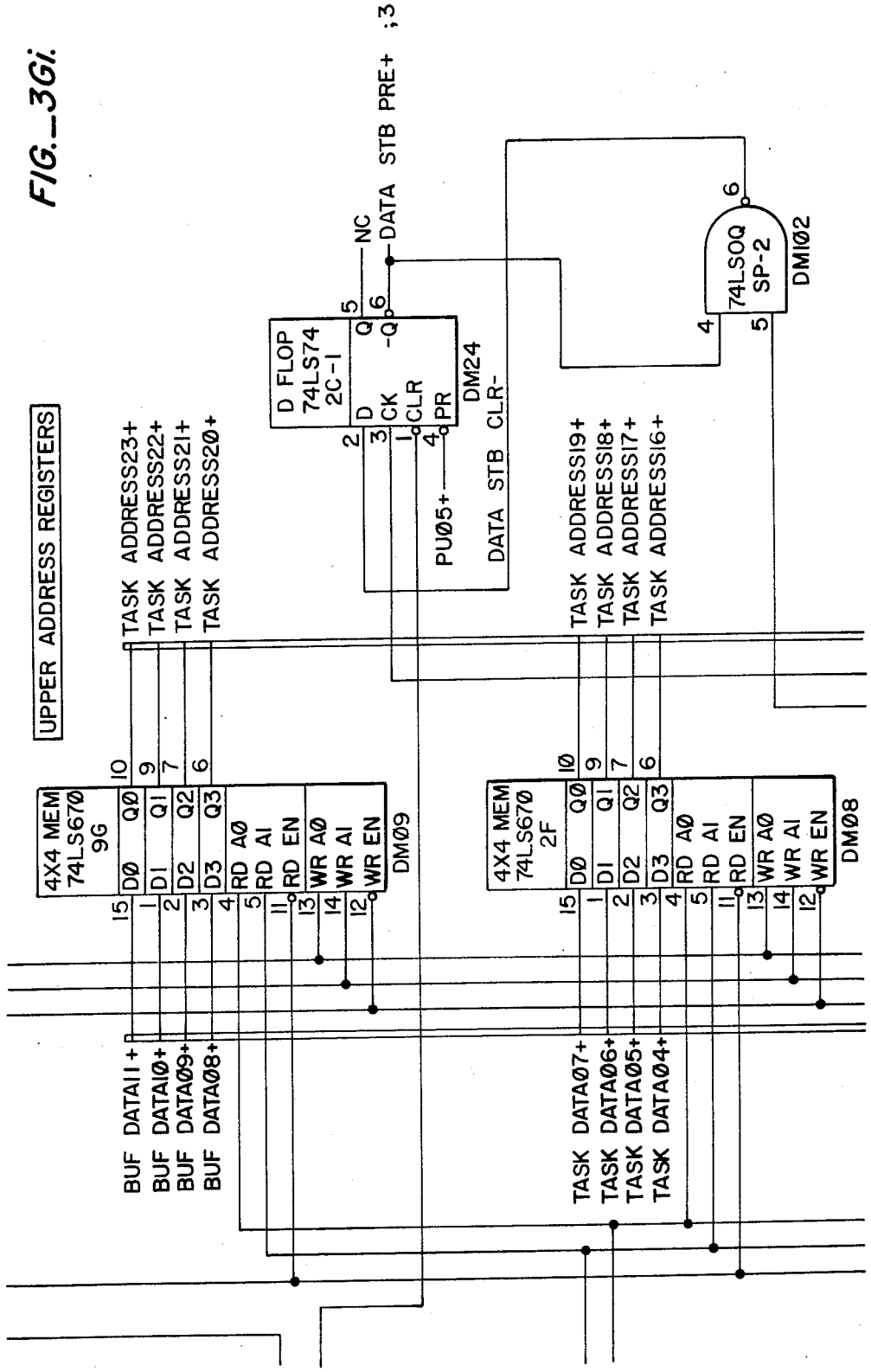

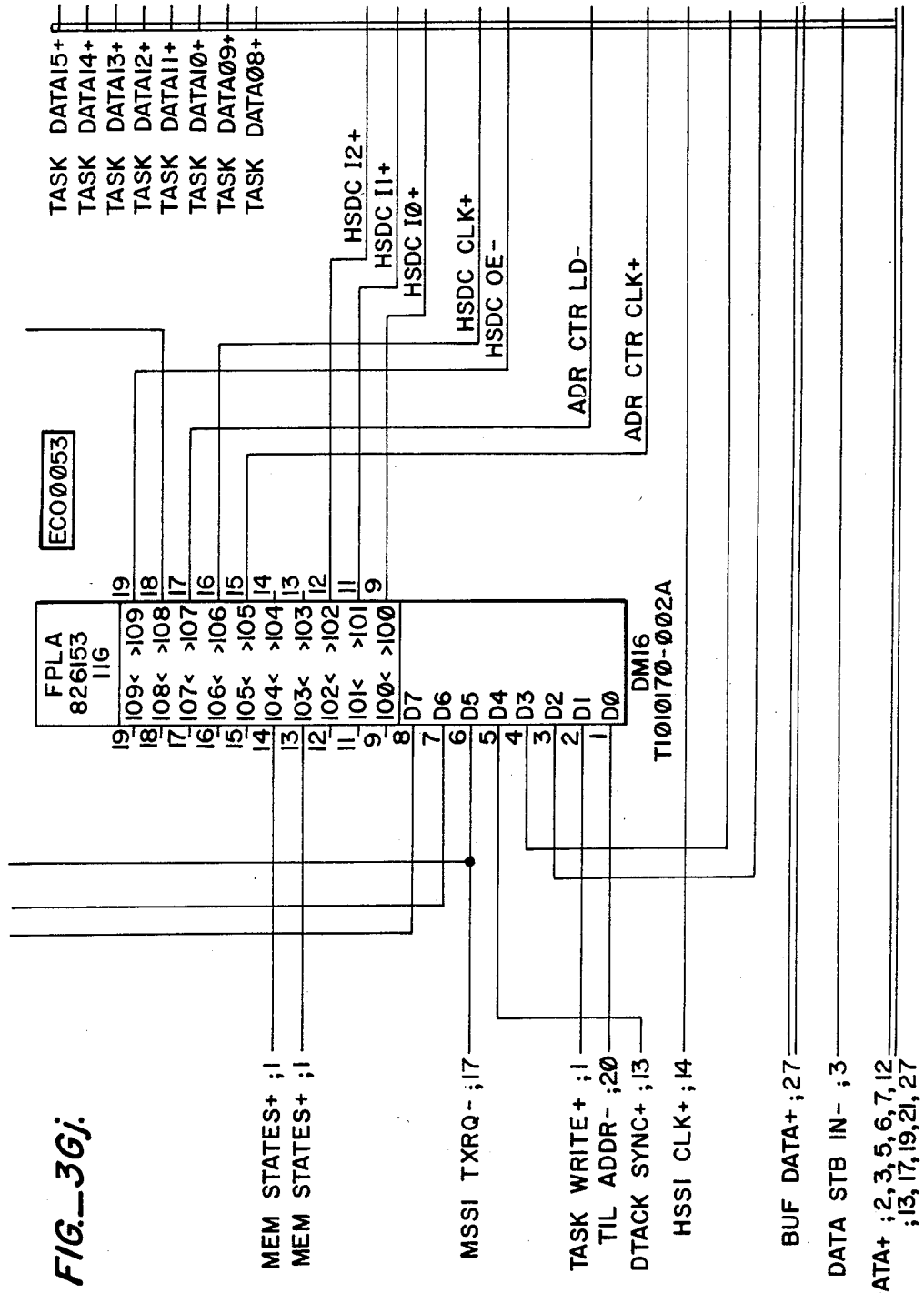

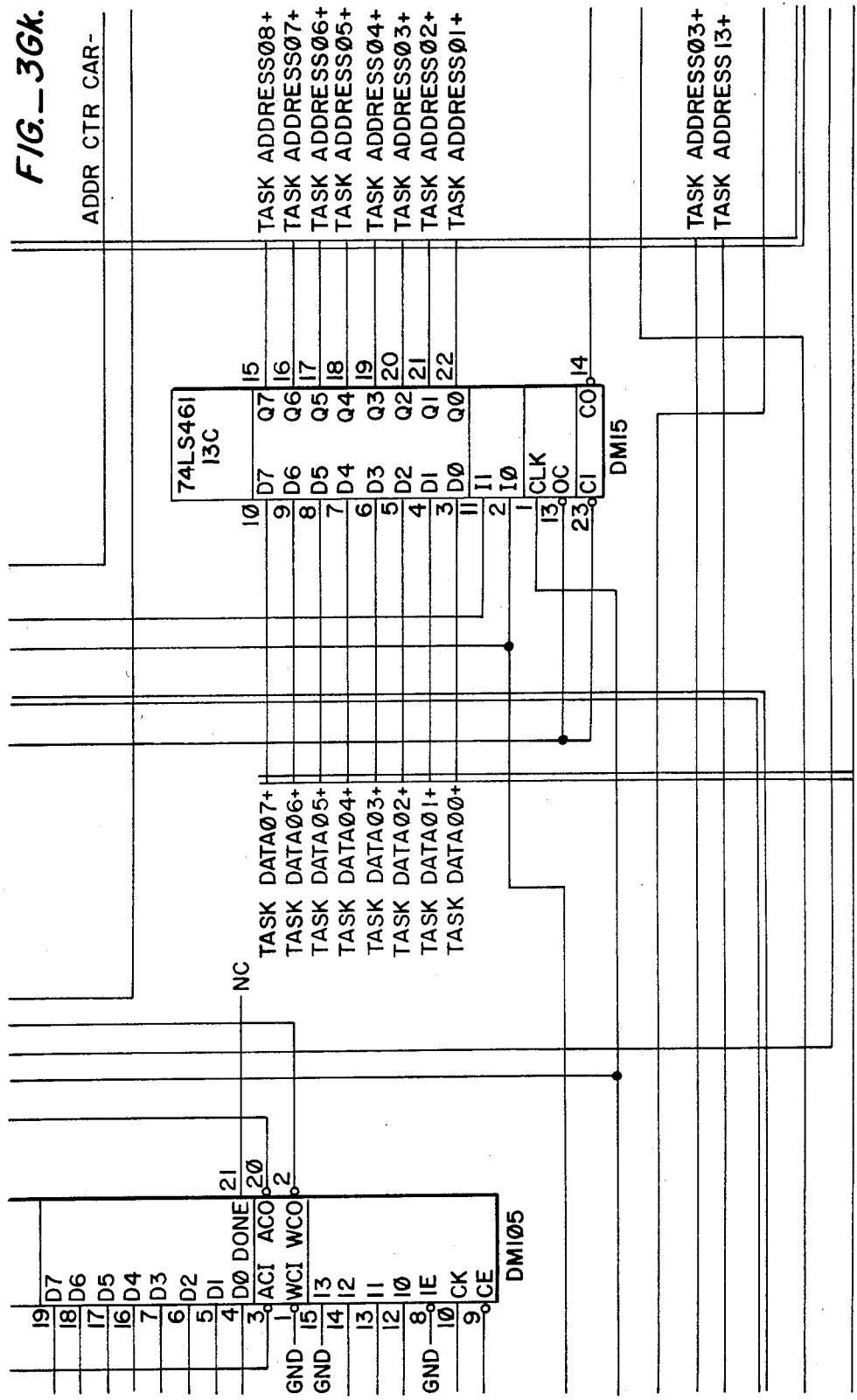
FIG._3Gk.

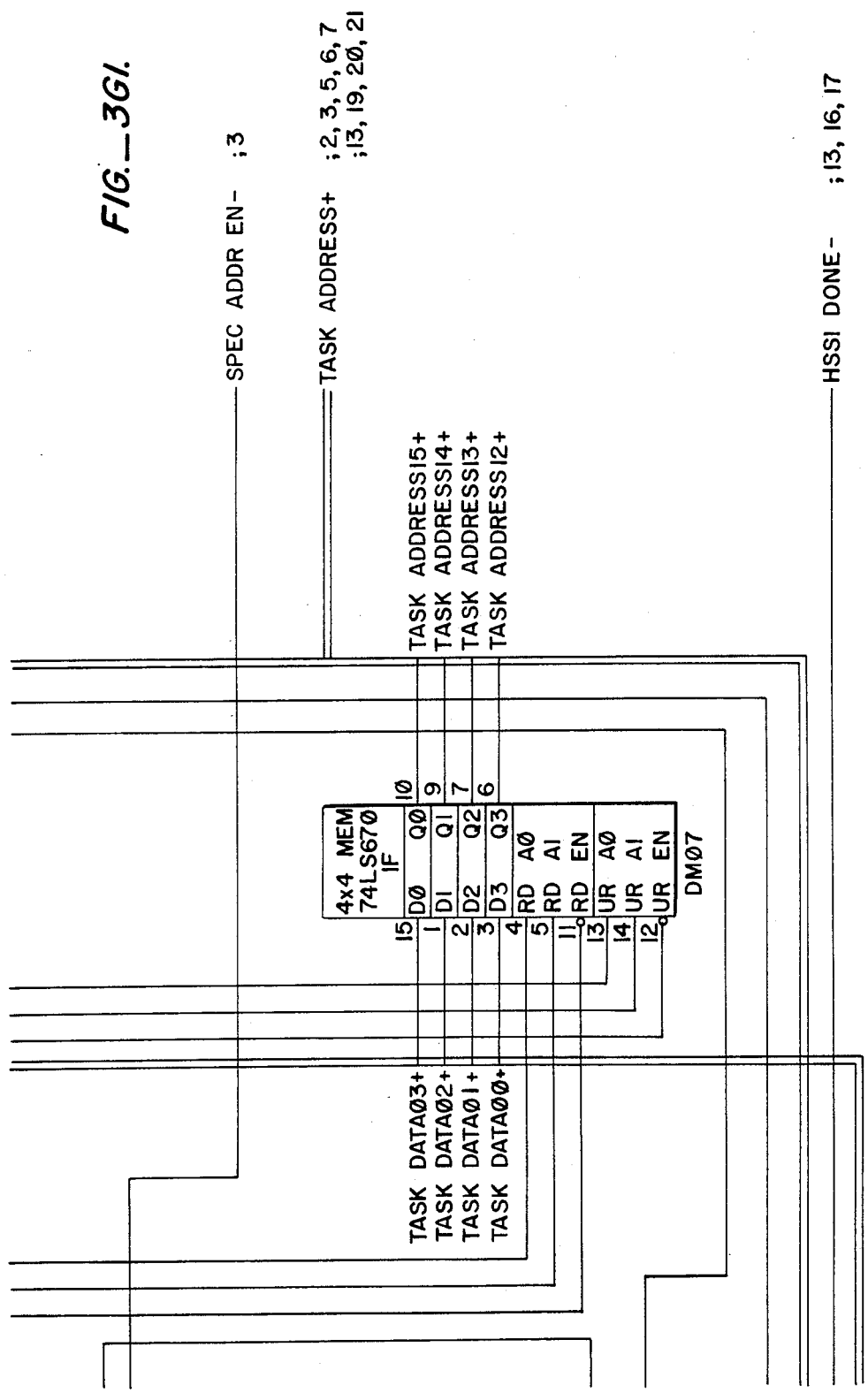
FIG._3G1.

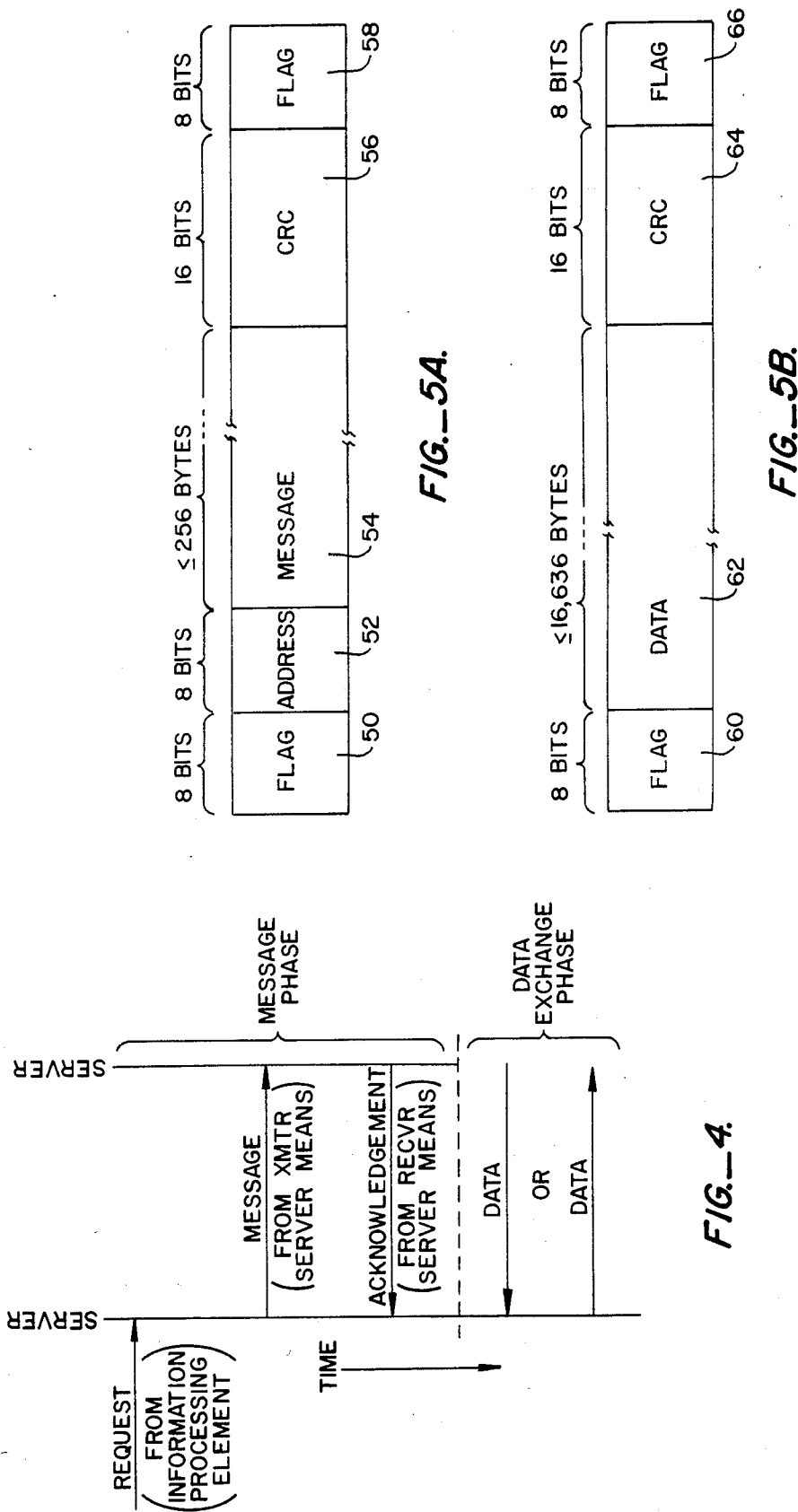

METHOD AND APPARATUS FOR FAULT TOLERANT SERIAL COMMUNICATION OF DIGITAL INFORMATION

BACKGROUND OF THE INVENTION

This invention relates to digital information communication systems and, more particularly, to high throughput fault tolerant systems for communicating digital information. Specifically, the invention is directed to a method and apparatus for providing high throughput fault tolerant digital information communication in serial format rather than parallel format. More specifically, the invention is directed to a high throughput fault tolerant serial digital information communication method and apparatus preferably characterized by full duplex, bidirectional communication of digital information in the form of messages being communicated in serial format at a first rate and half duplex, unidirectional communication of digital information in the form of large blocks of data being communicated in serial format at a second higher rate.

Generally, the architectures of known information processing systems, such as general purpose programmable digital computer systems, can be classified as either tightly coupled or loosely coupled, the trend being toward the loosely coupled architecture. A centralized memory is shared in a tightly coupled information processing system, and a central communication controller handles communication among the individual information processing elements on a synchronous basis. The burden on the central communication controller can be significant, which can impair the throughput of the information processing system.

A loosely coupled information processing system is also referred to as a distributed information processing system. The centralized memory allocated to each of the information processing elements in the tightly coupled information processing system is replaced by a different architecture. In a loosely coupled information processing system, memory is distributed throughout the information processing elements. That is, each information processing element includes a stand-alone memory and a communication controller. The communication controllers handle communication among the information processing elements through a communication network.

The circuit implementation of the architecture in a loosely coupled information processing system can be less complicated than the circuit implementation of a tightly coupled information processing system due to a reduction in the complexity of the communication controller. Even more importantly, the proliferation of information processing elements, such as user terminals, add-on memory elements, and other input/output devices having stand-alone memory, which has occurred for extending the capabilities of the central information processing system, renders the information processing system conducive to a loosely coupled architecture.

Although the principles of the present invention are applicable to tightly coupled information processing systems, the high throughput fault tolerant serial digital communication method and apparatus in accordance with the invention are particularly advantageous in loosely coupled information processing systems. Therefore, the high throughput fault tolerant serial digital communication method and apparatus in accordance with the invention will be described by way of example in connection with loosely coupled information processing systems but should not be considered to be limited to use solely in a loosely coupled architecture.

One known technique for communicating digital information in a loosely coupled information processing system is single channel serial networking. Two common types of single channel serial communication network architectures have evolved. One architecture is known as Ethernet and is based on carrier sense multiple access with collision detection. The other architecture is based on token passing. Single channel serial network architectures are primarily intended for digital information communication among geographically diverse locations at one data rate and are characterized by a relatively low throughput and the lack of fault tolerance.

Another known technique for communicating digital information in a loosely coupled information processing system is parallel bus networking. A parallel bus network architecture is disclosed in Katzman et al., U.S. Pat. No. 4,228,496 and is incorporated into a computer system known as the Non-Stop (registered trademark) manufactured by Tandem Computers Incorporated of Cupertino, California. The parallel bus network architecture disclosed in Katzman et al., U.S. Pat. No. 4,228,496 enables digital information communication on each of two buses in parallel format, thereby increasing the throughput as compared to a single parallel bus network architecture. Furthermore, fault tolerance is provided based on the fact that if one bus is inoperative, for example, due to a short circuit or open circuit fault, the other parallel bus is used for all communication, notwithstanding the fact that the throughput capability decreases. Generally, the parallel bus network architectures have supplanted single channel serial network architectures for localized information processing systems, such as a computer system located within a single frame.

Unfortunately, the parallel bus network architecture, such as disclosed in Katzman et al., U.S. Pat. No. 4,228,496 has several disadvantages. The circuit implementation of a parallel bus network architecture is required to operate at high speeds and is complex. Furthermore, proliferation of parallel buses compounds the complexity of the circuit implementation and generally entails the festooning of significant amounts of additional ribbon cable, which complicates installation. The complexity of the circuit implementation of a parallel bus network architecture and the number of parallel buses renders the parallel bus network architecture very expensive. Although the throughput is relatively high compared with the single channel serial network architecture, the overall data rate is restricted by the fact that there is no capability for other than unidirectional communication of digital information on a bus. Furthermore, error checking is complex.

The method and apparatus for communicating digital information in accordance with the present invention obviate the problems heretofore experienced with both the single channel serial network architectures and the parallel bus network architecture. The method and apparatus in accordance with the invention for communicating digital information overcome the low data rate and lack of fault tolerance present in single channel serial network architectures by providing high throughput fault tolerant serial communication of digital information over communication circuits preferably characterized by messages being communicated at a first rate and substantial amounts of data being communicated at a second higher rate. The method and apparatus in accordance with the invention for serially communicating digital information also overcome the shortcomings of the parallel bus network architecture in several regards. The method and apparatus in accordance with the invention provide full duplex, bidirectional serial communication of digital information in the form of messages as compared to parallel unidirectional communication of all digital information in parallel bus network architectures, thereby increasing the throughput. Furthermore, the method and apparatus of the invention for serially communicating digital information facilitate error checking, thereby overcoming the difficulty of error checking in parallel bus network architectures. The method and apparatus in accordance with the invention for serially communicating digital information also reduce the complexity of the circuit implementation characteristic of parallel bus network architectures and the amount of ribbon cable needed, thereby reducing the cost of a high throughput fault tolerant digital information communication network for a loosely coupled information processing system.

SUMMARY OF THE INVENTION

The invention provides a method and apparatus for serial communication of digital information in an information processing system for high throughput fault tolerant communication. High throughput is achieved by providing a multiplicity of communication circuits, which are preferably four-wire, full duplex bidirectional channels for serial communication of digital information, and by providing full duplex, bidirectional communication of messages at a first rate and half duplex, unidirectional communication of large blocks of data at a second higher rate over the communication circuits. The method and apparatus in accordance with the invention provide fault tolerance for serial communication of digital information by providing a multiplicity of communication circuits so that if one communication circuit is inoperative the remainder of the communication circuits is available for communication. The method and apparatus in accordance with the invention facilitate circuit implementation of an architecture for high throughput fault tolerant serial communication of digital information in a loosely coupled information processing system.

In accordance with the method aspect of the invention, a method for digital information communication is provided whereby at least one of a plurality of information processing elements is coupled to at least one other of the plurality of information processing elements, comprising the steps of: interfacing each of the plurality of information processing elements to a plurality of coupling means; exchanging digital information in the form of messages among a plurality of communication controller means under control of the plurality of communication controller means, at least certain of the messages exchanged among the plurality of communication controller means being for control of the exchange of digital information in the form of data among the plurality of coupling means for use by the plurality of information processing elements; and connecting the plurality of coupling means and communication controller means to a plurality of four-wire, full duplex communication circuits for transferring digital information among the plurality of coupling means and communication controller means, respectively, in bit-serial format; whereby high throughput fault tolerant digital information communication in serial format is provided. Preferably, the method further comprises the steps of bidirectionally communicating messages at a first rate and unidirectionally communicating data at a second higher rate.

In accordance with the apparatus aspect of the invention, a digital information communication network is provided whereby at least one of a plurality of information processing elements is coupled to at least one other of the plurality of information processing elements, comprising: a plurality of four-wire, full duplex communication circuits; a plurality of coupling means for interfacing each of the plurality of information processing elements to the plurality of communication circuits in order to exchange digital information in the form of data among the plurality of coupling means for use by the plurality of information processing elements; a plurality of communication controller means connected to the plurality of coupling means for exchanging digital information in the form of messages among the plurality of communication controller means, at least certain of the messages exchanged among the plurality of communication controller means being for control of the exchange of data among the plurality of coupling means; and serial interface means for connecting the plurality of coupling means and communication controller means to the plurality of communication circuits for transferring digital information among the plurality of coupling means and communication controller means, respectively, in bit-serial format; thereby providing high throughput fault tolerant digital information communication in serial format. Preferably, the plurality of communication circuits forms a set of communication circuits for bidirectionally communicating messages at a first rate and characterized in that a predetermined subset of the communication circuits is provided for unidirectionally communicating data at a second higher rate.

The dual speed serial communication method and apparatus in accordance with the invention provide significant advantages over known single channel serial network architectures and parallel bus network architectures for optimizing throughput of digital information and providing fault tolerance, thereby optimizing online operation in a loosely coupled information processing system. At the same time, the method and apparatus for serially communicating digital information in accordance with the invention provide significant economic advantages both in the circuit implementation and in the reduction of downtime.

BRIEF DESCRIPTION OF THE DRAWINGS

The above and other features and the concomitant advantages of the present invention will be better understood and appreciated by those skilled in the art in view of the description of the preferred embodiments given below in connection with the accompanying drawings. In the drawings:

FIG 1 is a block diagram of an information processing system including an embodiment of the dual speed serial digital information communication network in accordance with the present invention;

FIG. 2 is a block diagram of the dual speed serial digital information communication network shown in FIG. 1;

FIG. 3 comprising FIGS. 3A, 3Aa through 3Ah, 3B, 3Ba through 3Bf, 3C, 3Ca through 3Ck, 3D, 3Da through 3Di, 3E, 3Ea through 3El, 3F, 3Fa through 3Fg, 3G, and 3Ga through 3Gl, is a schematic circuit diagram for a high speed serial interface preferably included in the dual speed serial digital information communication network shown in FIG. 2;

FIG. 4 is a time sequence diagram for the method of dual speed serial digital information communication in accordance with the invention; and FIG. 5, comprising FIG. 5A and FIG. 5B, illustrates the preferred format for messages (FIG. 5A) and data (FIG. 5B) communicated by the dual speed serial digital information communication network shown in FIG. 1.

DESCRIPTION OF THE PREFERRED EMBODIMENTS

FIG. 1 shows an information processing system, such as a general purpose programmable digital computer system, which incorporates a dual speed serial digital information communication network in accordance with one embodiment of the invention generally indicated by the numeral 10. A plurality of information processing elements is preferably loosely coupled by means of the dual speed serial digital information communication network 10. Various information processing elements can be included in the information processing system, for example, a host computer or CPU 12 interfaced to the dual speed serial digital information communication network 10. Various other information processing elements are shown interfaced to the dual speed serial digital information communication network 10, such as local controllers or user terminals 14, remote controllers or user terminals 16, and an add-on memory 18, such as local disk storage.

The dual speed serial digital information communication network 10 includes a plurality of server means $20_1$, $20_2$, ... $20_n$ which interface the information processing elements, such as the CPU 12, local user terminals 14, etc., to communication circuits 22 also included in the communication network, as well as control the communication of digital information in the form of messages and large blocks of data among the various information processing elements. The server means $20_1$, for example, interfaces the add-on memory 18 to the communication circuits 22 for access by other information processing elements, such as the CPU 12. The server means $20_n$, on the other hand, does not interface with an information processing element, but, rather, stores and executes user programs.

The dual speed serial digital information communication network 10 is shown in greater detail in FIG. 2. FIG. 2 illustrates the plurality of server means $20_1$, $20_2$, ... $20_n$. As indicated in FIG. 2, the server means $20_1$ is by way of example connected to the add-on memory 18. In the event that a server means $20_1$, $20_2$, ... $20_n$ is connected to an information processing element, connection is by means of a transfer means or bus 24, such as in the case of the connection of the add-on memory 18 to the server means $20_1$, as shown in FIG. 2. The server means $20_2$ can be similarly connected to any other loosely coupled information processing element associated with the dual speed serial digital information communication network 10, such as the local user terminals 14, by means of another transfer means or bus 24. Finally, by way of example, the server means $20_n$ is not connected to an information processing element, but, rather, serves as a task processor for storing and executing user programs.

Referring to FIG. 2, each of the server means $20_1$, $20_2$, ... $20_n$ includes a coupling means or personality module circuit $26_1$, $26_2$, ... $26_n$, respectively. The personality module circuit $26_1$, for example, is configured both in circuit implementation and ancillary stored programmed instructions for interfacing with the add-on memory 18 over a transfer means or bus 24. The personality module circuit $26_2$ is configured in both circuit implementation and ancillary stored programmed instructions for interfacing with the local user terminals 14 over another transfer means or bus 24. The personality module circuit $26_n$, on the other hand, does not interface with an information processing element, but, rather, is configured both in circuit implementation and ancillary stored programmed instructions as a task processor for executing applications programs.

Each of the personality module circuits $26_1$, $26_2$, ... $26_n$ includes a high speed serial interface $28_1$, $28_2$, ... $28_n$, respectively, which connects the processor and memory included in the associated personality module circuit to a preselected subset of the communication circuits 22 as will be described later. Each of the high speed serial interfaces $28_1$, $28_2$, ... $28_n$ includes a direct memory access interface (DMA) $30_1$, $30_2$, ... $30_n$, respectively, in series with a serial interface circuit $32_1$, $32_2$, ... $32_n$, respectively, in series with a multiplexer circuit $34_1$, $34_2$, ... $34_n$, respectively. Each of the DMAs $30_1$, $30_2$, ... $30_n$ accesses the memory included in the associated personality module circuit $26_1$, $26_2$, ... $26_n$, the digital information being routed by the associated serial interface circuit $32_1$, $32_2$, ... $32_n$ onto one of the subset of communication circuits 22 connected to the serial interface circuit by the associated multiplexer circuit $34_1$, $34_2$, ... $34_n$ during communication. As will be described later, the high speed serial interfaces $28_1$, $28_2$, ... $28_n$ included in the respective personality module circuits $26_1$, $26_2$, ... $26_n$ operate to exchange digital information in the form of large blocks of data among one another. Since large blocks of data are communicated among the personality module circuits $26_1$, $26_2$, ... $26_n$, communication time is a significant consideration as will be mentioned again later.

As shown in FIG. 2, each of the server means $20_1$, $20_2$, ... $20_n$ further includes a system module circuit $36_1$, $36_2$, ... $36_n$, respectively. The system module circuits $36_1$, $36_2$, ... $36_n$ are configured both in circuit implementation and ancillary stored programmed instructions as the communication controller means for the dual speed serial digital information communication network 10.

Each of the system module circuits $36_1$, $36_2$, ... $36_n$ includes at least one, and preferably two, low speed serial interfaces $38_{1a,1b}$, $38_{2a,2b}$, ... $38_{na,nb}$, respectively, which connect the processor and memory included in the associated system module circuit to the communication circuits 22 as will be described later. Each of the low speed serial interfaces $38_{1a,1b}$, $38_{2a,2b}$, ... $38_{na,nb}$ preferably includes DMAs $40_{1a,1b}$, $40_{2a,2b}$, ... $40_{na,nb}$, respectively, in series with serial interface circuits $42_{1a,1b}$, $42_{2a,2b}$, ... $42_{na,nb}$, respectively, in series with multiplexer circuits $44_{1a,1b}$, $44_{2a,2b}$, ... $44_{na,nb}$, respectively. The DMAs $40_{1a,1b}$, $40_{2a,2b}$, ... $40_{na,nb}$ access the memory included in the respective system module circuit $36_1$, $36_2$, ... $36_n$, the digital information being routed by the associated serial interface circuits $42_{1a,1b}$, $42_{2a,2b}$, ... $42_{na,nb}$ onto the communication circuits 22 connected to the serial interface circuits by the associated multiplexer circuits $441a,1b$, $442a,2b$, ... $44_{na,nb}$ during communication. In contrast to the personality module circuits $26_1$, $26_2$, ... $26_n$, the system module circuits $36_1$, $36_2$, ... $36_n$ do not communicate large blocks of data, but, rather, communicate digital information in the form of messages and other information among one another. Consequently, the time of communication is not as significant a factor as in the case of the communication of large blocks of data by means of the personality module circuits $26_1$, $26_2$, ... $26_n$. As a result, the high speed serial interfaces $28_1$, $28_2$, ... $28_n$ included in the respective personality module circuits $26_1$, $26_2$, ... $26_n$ are slightly differently configured than the low speed serial interfaces faces $38_{1a,1b}$, $38_{2a,2b}$, ... $38_{na,nb}$ included in the respective system module circuits $36_1$, $36_2$, ... $36_n$ as will be described later. The differences between the high speed serial interfaces $28_1$, $28_2$, ... $28_n$ included in the respective personality module circuits $26_1$, $26_2$, ... $26_n$ and the low speed serial interfaces $38_{1a,1b}$, $38_{2a,2b}$, ... $38_{na,nb}$ included in the respective system module circuits $36_1$, $36_2$, ... $36_n$ enable dual speed serial communication of digital information over the communication circuits 22, namely, communication of messages among the system module circuits at a first rate and communication of large blocks of data among the personality module circuits at a second higher rate.

The personality module circuits $26_1$, $26_2$, ... $26_n$ and the associated system module circuits $36_1$, $36_2$, ... $36_n$ included in the respective server means $20_1$, $20_2$, ... $20_n$ are interconnected by VME buses $45_1$, $45_2$, ... $45_n$, respectively. The configuration of the VME buses $45_1$, $45_2$, ... $45_n$ is disclosed in Motorola Part No. M68KVMEB(D1) entitled "VME Bus Specification Manual (Rev. A)", Oct., 1981, available from Motorola Inc., Schaumburg, Ill.

Also included in the dual speed serial digital information communication network 10 are the communication circuits 22. The communication circuits 22 include a plurality of four-wire, full duplex communication channels $46_1$, $46_2$, ... $46_m$ for full duplex, bidirectional communication of digital information in the form of messages in serial format, as well as half duplex, unidirectional communication of digital information in the form of large blocks of data in serial format.

The server means $20_1$, $20_2$, ... $20_n$ are connected in the following preferred configuration to the four-wire, full duplex communication channels $46_1$, $46_2$, ... $46_m$ included in the communication circuits 22 for providing high throughput fault tolerant digital information communication. Insofar as the preferred configuration is concerned, the number n of the plurality of server means $20_1$, $20_2$, ... $20_n$ is not necessarily the same as the number m of the plurality of four-wire, full duplex communication channels $46_1$, $46_2$, ... $46_m$ included in the communication circuits 22. In one embodiment, for example, the number n of server means $20_1$, $20_2$, ... $20_n$ can be thirty-two, while the number m of four-wire, full duplex communication channels $46_1$, $46_2$, ... $46_m$ included in the communication circuits 22 can be sixteen. Consequently, the connection of the server means $20_1$, $20_2$, ... $20_n$ to the communication circuits 22 will be described by way of example for the case where there are sixteen four-wire, full duplex communication channels $46_1$, $46_2$, ... $46_m$, namely, communication channels $46_1$, $46_2$, ... $46_{16}$, included in the communication circuits. The connection of the server means $20_1$, $20_2$, ... $20_n$ to the four-wire, full duplex communication channels $46_1$, $46_2$, ... $46_m$ included in the communication circuits 22 is directed to provide high throughput over the dual speed serial digital information communication network 10 with fault tolerance. The configuration is preferably implemented with each of the system module circuits $36_1$, $36_2$, ... $36_n$ included in the respective server means $20_1$, $20_2$, ... $20_n$ having two low speed serial interfaces $38_{1a,1b}$, $38_{2a,2b}$, ... $38_{na,nb}$, respectively, as will be described later.

Optimized transfer of digital information among the server means $20_1$, $20_2$, ... $20_n$ in accordance with the invention is based on the following considerations. Optimization is in part based on the configuration of the server means $20_1$, $20_2$, ... $20_n$ having the respective personality module circuits $26_1$, $26_2$, ... $26_n$ and system module circuits $36_1$, $36_2$, ... $36_n$, the operation required for communication of digital information being divided between the personality module circuit and system module circuit included in each of the server means for enabling communication of messages at a first rate and communication of large blocks of data at a second higher rate under the control of the system module circuits. The optimization is also based in part on the configuration of the personality module circuits $26_1$, $26_2$, ... $26_n$ included in the respective server means $20_1$, $20_2$, ... $20_n$ so that the personality module circuits communicate among one another over the communication circuits 22 and, on the other hand, configuration of the system module circuits $36_1$, $36_2$, ... $36_n$ included in the respective server means so that the system module circuits communicate among one another over the communication circuits. Simply stated, the personality module circuits $26_1$, $26_2$, ... $26_n$ included in the respective server means $20_1$, $20_2$, ... $20_n$ communicate with other personality module circuits, and the system module circuits $36_1$, $36_2$, ... $36_n$ included in the respective server means communicate with other system module circuits for optimizing throughput over the communication circuits 22 by enabling communication of messages at a first rate and large blocks of data at a second higher rate. The optimization is further based on the connection of the server means $20_1$, $20_2$, ... $20_n$ to the four-wire, full duplex communication channels $46_1$, $46_2$, ... $46_m$ included in the communication circuits 22 based on the use of as many of the communication channels as needed during operation for providing access to available communication channels so that communication of digital information among the server means is typically transacted on demand without the delays characteristic of known single channel serial network architectures, as well as parallel bus network architectures having a limited number of additional buses (i.e., a single additional bus as disclosed in Katzman et al., U.S. Pat. No. 4,228,496). Furthermore, the configuration of the dual speed serial digital information communication network 10 is based on a high fault tolerance by providing a plurality of four-wire, full duplex communication channels $46_1$, $46_2$, ... $46_m$ (i.e., more than the two communication circuits disclosed in Katzman et al., U.S. Pat. No. 4,228,496) so that even under fault conditions, such as one or more of the communication channels being short circuited or open circuited, sufficient communication channels remain available in order to assure that the throughput of digital information is not significantly impaired.

Accordingly, referring to FIG. 2, each of the high speed serial interfaces $28_1$, $28_2$, ... $28_n$ included in the respective personality module circuits $26_1$, $26_2$, ... $26_n$ of the associated server means $20_1, 20_2, \ldots 20_n$ is connected to at least two and preferably to a preselected subset of the four-wire, full duplex communication channels $46_1, 46_2, \ldots 46_m$ included in the communication circuits 22. As shown in FIG. 2, the high speed serial interfaces $28_1, 28_2, \ldots 28_n$ included in the respective personality module circuits $26_1, 26_2, \ldots 26_n$ are connected to eight of the four-wire, full duplex communication channels, for example, communication channels $46_9, 46_{10}, \ldots 46_{16}$, in the exemplary embodiment where sixteen four-wire, full duplex communication channels are included in the communication circuits 22. More or less than eight four-wire, full duplex communication channels $46_1, 46_2, \ldots 46_m$ included in the communication circuits 22, however, can be contained in the subset of communication channels connected to the high speed serial interfaces $28_1, 28_2, \ldots 28_n$ included in the respective personality module circuits $26_1, 26_2, \ldots 26_n$ for optimizing communication of large blocks of data among the personality module circuits during operation.

Referring to FIG. 2, each of the system module circuits $36_1, 36_2, \ldots 36_n$ included in the respective server means $20_1, 20_2, \ldots 20_n$ as mentioned earlier preferably includes two low speed serial interfaces $38_{1a,1b}, 38_{2a,2b}, \ldots 38_{na,nb}$, respectively, connected to the four-wire, full duplex communication channels $46_1, 46_2, \ldots 46_m$ included in the communication circuits 22 in the following configuration. One of the two low speed serial interfaces $38_{1a,1b}, 38_{2a,2b}, \ldots 38_{na,nb}$ included in the respective system module circuits $36_1, 36_2, \ldots 36_n$, such as the low speed serial interfaces $38_{1a}, 38_{2a}, \ldots 38_{na}$, is connected to each of the four-wire, full duplex communication channels $46_1, 46_2, \ldots 46_m$ included in the communication circuits 22, namely, communication channels $46_1, 46_2, \ldots 46_{16}$ in the exemplary embodiment where sixteen four-wire, full duplex communication channels are included in the communication circuits. One of the four-wire, full duplex communication channels $46_1, 46_2, \ldots 46_{16}$ in the exemplary embodiment is designated or assigned as a home communication channel or circuit over which communication preferably occurs as will be described in more detail later. The other of the two low speed serial interfaces $38_{1b}, 38_{2b}, \ldots 38_{nb}$ included in the respective system module circuits $36_1, 36_2, \ldots 36_n$ is connected to the four-wire, full duplex communication channels $46_1, 46_2, \ldots 46_m$ included in the communication circuits 22 which are not contained in the subset of communication channels to which the high speed serial interfaces $28_1, 28_2, \ldots 28_n$ included in the respective personality module circuits $26_1, 26_2, \ldots 26_n$ are connected, namely, communication channels $46_1, 46_2, \ldots 46_8$, in the exemplary embodiment where sixteen four-wire, full duplex communication channels are included in the communication circuits. The connections of the system module circuits $36_1, 36_2, \ldots 36_n$ included in the respective server means $20_1, 20_2, \ldots 20_n$ are for optimizing the availability of the communication channels for communication of digital information in order to increase throughput and for providing fault tolerance, as well as for enabling communication of messages among the system module circuits at a first rate lower than the rate at which large blocks of data are communicated among the personality module circuits $26_1, 26_2, \ldots 26_n$ included in the respective server means. Preferably, as will be described in more detail later, one of the four-wire, full duplex communication channels $46_1, 46_2, \ldots 46_8$ in the exemplary embodiment is designated as a master communication channel or circuit for use as an alternative communication circuit, as well as the communication circuit over which one of the system module circuits $36_1, 36_2, \ldots 36_n$ in the form of a health monitor means periodically tests the operability of the elements of the dual speed serial digital information communication network 10.

The architecture of the dual speed serial digital information communication network 10 as indicated above is configured for high throughput communication of digital information over the communication circuits 22 through allocation of the personality module circuits $26_1, 26_2, \ldots 26_n$ included in the respective server means $20_1, 20_2, \ldots 20_n$ to the exchange of digital information in the form of large blocks of data with other personality module circuits and through allocation of the system module circuits $36_1, 36_2, \ldots 36_n$ included in the respective server means to the exchange of digital information in the form of messages with other system module circuits, communication of messages preferably being at a first rate and communication of large blocks of data being at a second higher rate. The allocation of tasks between the personality module circuits $26_1, 26_2, \ldots 26_n$ and system module circuits $36_1, 36_2, \ldots 36_n$ included in the respective server means $20_1, 20_2, \ldots 20_n$ and the connection of the server means to the four-wire, full duplex communication channels $46_1, 46_2, \ldots 46_m$ included in the communication circuits 22 cumulatively provide high throughput fault tolerant serial digital information communication.

Considered in more detail, each of the personality module circuits $26_1, 26_2, \ldots 26_n$ included in the respective server means $20_1, 20_2, \ldots 20_n$ operates either as an interface for an information processing element to the dual speed serial digital information communication network 10 or as a task processor without any associated information processing element. In the case where one or more of the personality module circuits $26_1, 26_2, \ldots 26_n$ is associated with an information processing element, the information processing element is connected to the personality module circuit by a transfer means or bus 24, and the personality module circuit provides the connection through which the information processing element has access to the dual speed serial digital information communication network 10 which provides a communication and operating system including programmed instructions in the form of an executive program for controlling allocations within the overall information processing system shown in FIG. 1. At least one of the personality module circuits $26_1, 26_2, \ldots 26_n$, and preferably a plurality, such as four, personality module circuits, do not interface with information processing elements, but are instead task processors which store programmed instructions in the form of user programs executed in response to user requests entered by means of information processing elements connected to other personality module circuits. The task processors generally execute programs which relate to the exchange, routing, and display (or other output) of system information. The task processors, for example, include editors for manipulating text files or program files; control the displays on the local user terminals 14 and the remote user terminals 16 shown in FIG. 1; and control movement of information between information processing elements included in the information processing system, such as from the CPU 12 to the add-on memory 18 shown in FIG. 1.

Whether or not information processing elements are connected to the personality module circuits $26_1$, $26_2$, ... $26_n$, however, each of the personality module circuits is identically connected to the four-wire, full duplex communication channels $46_1$, $46_2$, ... $46_m$ included in the communication circuits 22. Specifically, the personality module circuits $26_1$, $26_2$, ... $26_n$ are connected to a subset of the four-wire, full duplex communication channels $46_1$, $46_2$, ... $46_m$ included in the communication circuits 22 (i.e., communication channels $46_9$, $46_{10}$, ... $46_{16}$ in the exemplary embodiment where sixteen four-wire, full duplex communication channels are included in the communication circuits) for communication of digital information in the form of large blocks of data as will be described shortly.

By way of contrast, the system module circuits $36_1$, $36_2$, ... $36_n$ are communication controllers which store programmed instructions in the form of an executive program executed for controlling the operation of the system module circuits and communication among the server means $20_1$, $20_2$, ... $20_n$ included in the dual speed serial digital information communication network 10. The system module circuits $36_1$, $36_2$, ... $36_n$ service requests from users entered by means of the information processing elements connected to the personality module circuits $26_1$, $26_2$, ... $26_n$. The system module circuits $36_1$, $36_2$, ... $36_n$ process the user requests and communicate with the other system module circuits and the CPU 12 shown in FIG. 1. The low speed serial interfaces $38_{1a}$, $38_{2a}$, ... $38_{na}$ connect the respective system module circuits $36_1$, $36_2$, ... $36_n$ to each of the four-wire, full duplex communication channels $46_1$, $46_2$, ... $46_m$ included in the communication circuits 22 (i.e., all sixteen four-wire, full duplex communication channels in the exemplary embodiment where sixteen four-wire, full duplex communication channels are included in the communication circuits). Also, the low speed serial interfaces $38_{1b}$, $38_{2b}$, ... $38_{nb}$ connect the respective system module circuits $36_1$, $36_2$, ... $36_n$ to the four-wire, full duplex communication channels $46_1$, $46_2$, ... $46_m$ included in the communication circuits 22 (i.e., the communication channels $46_1$, $46_2$, ... $46_8$ in the exemplary embodiment where sixteen four-wire, full duplex communication channels are included in the communication circuits) not contained in the subset of communication channels to which the high speed serial interfaces $28_1$, $28_2$, ... $28_n$ included in the respective personality module circuits $26_1$, $26_2$, ... $26_n$ are connected.

The system module circuits $36_1$, $36_2$, ... $36_n$ operate through the low speed serial interfaces $38_{1a,1b}$, $38_{2a,2b}$, ... $38_{na,nb}$ for monitoring the four-wire, full duplex communication channels $46_1$, $46_2$, ... $46_m$ to which the low speed serial interfaces are connected for messages transmitted to the server means $20_1$, $20_2$, ... $20_n$ with which the system module circuits are associated. In the preferred configuration, the four-wire, full duplex communication channels $46_1$, $46_2$, ... $46_m$ included in the communication circuits 22 preferably used for the communication of messages are the communication channels not contained in the subset of communication channels connected to the high speed serial interfaces $28_1$, $28_2$, ... $28_n$ included in the respective personality module circuits $26_1$, $26_2$, ... $26_n$. Specifically, one of the four-wire, full duplex communication channels $46_1$, $46_2$, ... $46_m$ to which the low speed serial interfaces $38_{1a}$, $38_{2a}$, ... $38_{na}$ are connected not among the communication channels to which the personality module circuits $26_1$, $26_2$, ... $26_n$ are connected is preferably designated or assigned as the home communication channel or circuit for the server means $20_1$, $20_2$, ... $20_n$ with which the system module circuit is associated. More than one server means $20_1$, $20_2$, ... $20_n$ can have the same designated or assigned home communication channel or circuit since addresses are used as will be described later.

The system module circuits $36_1$, $36_2$, ... $36_n$ included in the respective server means $20_1$, $20_2$, ... $20_n$ operate through the associated low speed serial interfaces $38_{1a}$, $38_{2a}$, ... $38_{na}$ for initiating communication of a message to another server means on the designated or assigned home communication channel or circuit for the server means to which the message is to be transmitted. The system module circuit $36_1$, $36_2$, ... $36_n$ included in the respective server means $20_1$, $20_2$, ... $20_n$ which receives the message operates through the associated low speed serial interface $38_{1a}$, $38_{2a}$, ... $38_{na}$ for responding to the server means which initiated communication by transmitting a response message in the form of an acknowledgment message over the designated or assigned home communication channel or circuit over which the original message was received.

Meanwhile, the low speed serial interface $38_{1b}$, $38_{2b}$, ... $38_{nb}$ included in the respective system module circuit $36_1$, $36_2$, ... $36_n$ of the associated server means $20_1$, $20_2$, ... $20_n$ which initiated communication of the original message can monitor the designated master communication channel or circuit for a message from another server means. Consequently, the server means $20_1$, $20_2$, ... $20_n$ can simultaneously transmit and receive messages over the communication circuits 22. The system module circuit $36_1$, $36_2$, ... $36_n$ included in the respective server means $20_1$, $20_2$, ... $20_n$ which receives the original message operates through the associated low speed serial interface $38_{1a}$, $38_{2a}$, ... $38_{na}$ for transmitting an acknowledgement message to the server means which initiated communication over the same four-wire, full duplex communication channel $46_1$, $46_2$, ... $46_m$ over which the original message was received.

The digital information communication among the personality module circuits $26_1$, $26_2$, ... $26_n$ is different from the digital information communication among the system module circuits $36_1$, $36_2$, ... $36_n$ over the four-wire, full duplex communication channels $46_1$, $46_2$, ... $46_m$ included in the communication circuits 22. Communication of digital information in the form of messages among the system module circuits $36_1$, $36_2$, ... $36_n$ is over one of plural (i.e., m) channels, serial per channel, four-wire, full duplex per channel for providing bidirectional digital information exchange. As indicated above, the period for communication of digital information in the form of large blocks of data among the personality module circuits $26_1$, $26_2$, ... $26_n$ is significant in comparison with the period for communication of messages among the system module circuits $36_1$, $36_2$, ... $36_n$. Consequently, communication of messages is preferably at a first rate, for example, two megabits per second, and communication of large blocks of data is at a second higher rate, for example, eight megabits per second. Communication of digital information in the form of large blocks of data among the personality module circuits $26_1$, $26_2$, ... $26_n$ is over one of plural (i.e., m) channels, serial per channel, half duplex per channel for providing unidirectional digital information exchange. As a result, throughput is optimized.

The personality module circuits $26_1$, $26_2$, ... $26_n$ include some amount of memory for storage of digital information in the form of data. The personality module circuits $26_1, 26_2, \ldots 26_n$ also include sufficient processing capability for interfacing an information processing element to the memory, except in the case where the server means $20_1, 20_2, \ldots 20_n$ serves as a task processor in which case the personality module circuit includes sufficient processing capability for executing applications programs resident in the memory.

A preferred circuit implementation of the personality module circuits $26_1, 26_2, \ldots 26_n$ comprises four general circuit elements. Each circuit element is constructed from integrated circuits.

The processor associated with each of the personality module circuits $26_1, 26_2, \ldots 26_n$ is preferably based on a Motorola type MC68000L10 microprocessor, which is described in "Motorola Microprocessors Data Manual, 1981", page 4–661. Industry standard 64K dynamic random access memory circuits (RAMs) are used to create the main memory, which can range from 128K bytes to 1M bytes.

The direct memory access (DMA) controller for each of the DMAs $30_1, 30_2, \ldots 30_n$ included in the respective high speed serial interfaces $28_1, 28_2, \ldots 28_n$ of the associated personality module circuits $26_1, 26_2, \ldots 26_n$ is generally created from a set of bipolar medium scale integration (MSI) circuits. These bipolar circuits include two counters, one, such as a type 74LS461 available from Monolithic Memories Incorporated of Sunnyvale, Calif., for providing the address for memory references and the other for providing a count of the words transferred by the associated serial interface circuit $32_1, 32_2, \ldots 32_n$, for example, a type AM2942 available from Advanced Micro Devices of Sunnyvale, Calif. The interaction with the processor associated with the personality module circuit $26_1, 26_2, \ldots 26_n$ is via a state machine implemented with a bipolar programmable device such as programmable array logic (PAL) or a field programmable logic array (FPLA).

Each of the serial interface circuits $32_1, 32_2, \ldots 32_n$ included in the respective high speed serial interfaces $28_1, 28_2, \ldots 28_n$ of the associated personality module circuits $26_1, 26_2, \ldots 26_n$ is also preferably implemented as a set of state machines, each created with bipolar programmable devices such as PALs or FPLAs. One such state machine provides the interface to the DMA controller, a second counts bits from the serial interface to determine word boundaries, and the third implements the bit by bit features of the known high-level data link control (HDLC) protocol. The actual serial to parallel conversion can be done with shift registers, such as a type 74S299 available from Texas Instruments Incorporated of Dallas, Tex., and the required buffering is easily implemented with bidirectional registers, such as a Texas Instruments type 74LS646. Cyclic redundancy check (CRC) generation and checking is performed in a 9401 CRC generator/checker described in "Macrologic Bipolar Microprocessor Databook", 1976, page 3–11 available from Fairchild Camera and Instrument Corporation of Mountain View, Calif.

Each of the multiplexer circuits $34_1, 34_2, \ldots 34_n$ included in the respective high speed serial interfaces $28_1, 28_2, \ldots 28_n$ of the associated personality module circuits $26_1, 26_2, \ldots 26_n$ and serial line interfacing can be done either with Texas Instruments type 75176 transceivers or a combination of type 75173 drivers and type 75174 receivers, with the multiplexing function accomplished by controlling the enables of these parts. The parts are all described in "The Line Driver and Receiver Data Book 1981" from Texas Instruments, part number LCC4209A, page 225. A high speed phase lock loop is needed, and this is preferably implemented with a bipolar state machine constructed from discrete small scale integration (SSI) parts, as even currently available programmable devices are too slow to allow functioning at speeds up to eight megabits per second.

FIG. 3 is a schematic circuit drawing for each of the high speed serial interfaces $28_1, 28_2, \ldots 28_n$ preferably included in the respective personality module circuits $26_1, 26_2, \ldots 26_n$. Although FIG. 3 shows a preferred circuit implementation for the high speed serial interfaces $28_1, 28_2, \ldots 28_n$, the specific circuit implementation can take any of various forms for effecting the operation of the dual speed serial digital information communication network 10 to be described shortly.

A preferred circuit implementation of the system module circuits $36_1, 36_2, \ldots 36_n$ comprises four general circuit elements. Each circuit element is constructed around the following set of integrated circuits.

The processor associated with each of the system module circuits $36_1, 36_2, \ldots 36_n$ is preferably based on a Motorola type MC68000L10 microprocessor, which is described in "Motorola Microprocessors Data Manual, 1981", page 4–661. Industry standard 64K dynamic RAMs are used to create 256K bytes of writable storage, while industry standard erasable programmable read only memory circuits (EPROMs) provide nonvolatile program storage.

The direct memory access (DMA) controller for each of the DMAs $40_{1a,1b}, 40_{2a,2b}, \ldots 40_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably based on a Motorola type MC68B44 four channel DMA control circuit described in the "Motorola Microprocessors Data Manual, 1981", page 4–441. The technique for interfacing this part to the 68000 microprocessor is described in that document.

Each of the serial interface circuits $42_{1a,1b}, 42_{2a,2b}, \ldots 42_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably based around a type 2652 multi-protocol communications controller (MPCC) available from Signetics Corporation of Sunnyvale, Calif., which is specifically designed to handle the HDLC serial protocol. This part is described in "MOS Microprocessor Data Manual 1982", Signetics Part 15M0182.

The multiplexer/line driver/receiver (MUX) section for each of the multiplexer circuits $44_{1a,1b}, 44_{2a,2b}, \ldots 44_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably constructed from forty-eight Texas Instruments type 75176 serial transceiver circuits. The tristate enabling function of these parts is used for implementing the multiplexing function. These parts are described in "The Line Driver and Receiver Data Book 1981" from Texas Instruments, part number LCC4290A, page 225.

In operation, communication of digital information over the dual speed serial digital information communication network 10 is initiated by a user request entered by means of an information processing element. The digital information communication sequence includes a message phase and can, but does not necessarily, include a data exchange phase as shown in FIG. 4.

Briefly, as shown in FIG. 4, a user enters a request or other information, indicated as the REQUEST, by means of an information processing element. The system module circuit $36_1$, $36_2$, ... $36_n$ included in the respective server means $20_1$, $20_2$, ... $20_n$ connected to the information processing element assembles and transmits a message, indicated as the MESSAGE, to another server means in response to the REQUEST. The system module circuit $36_1$, $36_2$, ... $36_n$ included in the respective server means $20_1$, $20_2$, ... $20_n$ which receives the MESSAGE transmits a response message, indicated as the ACKNOWLEDGEMENT, back to the server means which transmitted the original MESSAGE. Thereafter, data, indicated as the DATA, can be transmitted from the personality module circuit $26_1$, $26_2$, ... $26_n$ included in the respective server means $20_1$, $20_2$, ... $20_n$ which transmitted the original MESSAGE to the personality module circuit which received the MESSAGE, or vice versa.

By way of example, the operation of the dual speed serial digital information communication network 10 will be considered in greater detail in connection with digital communication between one of the local user terminals 14 and the add-on memory 18 shown in FIG. 1. With reference to FIG. 2, during the message phase, the personality module circuit $26_2$ included in the server means $20_2$ interfaced to the local user terminals 14 generates a user request in response to information entered by a user by means of one of the local user terminals, which interrupts the associated system module circuit $36_2$ included in the server means. Next, the interrupted system module circuit $36_2$ assembles the appropriate message in the memory associated with the system module circuit. The message is determined by the information from the personality module circuit $26_2$ transferred to the associated system module circuit $36_2$ immediately after the interrupt. Such information can indicate, for example, that the personality module circuit $26_2$ needs a page of data not stored in the memory associated with the personality module circuit (i.e., needs a page of data retrieved from the add-on memory 18).

Meanwhile, the processor associated with the system module circuit $36_2$ which is to initiate communication of a message during the message phase instructs the associated low speed serial interface $38_{2a}$ to monitor the designated or assigned home communication channel or circuit for the server means $20_1$ interfaced to the add-on memory 18 to which the message is to be transmitted in order to determine whether or not that home circuit is available. If the designated or assigned home communication channel or circuit for the server means $20_1$ to which the message is to be transmitted is available, that home circuit is acquired by the low speed serial interface $38_{2a}$ included in the system module circuit $36_2$ of the associated server means which is to initiate communication, and the processor associated with the system module circuit commences communication by initiating the DMA $40_{2a}$, whereupon the assembled message is accessed by the DMA and routed by the associated serial interface circuit $42_{2a}$ and the associated multiplexer circuit $44_{2a}$ onto the four-wire, full duplex communication channel $46_1$, $46_2$, ... $46_m$ designated or assigned as the home communication channel or circuit for the server means $20_1$ to which the message is transmitted. Transmission of the message is commenced when the processor associated with the system module circuit $36_2$ initiates the associated DMA $40_{2a}$. Transmission of the message occurs at a first or message rate, for example, two megabits per second. On the other hand, if the designated or assigned home communication channel or circuit for the server means $20_1$ to which the message is to be transmitted is not available, that is, busy, a wait mode is initiated. The serial interface circuit $42_{2a}$ operates for monitoring and acquiring the designated or assigned home communication channel or circuit for the server means $20_1$ to which the message is to be transmitted. This avoids the need for having the processor associated with the system module circuit $36_2$ poll the designated or assigned home communication channel or circuit and, therefore, frees the system module circuit processor for other tasks, such as responding to messages from other server means while in the wait mode (i.e., while the system module circuit must itself wait in order to transmit a message). The low speed serial interface $38_{2a}$ included in the system module circuit $36_2$ of the associated server means $20_2$ which is to initiate communication continuously monitors the designated or assigned home communication channel or circuit of the server means $20_1$ to which the message is to be transmitted for a predetermined period, acquires that home circuit if the home circuit becomes available during the predetermined period, and interrupts the processor associated with the system module circuit when that home circuit is available, at which time the message is transmitted as described immediately above.

Considered in greater detail, the processor associated with the system module circuit $36_2$ times the predetermined period. The predetermined period can be, for example, several seconds. During the predetermined period the interrupt for the processor associated with the system module circuit $36_2$ is enabled. If an interrupt occurs during the predetermined period, the message is transmitted.

On the other hand, if an interrupt does not occur during the predetermined period, the processor associated with the system module circuit $36_2$ instructs the associated low speed serial interface $38_{2a}$ to select an alternative four-wire, full duplex communication channel $46_1$, $46_2$, ... $46_m$. Preferably, the alternative four-wire, full duplex communication channel $46_1$, $46_2$, ... $46_m$ is the designated master communication channel or circuit.

The low speed serial interfaces $38_{1b}$, $38_{2b}$, ... $38_{nb}$ included in the respective system module circuits $36_1$, $36_2$, ... $36_n$ monitor the designated master communication channel or circuit when no other operations are being performed which involve the use of the interfaces, for example, receipt of another message from another system module circuit while involved with transmission of a message to yet another system module circuit. Consequently, if the designated or assigned home communication channel or circuit for the server means $20_1$ to which a message is to be transmitted is busy, the system module circuit $36_2$ of the server means which is to initiate communication preferably attempts to acquire the designated master communication channel or circuit. If for any reason the designated master communication channel or circuit cannot be acquired within the predetermined period, the processor associated with system module circuit $36_2$ instructs the associated low speed serial interface $38_{2a}$ to select yet another alternative four-wire, full duplex communication channel $46_1$, $46_2$, ... $46_m$. As will be described shortly, an address included in the message assures that the message is responded to only by the server means $20_1$ to which the message is to be transmitted.

As mentioned earlier, one of the system module circuits $36_1$, $36_2$, ... $36_n$ is in the form of a health monitor means for ascertaining the operability of the elements of the dual speed serial digital information communication network 10. In the event that the designated or assigned home communication channel or circuit for the server means $20_1$ to which the message is to be transmitted is busy for the predetermined period, the system module circuit $36_2$ which is to initiate communication either transmits a message to the system module circuit which serves as the health monitor means or, where the system module circuit which is to initiate communication is the health monitor, the system module circuit is advised by the interrupt from the associated serial interface $38_{2a}$ that the predetermined period has elapsed. Subsequently, a test is undertaken for checking the operability of the busy four-wire, full duplex communication channel $46_1, 46_2, \ldots 46_m$ and the server means $20_1$ to which the message is to be transmitted as a special case of the periodic test performed by the health monitor means as will be described later.

The message format is illustrated in FIG. 5A. The message format is based on the HDLC digital communication protocol.

The message includes a first flag 50 which indicates a message. The first flag 50 preferably comprises an eight-bit byte. When the serial interface circuit $42_{2a}$ included in the system module circuit $36_2$ of the associated server means $20_2$ which is to initiate communication of a message over the designated or assigned home communication channel or circuit for the server means to which the message is to be transmitted acquires the home circuit, the serial interface circuit provides a stream of first flags 50 on that home circuit in order to maintain availability of the home circuit for transmission of the message.

Referring again to FIG. 5A, an address 52 follows the first flag 50 for designating the server means $20_1$ to which the message is transmitted. Preferably, the address 52 comprises an eight-bit byte.

A message 54 follows the address 52. The message 54 can comprise, for example, any number of eight-bit bytes, but preferably not more than 256 bytes, for conveying a request or other information to the server means $20_1$ to which the message is transmitted. Often, as in the example, the message 54 requests data exchange between the server means $20_2$ which transmits the message and the server means $20_1$ which receives the message.

The message 54 is followed by a CRC code 56. The CRC code 56 is preferably sixteen bits (i.e., two bytes). The CRC code 56 is preferably a CRC-16 style of cyclic redundancy check code rather than a CCITT-16 style as employed in the known HDLC digital communication protocol. Basically, the CRC-16 cyclic redundancy check code 56 is based on a different starting value and calculation than a CCITT-16 cyclic redundancy check code. The use of the CRC-16 cyclic redundancy check code 56 instead of a CCITT-16 cyclic redundancy check code reduces the complexity of the circuit implementation.

As shown in FIG. 5A, the message concludes with a second flag 58 which indicates the end of the record. Preferably, the second flag 58 comprises an eight-bit byte.

Referring again to the operation of the dual speed serial digital information communication network 10, the low speed serial interface $38_{1a}$ included in the respective system module circuit $36_1$ of the associated server means $20_1$ to which the message is transmitted continuously monitors the designated or assigned home communication channel or circuit for the server means. The address 52 shown in FIG. 5A is detected by the system module circuit $36_1$ within the message which appears on one of the four-wire, full duplex communication channels $46_1, 46_2, \ldots 46_m$ included in the communication circuits 22, preferably the designated or assigned home communication channel or circuit for the server means $20_1$ to which the message is transmitted. Consequently, the low speed serial interface $38_{1a}$ included in the system module circuit $36_1$ of the associated server means $20_1$ to which the message is transmitted responds to the message. The DMA $40_{1a}$ included in the low speed serial interface $38_{1a}$ routes the message from the associated serial interface circuit $42_{1a}$ received from the associated multiplexer circuit $44_{1a}$ to the memory associated with the system module circuit $36_1$ included in the server means $20_1$ to which the message is transmitted and interrupts the processor associated with the system module circuit in order to indicate that a message has been received. Subsequently, the system module circuit $36_1$ included in the server means $20_1$ which receives the message transmits an acknowledgement message over the four-wire, full duplex communication channel $46_1, 46_2, \ldots 46_m$ included in the communication circuits 22 of the assigned or designated home communication channel or circuit for the server means which receives the original message. The acknowledgement message preferably has the same format as the original message shown in FIG. 5A.

The second flag 58 included in the acknowledgement message represents the conclusion of the message phase. In some cases, the acknowledgement message also represents the end of communication of digital information between the server means $20_2$ which initiated the message phase and transmitted the original message and the server means $20_1$ which received the original message. In other instances, as in the example, however, the digital information contained in the message 54 shown in FIG. 5A indicates that data is to be exchanged between the server means $20_1$ which received the original message and the server means $20_2$ which transmitted the original message, whereupon data is exchanged at the second higher rate.

The transmission of data from the server means $20_1$ which received the original message to the server means $20_2$ which transmitted the original message as in the example, or vice versa, at the second higher rate requires that a message has been received by the server means to which the original message was transmitted and that the server means has returned an acknowledgement message to the server means which transmitted the original message. The original message from the server means $20_2$ which transmitted the original message selects the four-wire, full duplex communication channel $46_1, 46_2, \ldots 46_m$ included in the communication circuits 22 and, further, assures that the selected communication channel is acquired for the transmission of data. The identification of the four-wire, full duplex communication channel $46_1, 46_2, \ldots 46_m$ over which data exchange is to occur is included in the message 54 shown in FIG. 5A.

The system module circuit $36_2$ included in the server means $20_2$ which transmitted the original message at the first rate communicates to the system module circuit of the server means $20_1$ which received the message that a data exchange is to occur and that data transmission is awaited. The system module circuits $36_1$ and $36_2$ included in the respective server means $20_1$ and $20_2$ between which data is to be exchanged initiate the associated personality module circuits $26_1$ and $26_2$ between which the data is transmitted and received.

There are only two cases for data exchange, namely, where the system module circuit $36_2$ included in the server means $20_2$ requests data exchange to the associated personality module circuit $26_2$ as in the example and, on the other hand, where the system module circuit indicates that the associated personality module circuit is to transmit data. In the former case, that is, where the system module circuit $36_2$ included in the server means $20_2$ which transmitted the original message indicates that the associated personality module circuit $26_2$ is to receive data, then the system module circuit initiates the associated personality module circuit so that the personality module circuit is in condition to receive digital information in the form of data from the server means $20_1$ which received the original message upon completion of the transmission of the original message at the first rate. (In the latter case, that is, where the personality module circuit $26_1$ included in the server means $20_1$ which received the original message is to receive data, then the associated system module circuit $36_1$ does not transmit an acknowledgement message in response to the original message until the associated personality module circuit is in condition to receive the digital information in the form of data at the second higher rate.)

The format for the digital information in the form of data is shown in FIG. 5B. A comparison between the format for the data shown in FIG. 5B and the format for the original message shown in FIG. 5A indicates that the formats have a similar form with two exceptions.

The data format includes a first flag 60 which is preferably eight bits and is similar to the first flag 50 which appears in the message format. Unlike the message, however, which includes the address 52, the data format does not include an address. Furthermore, the data 62 shown in FIG. 5B can be substantially larger than the message 54 included in the message format shown in FIG. 5A. Specifically, whereas the message 54 shown in FIG. 5A is preferably not greater than 256 bytes, the data 62 is preferably as many as 16,636 bytes as shown in FIG. 5B. By way of similarity, the data format shown in FIG. 5B includes a CRC code 64 and a second flag 66 which correspond to the CRC code 56 and the second flag 58 which appear in the message format shown in FIG. 5A.

As can be seen from a comparison of FIG. 5B with FIG. 5A, the substantially greater amount of digital information which can be contained in the data 62 in comparison with the digital information contained in the message 54 militates in favor of a higher rate for data transmission than for message transmission. Furthermore, elimination of the address 52 included in the message format shown in FIG. 5A enables a reduction in the complexity of circuit implementation and an increase in the rate of data transmission.

The serial interface circuit $42_{2a}$ included in the system module circuit $36_2$ which initiates data exchange by means of the original message transmits a series of first flags over the selected four-wire, full duplex communication channel $46_9, 46_{10}, \ldots 46_{16}$ included in the communication circuits 22 selected for data transmission in order to continue the availability of the selected communication channel for data exchange. Thereafter, the system module circuit $36_2$ included in the server means $20_2$ initiates the high speed serial interface $28_2$ of the associated personality module circuit $26_2$, which transmits flags on the selected four-wire, full duplex communication channel $46_9, 46_{10}, \ldots 46_{16}$ included in the communication circuits 22, whereupon the system module circuit disables the low speed serial interface $38_{2a}$.

Data transmission commences when the processor associated with the system module circuit $36_1$ included in the server means $20_1$ which is to transmit data initiates the DMA $30_1$ included in the associated high speed serial interface $28_1$, whereupon the data is accessed by the DMA and routed by the associated serial interface circuit $32_1$ and multiplexer circuit $34_1$ onto the four-wire, full duplex communication channel $46_9, 46_{10}, \ldots 46_{16}$ included in the communication circuits 22, which is selected for data transmission and identified in the original message. The DMA $30_1$ included in the personality module circuit $26_1$ of the associated server means $20_1$ which transmits the data interrupts the processor associated with the system module circuit when the data transmission is complete as indicated by the second flag 66 shown in FIG. 5B. Second flags 66 are transmitted at the end of the data transmission (i.e., after the CRC code 64) until the serial interface circuit $32_1$ included in the personality module circuit $26_1$ of the associated server means $20_1$ which transmits the data is disabled. The DMA $30_2$ included in the personality module circuit $26_2$ of the associated server means $20_2$ which receives the data interrupts the processor associated with the system module circuit when the data transmission is complete as indicated by the second flag 66. This completes the data exchange phase shown in FIG. 4.

As mentioned earlier, one of the system module circuits $36_1, 36_2, \ldots 36_n$ serves as a health monitor means for periodically testing the elements of the dual speed serial digital information communication network 10, as well as testing a particular four-wire, full duplex communication channel $46_1, 46_2, \ldots 46_m$ and system module circuit to which a message is to be transmitted if the predetermined period for monitoring the communication channel elapses, whereupon the health monitor means is notified. Periodically, the health monitor means tests the designated master communication channel or circuit by transmitting a message to each and every server means $20_1, 20_2, \ldots 20_n$ and awaiting an acknowledgement message from each system module circuit $36_1, 36_2, \ldots 36_n$ included in the respective server means. If the health monitor means does not receive an acknowledgement message from a system module circuit $36_1, 36_2, \ldots 36_n$, then the health monitor means transmits a message to that system module circuit over the designated or assigned home communication channel or circuit for the server means associated with that system module circuit. The message from the health monitor means instructs the system module circuit $36_1, 36_2, \ldots 36_n$ to monitor that designated master communication channel or circuit, whereupon the health monitor again attempts to communicate with the system module circuit over the master circuit.

If an acknowledgement message is not received, the health monitor means continues the attempt to communicate with the system module circuit $36_1, 36_2, \ldots 36_n$ over each of the four-wire, full duplex communication channels $46_1, 46_2, \ldots 46_m$ until all channels are exhausted. If no acknowledgement message is received by the health monitor means, the system module circuit $36_1, 36_2, \ldots 36_n$ is presumed faulty. If the system module circuit $36_1, 36_2, \ldots 36_n$ acknowledges the message from the health monitor means to monitor the designated master communication channel or circuit, but the reattempt of communication over the master circuit is not successful, then either the master circuit is faulty or the connection of the system module circuit to the master circuit is defective. If subsequent tests evidence that acknowledgement messages are received by the health monitor means over the designated master communication channel or circuit from other system module circuits $36_1$, $36_2$, ... $36_n$ the connection is deemed defective. If no acknowledgements are received during subsequent tests, then the designated master communication channel or circuit is deemed faulty.

In summary, the dual speed serial digital information communication network 10 provides high throughput fault tolerant serial digital information communication. The plurality of four-wire, full duplex communication channels $46_1$, $46_2$, ... $46_m$ in association with the personality module circuits $26_1$, $26_2$, ... $26_n$ and the system module circuits $36_1$, $36_2$, ... $36_n$ provide communication channel multiplication for increased message and data throughput, preferably with messages being communicated at a first rate and data being communicated at a second higher rate in order to optimize throughput. The four-wire, full duplex communication channels $46_1$, $46_2$, ... $46_m$ not only provide alternate communication channels in the event that one or more are busy so as to increase message and data throughput, but also provide fault tolerance by having redundant communication channels in the event that one or more are short circuited or open circuited or otherwise fail.

The information processing elements connected to the server means $20_1$, $20_2$, ... $20_n$ can be serial, parallel, serial to parallel, or parallel to serial. The personality module circuits $26_1$, $26_2$, ... $26_n$ and system module circuits $36_1$, $36_2$, ... $36_n$ included in the respective server means $20_1$, $20_2$, ... $20_n$ assure that digital information to be communicated is in parallel format for input to the serial interfaces $28_1$, $28_2$, ... $28_n$ included in the respective personality module circuits and $38_{1a,1b}$, $38_{2a,2b}$, ... $38_{na,nb}$ included in the respective system module circuits for serial communication over the four-wire, full duplex communication channels $46_1$, $46_2$, ... $46_m$ included in the communication circuits 22.

Although the dual speed serial digital information communication network 10 is characterized by synchronous operation, operation can be asynchronous since the server means $20_1$, $20_2$, ... $20_n$ include standalone memory. Also, only one low speed serial interface is needed in each system module circuit $36_1$, $36_2$, ... $36_n$ although preferably two are included in order to facilitate operation and improve performance. Furthermore, a protocol other than HDLC can be used, although HDLC is preferably used.

The dual speed serial digital information communication network in accordance with the invention provides high throughput fault tolerant digital information communication and, therefore, has significant advantages over known single channel serial network architectures. The dual speed serial digital information communication network in accordance with the invention also has significant advantages over parallel bus network architectures. There is no technique for full duplex communication in bus network architectures. In order to duplicate the dual speed serial digital information communication system in accordance with the invention in a parallel bus network architecture, the number of buses would have to be doubled, and each additional bus would require sixteen or thirty-two wires for message and data communication, plus eight to twenty-four lines for address information, plus control wires. Furthermore, error checks are much more difficult to perform if communications are in parallel as in the case of parallel bus network architectures compared to error checks when communication of digital information is in serial format as in accordance with the invention. Furthermore, the circuit implementation of the dual speed serial digital information communication network in accordance with the invention is less complex than the circuit implementation of a parallel bus network. The fact that there is a plurality of four-wire, full duplex communication channels included in the communication circuits allows on-line replacement of faulty module circuits included in various server means without affecting the throughput of communication of digital information among other server means.

Although the invention has been described and illustrated in detail, it is to be clearly understood that the same is by way of illustration and example only and is not to be taken by way of limitation. Various modifications will occur to those skilled in the art in view of the embodiments which are described above. Consequently, the spirit and scope of this invention are ascertainable only by reference to the appended claims.

What is claimed is:

1. A method for digital information communication whereby at least one of a plurality of information processing elements is coupled to at least one other of the plurality of information processing elements, comprising the steps of:

interfacing each of the plurality of information processing elements to a plurality of coupling means;

exchanging digital information in the form of messages among a plurality of communication controller means under control of the plurality of communication controller means, at least certain of the messages exchanged among the plurality of communication controller means being for control of the exchange of digital information in the form of data among the plurality of coupling means for use by the plurality of information processing elements; and connecting the plurality of coupling means and communication controller means to a plurality of four-wire, full duplex communication circuits for transferring digital information among the plurality of coupling means and communication controller means, respectively, in bit-serial format;

whereby high throughput fault tolerant digital information communication in serial format is provided.

2. The method of claim 1 wherein the exchange of messages comprises bidirectionally communicating digital information at a first rate and the exchange of data comprises unidirectionally communicating digital information at a second higher rate.

3. A digital information communication network whereby at least one of a plurality of information processing elements is coupled to at least one other of the plurality of information processing elements, comprising:

a plurality of four-wire, full duplex communication circuits;

a plurality of coupling means for interfacing each of the plurality of information processing elements to the plurality of communication circuits in order to exchange digital information in the form of data among the plurality of coupling means for use by the plurality of information processing elements;

a plurality of communication controller means connected to the plurality of coupling means for exchanging digital information in the form of messages among the plurality of communication controller means, at least certain of the messages exchanged among the plurality of communication controller means being for control of the exchange of data among the plurality of coupling means; and serial interface means for connecting the plurality of coupling means and communication controller means to the plurality of communication circuits for transferring digital information among the plurality of coupling means and communication controller means, respectively, in bit-serial format;

thereby providing high throughput fault tolerant digital information communication in serial format.

4. The apparatus of claim 3 wherein the plurality of communication circuits forms a set of communication circuits for bidirectionally communicating digital information in the form of messages at a first rate and characterized in that a predetermined subset of the communication circuits is provided for unidirectionally communicating digital information in the form of data at a second higher rate.

5. A digital information communication network whereby at least one of a plurality of information processing elements is coupled to at least one other of the plurality of information processing elements, comprising:

a plurality m of four-wire, full duplex communication circuits;

a plurality n of personality module circuits connected to the plurality of information processing elements and a preselected subset of the m communication circuits for interfacing the plurality of information processing elements to the preselected subset of the m communication circuits in order to exchange digital information in the form of data among the n personality module circuits; and a plurality n of system module circuits connected to the m communication circuits and the n personality module circuits for exchanging digital information in the form of messages among the n system module circuits, at least certain of the messages exchanged among the n system module circuits being for control of the exchange of data among the n personality module circuits;

the data and messages being exchanged among the n personality module circuits and n system module circuits, respectively, in bit-serial format;

thereby providing high throughput fault tolerant digital information communication in serial format.

6. The apparatus of claim 5 wherein the m communication circuits form a set of communication circuits for bidirectionally communicating digital information in the form of messages at a first rate and characterized in that a predetermined subset of-the m communication circuits is provided for unidirectionally communicating digital information in the form of data at a second higher rate.

7. A digital information communication network whereby at least one of a plurality of information processing elements is loosely coupled to at least one other of the plurality of information processing elements, comprising:

a plurality m of four-wire, full duplex communication channels;

a plurality n of personality module circuits connected to the plurality of information processing elements and a preselected subset of the m communication channels for interfacing the plurality of information processing elements to the preselected subset of the m communication channels in order to exchange digital information in the form of data among the n personality module circuits, each one of the n personality module circuits including a first serial interface comprising:

(a) a first direct memory access interface in series with (b) a first serial interface circuit in series with (c) a first multiplexer circuit; the first serial interface for connecting the associated personality module circuit to the preselected subset of the m communication channels; and a plurality n of system module circuits connected to the m communication channels and the n personality module circuits for exchanging digital information in the form of messages among the n system module circuits, at least certain of the messages exchanged among the n system module circuits being for control of the exchange of data among the n personality module circuits, each one of the n system module circuits including at least a second serial interface comprising:

(a) a second direct memory access interface (b) a second serial interface circuit in series with (c) a second multiplexer circuit; the second serial interface for connecting the associated system module circuit to the m communication channels;

the data and messages being exchanged among the n personality module circuits and n system module circuits, respectively, in bit-serial format;

thereby providing high throughput fault tolerant digital information communication in serial format.

8. The apparatus of claim 7 wherein the m communication circuits form a set of communication circuits for bidirectionally communicating digital information in the form of messages at a first rate and characterized in that a predetermined subset of the m communication circuits is provided for unidirectionally communicating digital information in the form of data at a second higher rate.

9. A method for digital information communication whereby at least one of a plurality of information processing elements is coupled to at least one other of the plurality of information processing elements, comprising the steps of:

interfacing each of the plurality of information processing elements to a plurality of coupling means, each information processing element being associated with one coupling means;

interfacing each of the pluraltity of coupling means with a plurality of communication controller means, each coupling means being associated with one communication controller means;

exchanging digital information in the form of messages among the plurality of communication controller means under control of the plurality of communication controller means, at least certain of the messages exchanged among the plurality of communication controller means being for control of the exchange of digital information in the form of data among the plurality of coupling means for use by the plurality of information processing elements; and connecting the plurality of coupling means and their associated communication controller means to a plurality of four-wire, full duplex communication circuits for transferring digital information among the plurality of coupling means, on the one hand, and among the plurality of communication controller means, on the other hand, respectively, in bit-serial format;

whereby high throughput fault tolerant digital information communication in serial format is provided.

10. The method of claim 9 wherein the exchange of messages comprises bidirectionally communicating digital information at a first rate and the exchange of data comprises unidirectionally communicating digital information at a second higher rate.

11. A digital information communication network whereby at least one of a plurality of information processing elements is coupled to at least one other of the plurality of information processing elements, comprising:

a plurality of four-wire, full duplex communication circuits;

a plurality of coupling means connected to the plurality of information processing elements, each information processing element being associated with one coupling means, for interfacing each of the plurality of information processing elements to the plurality of communication circuits in order to exchange digital information in the form of data among the plurality of coupling means for use by the plurality of information processing elements;

a plurality of communication controller means connected to the plurality of coupling means, each communication controller means being associated with one coupling means, for exchanging digital information in the form of messages among the plurality of communication controller means, at least certain of the messages exchanged among the plurality of communication controller means being for control of the exchange of data among the plurality of coupling means; and serial interface means for connecting the plurality of coupling means and their associated communication controller means to the plurality of communication circuits for transferring digital information among the plurality of coupling means, on the one hand, and among the plurality of communication controller means, on the other hand, respectively, in bit-serial format;

thereby providing high throughput fault tolerant digital information communication in serial format.

12. The apparatus of claim 11 wherein the plurality of communication circuits forms a set of communication circuits for bidirectionally communicating digital information in the form of messages at a first rate and characterized in that a predetermined subset of the communication circuits is provided for unidirectionally communicating digital information in the form of data at a second higher rate.

* * * * *